(12) United States Patent
Dhawan et al.

(10) Patent No.: US 11,778,082 B2
(45) Date of Patent: *Oct. 3, 2023

(54) VOICE APPLICATION NETWORK PLATFORM

(71) Applicant: XTONE, INC., McLean, VA (US)

(72) Inventors: Vishal Dhawan, Centreville, VA (US); Timothy M Price, Rockville, MD (US); Manoj Sindhwani, Oakhill, VA (US)

(73) Assignee: Xtone, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,791

(22) Filed: Apr. 26, 2023

(65) Prior Publication Data

US 2023/0262157 A1    Aug. 17, 2023

Related U.S. Application Data

(63) Continuation of application No. 17/965,598, filed on Oct. 13, 2022, now Pat. No. 11,743,369, which is a
(Continued)

(51) Int. Cl.
*H04M 1/247* (2021.01)
*H04M 3/42* (2006.01)
(Continued)

(52) U.S. Cl.
CPC ....... *H04M 1/2478* (2013.01); *H04M 1/2477* (2013.01); *H04M 3/42221* (2013.01);
(Continued)

(58) Field of Classification Search
CPC ............ H04M 1/2478; H04M 1/2477; H04M 3/42221; H04M 1/72445
See application file for complete search history.

(56) References Cited

U.S. PATENT DOCUMENTS 5,073,923 A   12/1991   Offers et al.
5,323,444 A    6/1994   Ertz et al.
(Continued)

FOREIGN PATENT DOCUMENTS

GB    2362540        11/2001
WO    96/20448        7/1996
WO    WO 01/45086     6/2001

OTHER PUBLICATIONS

U.S. Appl. No. 11/514,116, filed Sep. 1, 2006.
(Continued)

*Primary Examiner* — Amal S Zenati
(74) *Attorney, Agent, or Firm* — FisherBroyles, LLP

(57) ABSTRACT

A distributed voice applications system includes a voice services instruction rendering agent and at least one voice services software client that is configured to provide voice applications to an individual user. A management system may control and direct the voice services rendering agent to create voice applications that are personalized for individual users based on user characteristics, information about the environment in which the voice applications will be performed, prior user interactions and other information. The voice services software client may be resident on a local user device which includes a voice browser and speech recognition capabilities. The local device, voice services instruction rendering agent and the management system may be interconnected via a communications network.

30 Claims, 21 Drawing Sheets

Related U.S. Application Data continuation of application No. 17/410,683, filed on Aug. 24, 2021, which is a continuation of application No. 12/717,893, filed on Mar. 4, 2010, now Pat. No. 11,102,342, which is a continuation-in-part of application No. 11/514,116, filed on Sep. 1, 2006, now abandoned.

(60) Provisional application No. 61/157,337, filed on Mar. 4, 2009, provisional application No. 60/712,808, filed on Sep. 1, 2005.

(51) Int. Cl.
*H04M 3/493* (2006.01)
*H04M 1/253* (2006.01)
*H04M 1/72445* (2021.01)

(52) U.S. Cl.
CPC ........ *H04M 3/4936* (2013.01); *H04M 1/2535* (2013.01); *H04M 1/72445* (2021.01); *H04M 3/493* (2013.01); *H04M 2250/74* (2013.01)

(56) References Cited

U.S. PATENT DOCUMENTS

| | | | |
|---|---|---|---|
| 5,802,526 A * | 9/1998 | Fawcett | H04M 3/493 707/916 |
| 5,918,014 A | 6/1999 | Robinson | |
| 6,035,018 A | 3/2000 | Kaufman | |
| 6,072,482 A | 6/2000 | Moon et al. | |
| 6,088,428 A | 7/2000 | Trandal et al. | |
| 6,212,408 B1 | 4/2001 | Son et al. | |
| 6,285,984 B1 | 9/2001 | Speicher | |
| 6,334,103 B1 | 12/2001 | Surace et al. | |
| 6,408,272 B1 | 6/2002 | White et al. | |
| 6,636,504 B1 | 10/2003 | Albers et al. | |
| 6,636,831 B1 | 10/2003 | Profit, Jr. et al. | |
| 6,658,388 B1 | 12/2003 | Kleindienst et al. | |
| 6,738,743 B2 | 5/2004 | Sharma et al. | |
| 6,744,881 B1 | 6/2004 | Price | |
| 6,757,781 B2 | 6/2004 | Williams et al. | |
| 6,829,334 B1 | 12/2004 | Zirngibl et al. | |
| 6,882,974 B2 | 4/2005 | James et al. | |
| 6,901,431 B1 | 5/2005 | Dodrill et al. | |
| 6,977,992 B2 | 12/2005 | Zirngibl et al. | |
| 6,988,070 B2 | 1/2006 | Kawasaki et al. | |
| 7,016,847 B1 | 3/2006 | Tessel et al. | |
| 7,020,609 B2 | 3/2006 | Thrift et al. | |
| 7,024,363 B1 | 4/2006 | Comerford et al. | |
| 7,043,232 B2 | 5/2006 | Pelaez et al. | |
| 7,062,709 B2 | 6/2006 | Cheung | |
| 7,069,221 B2 | 6/2006 | Crane et al. | |
| 7,174,005 B1 | 2/2007 | Rodkey et al. | |
| 7,174,297 B2 | 2/2007 | Guerra et al. | |
| 7,263,712 B2 | 8/2007 | Spencer | |
| 7,334,050 B2 | 2/2008 | Zondervan et al. | |
| 7,376,222 B2 | 5/2008 | Lin | |
| 7,415,442 B1 | 8/2008 | Battaglini | |
| 7,466,810 B1 | 12/2008 | Quon | |
| 7,483,833 B2 | 1/2009 | Peters | |
| 7,552,055 B2 | 6/2009 | Lecoeuche | |
| 7,599,838 B2 | 10/2009 | Gong et al. | |
| 7,657,005 B2 | 2/2010 | Chang | |
| 7,689,426 B2 | 3/2010 | Matula | |
| 7,702,084 B2 | 4/2010 | Wolmuth | |
| 7,801,283 B2 | 9/2010 | Harwood et al. | |
| 7,801,306 B2 | 9/2010 | Reitmeier et al. | |
| 7,809,376 B2 | 10/2010 | Letourneau et al. | |
| 7,844,215 B2 | 11/2010 | Vance et al. | |
| 7,885,817 B2 | 2/2011 | Paek et al. | |
| 7,889,853 B2 | 2/2011 | Sutcliffe | |
| 7,948,892 B2 | 5/2011 | Morinaga et al. | |
| 8,064,588 B2 | 11/2011 | Brahm et al. | |
| 8,085,909 B2 * | 12/2011 | Tischer | G06F 16/9027 379/88.23 |
| 8,140,340 B2 | 3/2012 | Bhogal et al. | |
| 8,223,931 B1 | 7/2012 | Lavian et al. | |
| 8,483,853 B1 | 7/2013 | Lambourne | |
| 2002/0001370 A1 | 1/2002 | Walker et al. | |
| 2002/0022453 A1 | 2/2002 | Balog et al. | |
| 2002/0059073 A1 | 5/2002 | Zondervan et al. | |
| 2002/0065944 A1 | 5/2002 | Hickey et al. | |
| 2002/0073034 A1 | 6/2002 | Wagner et al. | |
| 2002/0108125 A1 | 8/2002 | Joao | |
| 2002/0161646 A1 | 10/2002 | Gailey et al. | |
| 2002/0169604 A1 | 11/2002 | Damiba et al. | |
| 2002/0169615 A1 | 11/2002 | Kruger et al. | |
| 2002/0188451 A1 | 12/2002 | Guerra et al. | |
| 2003/0007609 A1 | 1/2003 | Yuen et al. | |
| 2003/0068999 A1 | 4/2003 | Casali et al. | |
| 2003/0114202 A1 | 6/2003 | Suh et al. | |
| 2003/0119487 A1 | 6/2003 | Silvester | |
| 2003/0125944 A1 | 7/2003 | Wohlsen et al. | |
| 2003/0144005 A1 | 7/2003 | Videtich | |
| 2003/0191816 A1 | 10/2003 | Landress et al. | |
| 2003/0233238 A1 | 12/2003 | Creamer et al. | |
| 2004/0006471 A1 | 1/2004 | Chiu | |
| 2004/0006476 A1 | 1/2004 | Chiu | |
| 2004/0010412 A1 | 1/2004 | Chiu | |
| 2004/0068364 A1 | 4/2004 | Zhao et al. | |
| 2004/0093218 A1 | 5/2004 | Bezar | |
| 2004/0151285 A1 | 8/2004 | Sychta | |
| 2004/0163073 A1 | 8/2004 | Krzyzanowski et al. | |
| 2004/0174983 A1 | 9/2004 | Olschwang et al. | |
| 2004/0210637 A1 | 10/2004 | Loveland | |
| 2004/0230689 A1 | 11/2004 | Loveland | |
| 2005/0091057 A1 | 4/2005 | Phillips et al. | |
| 2005/0135338 A1 | 6/2005 | Chiu et al. | |
| 2005/0141679 A1 | 6/2005 | Zirngibl et al. | |
| 2005/0163136 A1 | 7/2005 | Chiu et al. | |
| 2005/0234720 A1 | 10/2005 | Paillet et al. | |
| 2005/0234727 A1 | 10/2005 | Chiu | |
| 2005/0283367 A1 | 12/2005 | Ativanichayaphong et al. | |
| 2006/0047511 A1 | 3/2006 | Hussain | |
| 2006/0069701 A1 | 3/2006 | O'Rourke, III | |
| 2006/0122840 A1 | 6/2006 | Anderson et al. | |
| 2006/0159246 A1 | 7/2006 | Abramson et al. | |
| 2006/0182247 A1 | 8/2006 | Batni et al. | |
| 2006/0206340 A1 | 9/2006 | Silvera et al. | |
| 2006/0293897 A1 | 12/2006 | White et al. | |
| 2007/0078706 A1 | 4/2007 | Datta et al. | |
| 2007/0135101 A1 | 6/2007 | Ramati et al. | |
| 2007/0143113 A1 | 6/2007 | Nanavati et al. | |
| 2007/0156747 A1 * | 7/2007 | Samuelson | G06F 16/954 707/999.102 |
| 2007/0206758 A1 | 9/2007 | Barak | |
| 2007/0263838 A1 | 11/2007 | Wiseman et al. | |
| 2007/0283268 A1 | 12/2007 | Berger et al. | |
| 2008/0104630 A1 | 5/2008 | Bruce et al. | |
| 2008/0165937 A1 | 7/2008 | Moore | |
| 2009/0007171 A1 | 1/2009 | Casey et al. | |
| 2009/0022283 A1 | 1/2009 | Pollitt | |
| 2010/0036717 A1 | 2/2010 | Trest | |
| 2010/0054432 A1 | 3/2010 | Brahm et al. | |
| 2010/0086107 A1 | 4/2010 | Tzruya | |
| 2013/0045778 A1 | 2/2013 | Sundaresan et al. | |

OTHER PUBLICATIONS

Office Action for U.S. Appl. No. 11/514,116 dated Feb. 26, 2010.
U.S. Appl. No. 12/717,826, filed Mar. 4, 2010.
Office Action for U.S. Appl. No. 12/717,826 dated Nov. 28, 2011.
U.S. Appl. No. 12/717,839, filed Mar. 4, 2010.
Office Action for U.S. Appl. No. 12/717,839 dated Dec. 29, 2011.
Office Action for U.S. Appl. No. 12/717,839 dated Sep. 21, 2012.
Office Action for U.S. Appl. No. 12/717,839 dated May 2, 2014.
Office Action for U.S. Appl. No. 12/717,839 dated Mar. 17, 2015.
Office Action for U.S. Appl. No. 12/717,839 dated Nov. 20, 2015.
U.S. Appl. No. 12/717,854, filed Mar. 4, 2010.
Office Action for U.S. Appl. No. 12/717,854 dated Dec. 29, 2011.
Office Action for U.S. Appl. No. 12/717,854 dated Oct. 16, 2012.
Office Action for U.S. Appl. No. 12/717,854 dated Feb. 3, 2015.

(56) References Cited

OTHER PUBLICATIONS

Office Action for U.S. Appl. No. 12/717,854 dated Jan. 4, 2016.
U.S. Appl. No. 12/717,858, filed Mar. 4, 2010.
Office Action for U.S. Appl. No. 12/717,858 dated Nov. 25, 2011.
Office Action for U.S. Appl. No. 12/717,858 dated Sep. 27, 2012.
Office Action for U.S. Appl. No. 12/717,858 dated Mar. 27, 2015.
Office Action for U.S. Appl. No. 12/717,858 dated Apr. 22, 2016.
U.S. Appl. No. 12/717,865, filed Mar. 4, 2010.
Office Action for U.S. Appl. No. 12/717,865 dated Mar. 13, 2012.
Office Action for U.S. Appl. No. 12/717,865 dated Aug. 15, 2013.
Office Action for U.S. Appl. No. 12/717,865 dated Apr. 10, 2015.
Office Action for U.S. Appl. No. 12/717,865 dated May 9, 2017.
Office Action for U.S. Appl. No. 12/717,865 dated Jun. 21, 2021.
U.S. Appl. No. 12/717,875, filed Mar. 4, 2010.
Office Action for U.S. Appl. No. 12/717,875 dated Dec. 29, 2011.
Office Action for U.S. Appl. No. 12/717,875 dated Nov. 26, 2012.
Office Action for U.S. Appl. No. 12/717,875 dated May 5, 2015.
Office Action for U.S. Appl. No. 12/717,875 dated Jan. 4, 2016.
Office Action for U.S. Appl. No. 12/717,875 dated Jun. 27, 2017.
U.S. Appl. No. 12/717,881, filed Mar. 4, 2010.
Office Action for 12/717,881 dated Nov. 22, 2011.
Office Action for 12/717,881 dated Aug. 15, 2013.
U.S. Appl. No. 12/717,888, filed Mar. 4, 2010.
Office Action for 12/717,888 dated Jan. 25, 2012.
Office Action for 12/717,888 dated Sep. 27, 2012.
Office Action for 12/717,888 dated Apr. 1, 2015.
Office Action for 12/717,888 dated Jun. 3, 2016.
U.S. Appl. No. 12/717,893, filed Mar. 4, 2010.
Office Action for 12/717,893 dated Mar. 1, 2012.
Office Action for 12/717,893 dated Sep. 27, 2012.
Office Action for 12/717,893 dated Oct. 15, 2013.
Office Action for 12/717,893 dated Aug. 1, 2014.
Office Action for 12/717,893 dated Apr. 9, 2015.
Office Action for 12/717,893 dated Apr. 26, 2021.
U.S. Appl. No. 12/717,897, filed Mar. 4, 2010.
Office Action for 12/717,897 dated Feb. 3, 2012.
Office Action for 12/717,897 dated Sep. 21, 2012.
Office Action for 12/717,897 dated Jul. 19, 2013.
Office Action for 12/717,897 dated Dec. 9, 2014.
U.S. Appl. No. 12/943,510, filed Jul. 10, 2010.
Office Action for 12/943,510 dated Apr. 10, 2012.
Office Action for 12/943,510 dated Nov. 21, 2012.
U.S. Appl. No. 13/355,840, filed Jan. 23, 2012.
Office Action for 13/355,840 dated Apr. 5, 2012.
U.S. Appl. No. 13/595,482, filed Aug. 27, 2012.
Office Action for 13/595,482 dated Sep. 9, 2014.
Office Action for 13/595,482 dated Jul. 8, 2015.
Office Action for 13/595,482 dated Mar. 10, 2016.
Office Action for 13/595,482 dated Jan. 5, 2017.
Office Action for 13/595,482 dated Oct. 10, 2017.
Office Action for 13/595,482 dated Sep. 20, 2019.
U.S. Appl. No. 15/216,752, filed Jul. 22, 2016.
Office Action for U.S. Appl. No. 15/216,752 dated Mar. 24, 2017.
Office Action for U.S. Appl. No. 15/216,752 dated Jan. 12, 2018.
Office Action for U.S. Appl. No. 15/216,752 dated Aug. 29, 2018.
U.S. Appl. No. 15/246,770, filed Aug. 25, 2016.
Office Action for U.S. Appl. No. 15/246,770 dated Jan. 26, 2018.
U.S. Appl. No. 15/784,423, filed Oct. 16, 2017.
Office Action for U.S. Appl. No. 15/784,423 dated Nov. 16, 2018.
Office Action for U.S. Appl. No. 15/784,423 dated Aug. 22, 2019.
U.S. Appl. No. 15/982,701, filed May 17, 2018.
Office Action for U.S. Appl. No. 15/982,701 dated Mar. 19, 2019.
U.S. Appl. No. 16/773,444, filed Jan. 27, 2020.
Office Action for U.S. Appl. No. 16/773,444 dated May 29, 2020.
Office Action for U.S. Appl. No. 16/773,444 dated Mar. 3, 2021.
Office Action for U.S. Appl. No. 16/773,444 dated Sep. 15, 2021.
U.S. Appl. No. 16/799,033, filed Feb. 24, 2020.
Office Action for U.S. Appl. No. 16/799,033 dated Mar. 2, 2021.
Office Action for U.S. Appl. No. 16/799,033 dated Sep. 15, 2021.
U.S. Appl. No. 17/410,683, filed Aug. 24, 2021.
Office Action for U.S. Appl. No. 17/410,583 dated Aug. 17, 2022.
U.S. Appl. No. 17/582,479 filed Jan. 24, 2022.
Office Action for U.S. Appl. No. 17/582,479 dated Sep. 27, 2022.
U.S. Appl. No. 17/582,555, filed Jan. 24, 2022.
Office Action for U.S. Appl. No. 17/582,555 dated Sep. 26, 2022.
Supplementary European Search Report issued in 06802900.8 dated Apr. 13, 2010.

* cited by examiner

VOICE APPLICATION NETWORK PLATFORM

This application is a Continuation of application Ser. No. 17/965,598, which was filed Oct. 13, 2022, which is a Continuation of application Ser. No. 17/410,683, which was filed Aug. 24, 2021, which is itself a continuation of application Ser. No. 12/717,893, filed Mar. 4, 2010, which claims priority to U.S. Provisional Application No. 61/157,337, filed Mar. 4, 2009 and which also is a continuation-in-part of application Ser. No. 11/514,116 filed Sep. 1, 2006, which itself claims the benefit of the filing date of U.S. Provisional Patent Application No. 60/712,808, which was filed Sep. 1, 2005. The disclosure of all of the foregoing applications is incorporated herein by reference.

BACKGROUND

Field

The invention relates to systems and methods that utilize speech recognition techniques to interact with a user to allow the user to obtain information and to perform various functions.

Background

There are various existing computer and telephony systems that provide voice services to users. These voice services can be speech recognition and touchtone enabled. Examples of such services include voice mail, voice activated dialing, customer care services, and the provision of access to Internet content via telephone.

One common example of a system that provides voice services is an Interactive Voice Response (IVR) system. In prior art systems, a user would typically use a telephone to call in to a central computer system which provides voice services via an IVR system. The IVR system deployed on the central computer system would then launch voice services, for instance by playing an audio clip containing a menu of choices to the user via the telephone line connection. The user could then make a selection by speaking a response. The spoken response would be received at the central computer system via the telephone line connection, and the central computer system would interpret the spoken response using speech recognition techniques. Based on the user's response, the IVR system would then continue to perform application logic to take further action. The further action could involve playing another menu of choices to the user over the telephone line, obtaining and playing information to the user, connecting the user to a third party or a live operator, or any of a wide range of other actions.

The ability to provide voice services has been quite limited by the nature of the systems that provide such services. In the known systems that provide voice services using relatively complex speech recognition processing, the voice applications are performed on high end computing devices located at a central location. Voice Application processing requires a high end centralized computer system because these systems are provisioned to support many simultaneous users. To get economies of scale, it is imperative for these systems to share telecom and computing resources across users. Such high end computing systems share, across multiple users, many phone lines, many IVR servers that connect to the phone lines, multiple speech recognition servers, one or more text-to-speech servers, and a farm of application servers to process application logic during the course of a user interaction. Often, other equipment like switches and media gateways are also present in the centralized computer system. Management, integration and provisioning of these systems to support usage has been very complicated and expensive. Examples of such high end speech recognition systems are described in U.S. Pat. Nos. 6,229,880 and 6,741,677 to Reformato et al.; U.S. Pat. No. 6,891,932 and Patent Publication No. 2005/0053201 to Bhargava et al.; U.S. Pat. No. 6,477,240 to Lim et al.; and U.S. Patent Publication No. 2006/0015556 to Pounds et al., the respective disclosures of which are all hereby incorporated by reference.

Because complex voice application processing must be provided using a high end computer system at a central location, and because users are almost never co-located with the high end computer system, a user is almost always connected to the central computer system via a telephone call. The call could be made using a typical telephone or cell phone over the PSTN, or the call might be placed via a VoIP-type (Skype, SIP) connection. Regardless, the user must establish a dedicated, persistent voice connection to the central computer system to access the voice services.

FIG. 1 depicts a typical prior art architecture for a centralized voice services platform. In this type of system, the speech recognition functions are performed at a central computer system. As shown in FIG. 1, a user telephone 1010 is used to place a telephone call to a central voice services platform 1060 via a telephone network 1040. The telephone network 1040 could be a traditional PSTN, or a VoIP based system. Either way, the user would have to establish the telephone call to the central voice service platform 1060 via a telephone carrier.

As mentioned earlier, the central voice services platform must be capable of handling a large number of simultaneous telephone calls, especially during peak hours. Providing and maintaining the hardware capability to maintain multiple simultaneous separate voice telephone calls is quite expensive. For instance, the average cost of providing a single IVR telecom port presently ranges from $1,500 to $3,000 per telephone line of service.

Merely paying for the connect time on a large number to telephone lines can be rather expensive. A public telephony based IVR system service provider often must commit to a minimum volume of minutes with a telephony carrier vendor, leading to a fixed minimum telecom related expense. This creates a situation where the service provider needs to quickly ramp up the volume of business in order to recover the telecom expense per user, and thus increase the profit margin per user.

Also, as discussed, the central voice services platform is complicated and expensive to begin with. These traditional IVR system deployments are also highly vulnerable to the failure of one or more components. It requires extensive redundant hardware and software systems in order to overcome this vulnerability in order to provide reliable service. And because the hardware and software being used is expensive to begin with, providing redundant capabilities is very expensive.

Also, the prior art centralized voice services platforms, which depend on a telephony infrastructure for connection to users, are highly inflexible from a deployment standpoint. The configurations of hardware and software are all concentrated on a small number of high end servers. These configurations are technically complex and hard to monitor, manage, and change as business conditions dictate. Furthermore, the deployment of existing IVR system architectures, and the subsequent provisioning of users and voice applications to them, requires extensive configuration management that is often performed manually. Also, changes in the configuration or deployment of IVR services within extant IVR architectures often require a full or partial suspension of service during any reconfiguration or deployment effort.

The provisioning of a typical high end high end centralized computer system has also been complicated by the type of voice services provided by such systems and the usage pattern associated with such voice services. For instance, a Voice Mail service system may have different provisioning requirements than an outbound notification system. In this regard, the service provider using a high end high end centralized computer system would have to manage a very high level of complexity if it had to simultaneously provide contrasting voice services. The types of voice services drive the traffic pattern of calls, driving the number of phone lines needed, and the need for speech recognition servers and associated application processing servers. These issues lead to many specialized voice services providers.

Further, cost structures and provisioning algorithms that provision the capabilities of such a centralized voice services platform make it virtually impossible to ensure that a caller can always access the system. If the system were configured with such a large number of telephone line ports that all potential callers would always be connected to access contrasting types of voice services, with different and overlapping peak utilization hours, the cost of maintaining all the hardware and software elements would be prohibitive. Instead, such centralized voice services platforms are configured with a reasonable number of telephone ports that result in a cost-effective operating structure. The operator of the system must accept that callers may sometimes be refused access. Also, system users must accept that they will not receive an "always on" service.

Prior art centralized voice services platforms also tend to be "operator-centric." In other words, multiple different service providers provide call-in voice services platforms, but each service provider usually maintains their own separate platform. Even when several service providers are all using a common set of hardware and software, each company usually maintains its own separate call in telephone number. If the user has called in to a first company's voice services platform, he would be unable to access the voice services of a second company's platform. In order to access the second company's voice services platform, the user must terminate his call to the first company, and then place a new call to the second company's platform. Thus, obtaining access to multiple different IVR systems offered by different companies is not convenient.

To address the problem of switching to a different voice services platform, some IVR systems attempted to develop the ability to switch a caller off to a different voice services platform, or to a live operator, without forcing the user to hang up and place a new call. However, because a user is connected to the first voice services platform via a dedicated telephone line connection, passing the caller off to a live operator or to a third party's voice services platform can be difficult and expensive. In some instances, it may be possible for the central computer of the first voice services platform to communicate with the PSTN to instruct the PSTN to re-connect the existing call to a third party number. But often the local PSTN carrying the call lacks the ability to make such a switch. Even where it is possible, it is difficult to develop communications switching code that will work with all PSTN equipment. More often, the central computer system is forced to make a call to the live operator or third party voice services platform using another dedicated phone line, and then bridge the original caller to the newly placed call to the operator/third party. The end result is that the caller is now using two dedicated phone ports of the first voice services platform, and the user is no longer even making use of the first voice services platform. The operator of the first voice services platform must pay for the connect time on two dedicated lines, and the two dedicated lines cannot be used by the system to service other users.

In addition to the above-described drawbacks of the current architecture, the shared nature of the servers in a centralized voice services platform limits the ability of the system to provide personalized voice applications to individual users. Similarly, the architecture of prior art IVR systems limit personalization even for groups of users. Because of these factors, the prior art systems have limitations on their ability to dynamically account for individual user preferences or dynamically personalize actual voice applications on the fly. This is so because it becomes very hard for a centralized system to correlate the user with their access devices and environment, to thereby optimize a voice application that is tuned specifically for an individual user. Further, most centralized systems simply lack user-specific data.

The prior art systems, because they are so tied to the telephone network to provide user access, have trouble rapidly deploying new applications. It becomes necessary to manage and re-route call traffic during any maintenance activities. This can be particularly difficult with multiple contrasting voice services being offered on the same system.

Some prior art voice services platforms were used to send audio messages to users via their telephones. The central voice services platform would have a pre-recorded audio message that needed to be played to multiple users. The platform would call each of the users, and once connected to a user, would play the audio message. However, when it was necessary to contact large numbers of users, it could take a considerable amount of time to place all the calls. The number of simultaneous calls that can be placed by the centralized voice services platform is obviously limited by the number of telephone ports it has. Further, in some instances, the PSTN was incapable of simultaneously connecting calls on all the available line ports connected to the voice services platform. In other words, the operators found that when they were trying to make a large number of outgoing calls on substantially all of their outgoing lines, the PSTN sometimes could not simultaneously connect all of the calls to the called parties. Further, when a voice services platform is delivering audio messages in this fashion, they tie up all the telephone port capacity, which prevents users from calling in to use the service.

With the prior art voice services platforms, it was difficult to develop efficient mechanisms for billing the users. Typically, the telephone carrier employed by the user would bill the user for calls made to the voice services platform. The amount of the charges could be determined in many different ways. For instance, the telephone carrier could simply bill the user a flat rate for each call to the voice services platform. Alternatively, the telephone carrier could bill the user a per-minute charge for being connected to the voice services platform. In still other methods, the voice services platform could calculate user charges and then inform the carrier about how much to bill the user. Regardless of how the charges are calculated, it would still be necessary for the telephony carrier to perform the billing, collect the money, and then pay some amount to the voice service platform.

To begin with, these prior art billing mechanisms were cumbersome at best. Both the telephony carrier and the voice services platform had to create relatively complex accounting systems to track the user's charges, and to ensure that everybody received adequate payment for the services delivered to the users.

Also, a voice services platform might offer a variety of different services, all of which are accessible once a caller has been connected to the voice services platform. Some premium services might cost more to deliver to the user than simple standard services. Ideally, the user should pay for the services that he uses. But in order to operate in this fashion, it was necessary for the voice services platform to track charges on an individual, per-user basis, and to then inform the carrier of what to charge the user. This involves the cumbersome transfer of billing data, all of which had to be verified.

For all the above reasons, billing for services delivered to users of central voice services platforms is cumbersome, expensive, and difficult to tailor to actual services usage.

Prior art voice services platforms also had security issues. In many instances, it was difficult to verify the identity of a caller. If the voice services platform was configured to give the user confidential information, or the ability to transfer or spend money, security becomes an important consideration.

Typically, when a call is received at the voice services platform, the only information the voice services platform has about the call is a caller ID number. Unfortunately, the caller ID number can be falsified. Thus, even that small amount of information could not be used as a reliable means of identifying the caller. For these reasons, callers attempting to access sensitive information or services were usually asked to provide identifying data that could be compared to a database of security information. While this helps, it still does not guarantee that the caller is the intended user, since the identifying data could be provided by anybody.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings, in which like reference numerals refer to like elements, and wherein.

DETAILED DESCRIPTION

Figure 1:
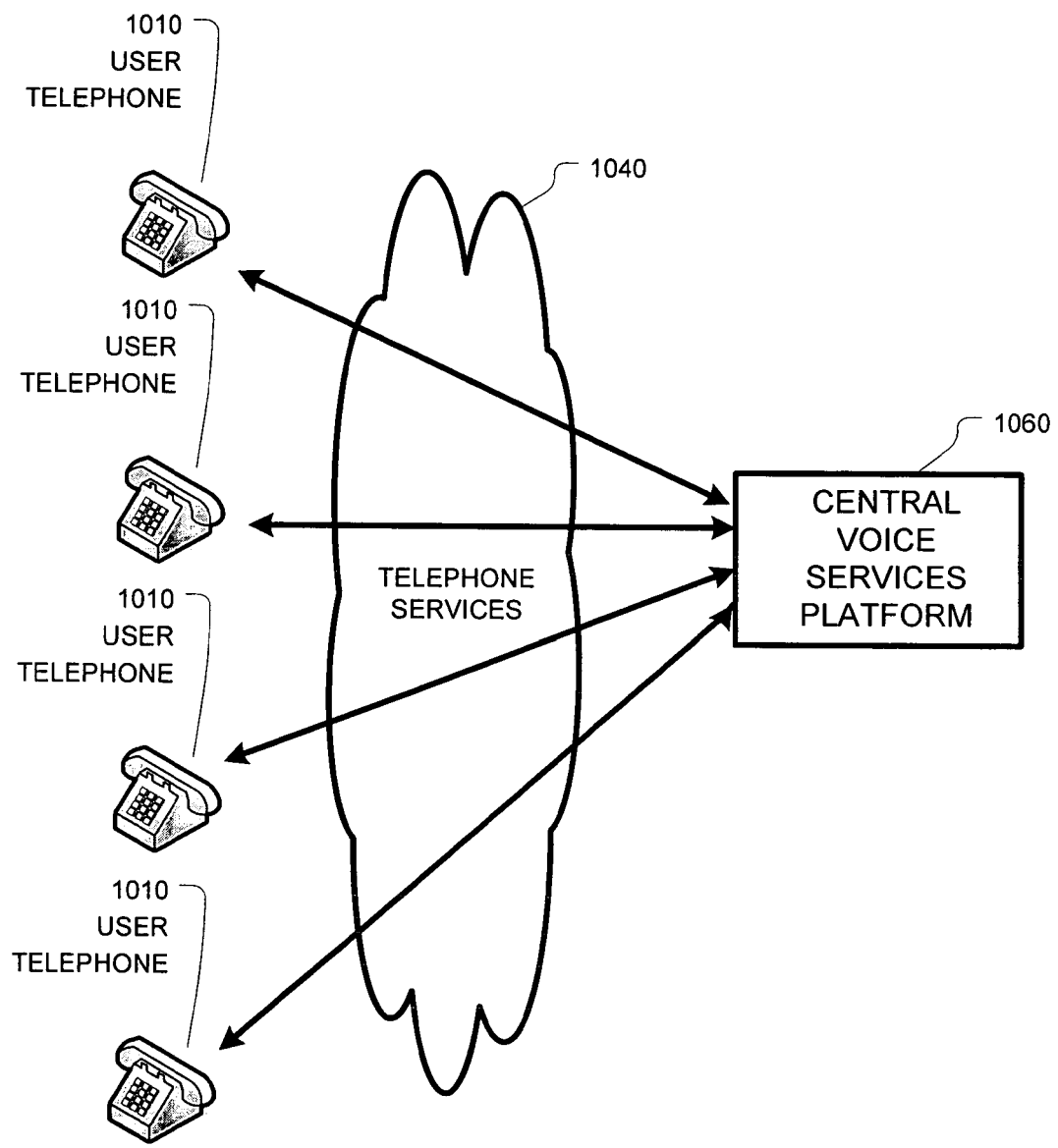
FIG. 1 is a diagram of a typical prior art system for providing speech enabled voice applications to a user.

Systems, devices and methods embodying the invention are intended to provide users with speech- and touch tone enabled Voice Applications for accessing various services. In this respect, the systems, devices and methods embodying the invention serve some of the same functions as the prior art centralized voice services platforms.

However, unlike the prior art voice services platforms, systems and methods embodying the invention utilize a highly distributed processing architecture to deliver the services. As will be explained below, the underlying architecture and the distributed nature of systems and methods embodying the invention allow the inventive systems to provide the same services as the prior art centralized voice services platforms, but with better performance, at a significantly reduced cost, and with far fewer limitations. In addition, systems and methods embodying the invention avoid or solve the drawbacks of the centralized voice services platforms discussed above. Further, because of the way systems and methods embodying the invention operate, they can provide new and additional services that could never have been provided by the prior art centralized voice services platforms. Systems and methods embodying the invention also allow for much better personalization of delivered services, and they allow existing services to be upgraded, improved, or further personalized much more easily than was possible with the prior art centralized voice services platforms.

Systems and methods embodying the invention are intended to deliver or provide Voice Applications (hereinafter, "VAs") for a user. Before beginning a discussion of systems and methods that embody the invention, we should start by discussing what we mean by a VA, and what a VA can do for a user. Unfortunately, this is somewhat difficult, because VAs can take a wide variety of different forms, and can accomplish a wide variety of different tasks.

A VA provides a user with the ability to use their natural voice, touch tone sequences or other forms of user input, to access and/or control an application, to obtain information, to perform a certain function, or to accomplish other tasks. Although the majority of the following description assumes that a user will interact with a system embodying the invention, at least in part, via speech, other forms of user interaction fall within the scope and spirit of the invention. For instance, developing technologies that allow a user to make selections from visual menus via hand or eye movements could also be the basis of a user interaction protocol. Likewise, developing technologies that are able to sense a user's brainwave patterns could form the basis of a user interaction protocol. Thus, systems and methods embodying the invention are not limited to speech-based user interfaces.

A VA could be specifically developed to utilize the benefits of speech recognition-based input processing. For instance, a VA could be developed to access, play and manipulate voice mail via speech commands. Alternatively, a VA could act as an extension or an enhancement of traditional GUI-like applications to allow the traditional applications to be accessed and/or controlled by speech commands. For instance, a VA could allow the user to call up specific e-mail messages on a display via spoken commands, and the user would then read the e-mail messages on the display.

In some instances, a VA could act like one of the interactive voice response systems that are accessible to users on prior art centralized voice services platforms. A VA could act in exactly the same way as a prior art IVR system to allow a user to obtain information or accomplish various functions using a speech enabled interface. However, because of the advantages of the new DVAES architecture, a system embodying the invention can perform voice applications that would have been impossible to perform on prior art centralized voice services platforms. Other VAs could perform a wide variety of other tasks. In most instances, the user would be able to accomplish functions or obtain information by simply speaking voice commands.

With the above general description of a Voice Application (VA) as background, we will now provide an overview of systems and methods embodying the invention. The following overview will make reference to FIG. 2A, which depicts a high-level diagram of how a system embodying the invention would be organized.

Figure 2A:
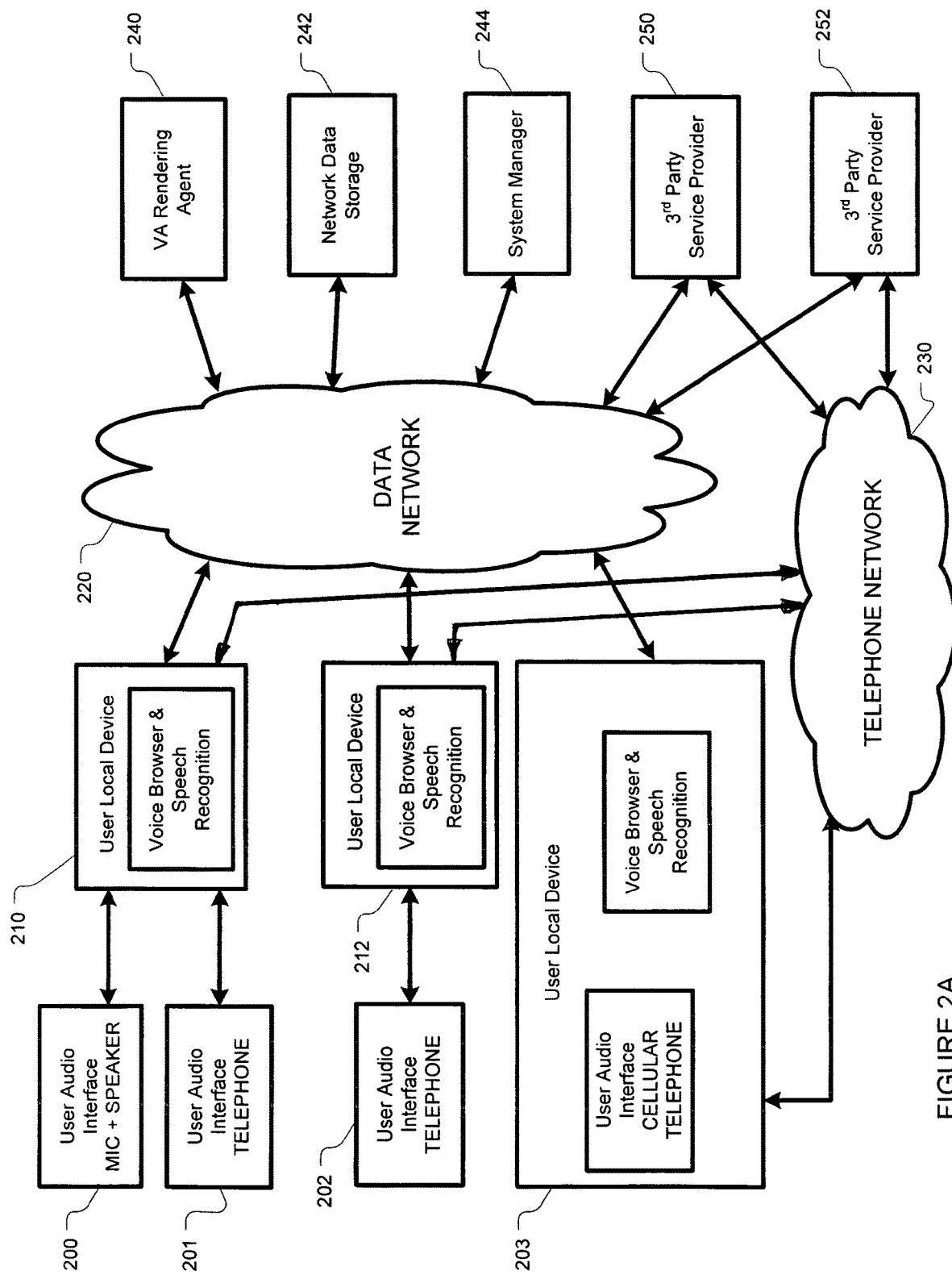
FIG. 2A is a diagram of a system embodying the invention.

As shown in FIG. 2A, preferred embodiments of the invention would make use of an optional telephone network 230 and a data network 220. The telephone network 230 could be a traditional PSTN, a VoIP system, a peer-to-peer telephone network, a cellular telephone network, or any other network that allows a user to place and receive telephone calls. The data network 220 could be the Internet, or possibly a private or internal local area network or intranet.

In some instances, users would only be physically coupled to a data network, such as the Internet. In this case, the user's on-site equipment could enable them to place VoIP telephone calls via the data network. Such VoIP telephone calls might make use of the PSTN, or the entire call might be handled over the data network. Regardless, in preferred embodiments, the user would be capable of simultaneously maintaining a telephone connection and sending and receiving data.

Figure 2B:
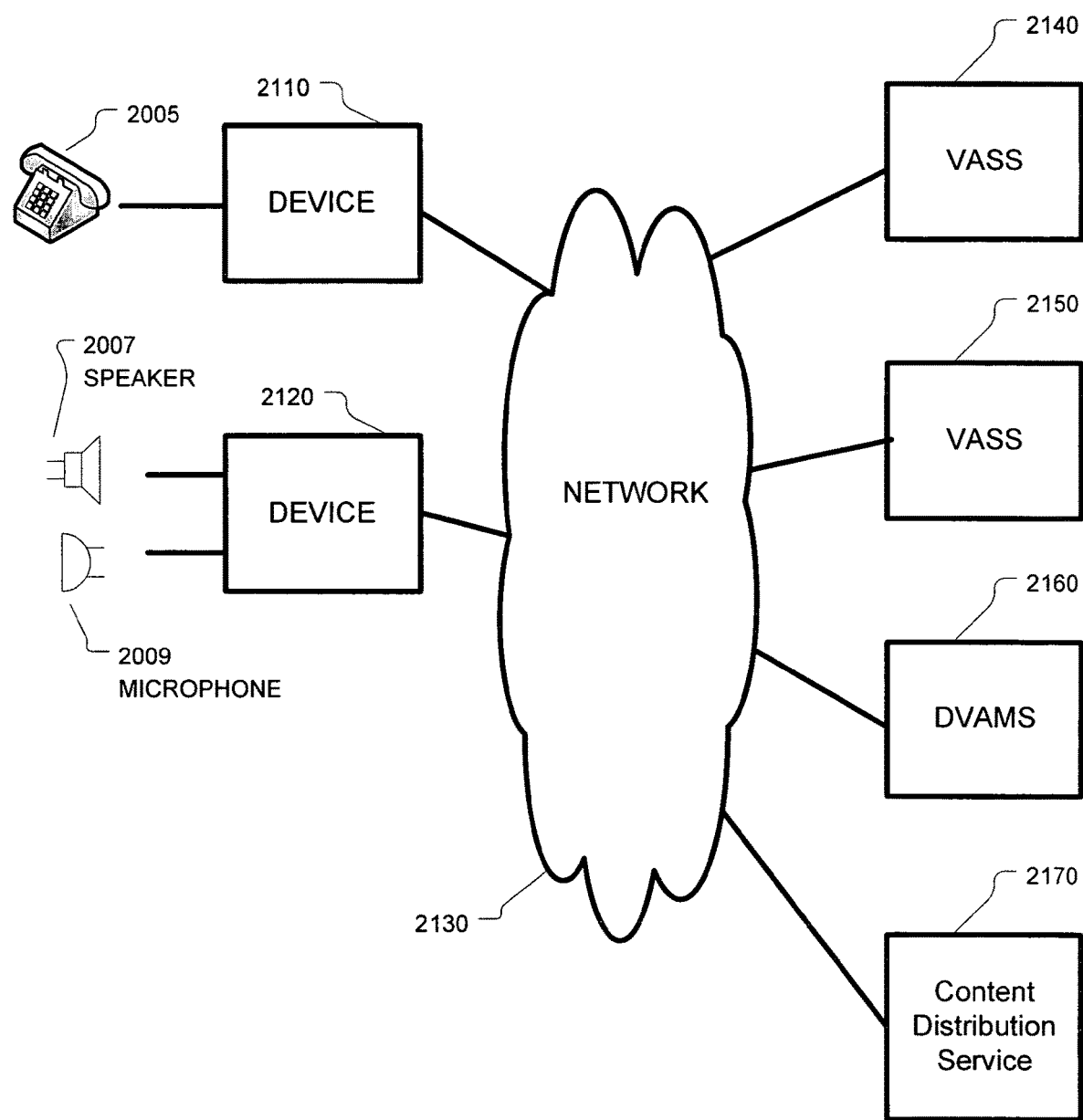
FIG. 2B is a diagram of another system embodying the invention.

Systems embodying the invention, as shown in FIGS. 2A and 2B, will be referred to as having a Distributed Voice Application Execution System Architecture (hereinafter, a "DVAESA"). Thus, the term DVAESA refers to a system and method of providing voice application services, in a distributed fashion, over a network, to a customer device. Such a system is closely managed by a centralized system to, among other things, ensure optimum performance, availability and usability. In some of the descriptions which follow, there are references to "DVAES-enabled" equipment or local devices/device. This means equipment and/or software which is configured to act as a component of a DVAESA embodying the invention.

A user would utilize an audio interface device to access the DVAESA. In the embodiment shown in FIG. 2A, a first user's audio interface 200 comprises a microphone and speaker. A second user audio interface 201 comprises a telephone. The telephone 201 is also connected to the same user local device 210 as the first user audio interface. A third user's audio interface 202 could also comprise a telephone. This telephone 202 could be a regular wired telephone, a wireless telephone or even a cellular telephone. The DVAES-enabled devices may support multiple audio interface devices, and the multiple devices could all be of the same type, or multiple different types of user audio interfaces could all be connected to the same local device.

Each user would also make use of a local DVAES-enabled device that would act to deliver or provide VAs to the user through the user's audio interface. The local DVAES-enabled devices would include a voice browser capable of performing voice applications that have been distributed over the network, some of which may have speech recognition functions. Such voice applications could be pre-delivered to the local DVAES-enabled device, or the voice applications could be fetched in real time. Such voice applications are personalized to the user and optimized for the device. In the embodiment shown in FIG. 2A, each of the user local devices 210, 212, 203 are coupled to the respective user audio interfaces, and to the data network.

In some embodiments of the invention, a user audio device and a DVAES-enabled device could be integrated into a single electronic device. For instance, a PDA with cell phone capability could also incorporate all of the hardware and software elements necessary for the device to also act as the DVAES-enabled equipment. Thus, a single user device could function as both the DVAES-enabled equipment that communicates with the network, and as the user audio interface. The user local device 203 shown in FIG. 2A is intended to illustrate this sort of an embodiment.

Also, in FIG. 2A, various lines connect each of the individual elements. These lines are only intended to represent a functional connection between the two devices. These lines could represent hard-wired connections, wireless connections, infrared communications, or via any other communications medium that allows the devices to interact. In addition, in some instances the connections could be continuous, and in others the connection could be intermittent. For instance, an audio interface and a user local device could be located within a user's vehicle. In such a case, the local device within the vehicle might only be connected to the network through a cellular telephone network or through another type of wireless network when such connectivity is required to provide a user with services. In a similar embodiment, the local device in the user's vehicle might only link up to the network when the vehicle is parked at the user's home, or some other location, where a wireless connection can be implemented.

Also, the user audio interface 202 shown in FIG. 2A could be a cell phone that is capable of interacting with the normal cellular telephone network. However, the cellular telephone might also be capable of interacting with the user local device 212 via a wired or wireless connection. Further, the cellular telephone 202 might be configured such that it acts like a regular cellular telephone when the user is away from home (and is not connected to the local device 212). But the cellular telephone might switch to a different operating mode when it is connected to the local device 212 (when the user is at home), such that all incoming calls to that cell phone are initially received and processed by the local device 212. The DVAESA also would include some network-based elements. As shown in FIG. 2A, the network-based elements could include a VA rendering agent 240, a network storage device 242 and a system manager 244. Each of these network-based elements would be connected to the data network.

Also, although they would not technically be considered a part of the DVAESA, there might also be some third party service providers 250, 252 which are also connected to the data network, and/or to the telephone network. As explained below, the VAs may enable the users to interact with such third party service providers via the data and telephone networks.

When a DVAESA as shown in FIG. 2A is configured, VAs would be "rendered" by the VA rendering agent 240, the output of the rendering process would be rendered VAs. These rendered VAs may be stored on the Network Storage Device 242, or be distributed or delivered to a DVAES-enabled Device. "Rendering" refers to a process in which a generic VA is personalized for a particular user and/or one or more particular DVAES-Devices to generate Rendered VAs. The system manager 244 could instruct the VA rendering agent 240 to render a VA for a particular user, or such rendering request could originate from the DVAES-enabled Device. The DVAESA network data storage element 242 could be used to store generic VAs, rendered VAs, or a wide variety of other data and resources (e.g. audio files, grammars etc).

As mentioned above, the VA rendering agent would personalize a generic VA during the rendering process. This could take into account personal traits of the individual user, information about the configuration of the local device(s), or a wide variety of other things, as will be explained in more detail below. The information used to personalize a VA during the rendering process could be provided to the VA rendering agent at the time it is instructed to render the VA, or the VA rendering agent could access the information from various data storage locations available via the data network.

The user's local devices would typically be inexpensive computing devices that are capable of running a voice browser and performing speech recognition capable rendered VAs. In many instances, the local device would be physically present at the user's location, such as a home or office. In other instances, however, the local device could be a virtual device that is capable of interacting with one or more user audio interfaces. As mentioned above, the local devices may also store rendered VAs, and then act to perform the rendered VAs to the user's audio interface. The user local device could be a customer premise device that is also used for some other function. For instance, the local device could be a cable modem or set-top box that is also used to connect a television to a cable network, however, the device would also be configured to perform VAs for the user via the user's audio interface.

In one simple embodiment of the invention, a local low-power device 212 would be linked to a user's telephone 202. The local device 212 would also be linked to the Internet 220 via a medium to high speed connection, and possibly to the telephone network 230. The user could speak commands into the telephone 202, and those spoken commands would be processed by the local device 212 to determine what the user is requesting. In some instances, the local device 212 may be able to satisfy the user's request. In other instances, the local device 212 might need to request information from a VA Rendering Agent 240 to satisfy the user's request. If that is the case, the local device 212 would send a query over the data network 220 to the VA Rendering Agent 240 for some type of content. The requested content would be returned to the local device 212, and the local device 212 would then provide the content to the user via the user's telephone 202. In other instances, the local device may be able to query other network-connected elements which are not a part of the DVAES Architecture, and those other elements would return the requested data to the local device so that the data could be delivered to the user via the audio interface.

Depending on the VA being performed, the functions that are performed in response to a user request may not involve playing audio information to the user via the user's audio interface. For instance, the local device could be performing a VA relating to accessing e-mail. In this instance, a user's spoken request could cause the local device to act in a manner that ultimately results in the user's e-mail messages being shown on a display screen. In this instance, although the user makes use of a speech-based interface to obtain information and/or perform a certain function, the ultimate result is not the playback of audio, but rather display of an e-mail message.

The end result of a user request could take many other forms, such as the local device causing a certain action to be taken. For instance, the user might speak a request that causes the user's home air conditioning system, to be turned on. The list of possible actions that could be enabled by the local device is virtually endless. But the point is that the local device is able to provide a speech-enabled interface to the user, via the audio interface, to allow the user to accomplish a task.

In another simple embodiment, the user might pick up his telephone 202 and speak a request to be connected to another person's telephone. The local device would interpret the user's spoken request, and then take steps to place a telephone call to the person identified by the user. This might involve connecting the user via the telephone network 230, or connecting the user to the requested party via a VoIP call placed over the data network 220.

It is also worth noting that when a user is connected to the DVAES architecture, the VAs provided by the system can completely replace the dial tone that people have come to associate with their telephones. The moment that a user picks up his telephone, he will be launched directly into a voice application that is provided by the system. In the past, this may have been technically possible, but it was always accomplished by making use of the traditional phone system. For instance, one of the prior art centralized voice services platforms would have been capable of ensuring that the moment a user lifts his telephone, that user was immediately connected to a central voice services platform that would guide the remainder of the user's experience. But this was always accomplished by establishing an immediate voice channel between the user's telephone and the central voice services platform. And to accomplish that, it was necessary to involve the telephone carrier that would link the user's telephone to the voice services platform. In contrast, with the DVAES architecture, one no longer needs to make any use of the telephone carriers to provide this sort of a service. And, as noted above, the user can still be easily connected to the regular telephone network if he needs to place a call.

In the same vein, in the past, whenever a user wanted to have a third party service answer his telephone calls, as in traditional voice mail systems, it was necessary to involve the carrier in routing such calls to a third party service. Now, when a call is made to the user's telephone, the DVAES architecture makes it possible to answer the call, and take voice mail recordings, without any further involvement of the carrier. Here again, the DVAES architecture makes it possible to eliminate the services of the telephone carrier.

In both the examples outlined above, the involvement of the carrier necessarily increased the cost of providing the voice services. Because the carrier can be eliminated, the same sorts of voice services can be provided to a user for a significantly reduced price. And, as explained below, the services can be delivered with greater performance and with new and better features.

In a DVAESA embodying the invention, as outlined above, rendered Voice Application processing is performed on the local device and the associated voice recognition functions in most cases may also be performed on the local device. For this reason, there is no need to establish a dedicated duplex audio link with a remote high end computer. Also, because the local low-power device is coupled to a data network such as the Internet, it can rapidly obtain Rendered Voice Applications and associated data from various remote sources in order to satisfy user requests. For these reasons, the simple low-power local device allows one to provide the user with speech recognition enabled Voice Applications without the need to create and maintain a high end speech service platform with multiple telephone line access equipment.

As noted above, the local device could also use the network to obtain access to various other physical elements to effect certain physical actions, such as with the home air conditioner example given above. In this context, the other physical elements could be connected to the network, or the local device could have a local connection to physical elements that are also located on the user's premises. For instance, the local device could have a hard-wired or wireless connection to many different elements in a user's home or office that allow the local device to control operations of the physical elements. In other embodiments, the piece of physical equipment could act as the local device itself.

One obvious advantage of a DVAESA over prior art voice service platforms is that a DVAESA embodying the invention can provide VAs to users without any involvement of a PSTN, VoIP, Peer-Peer carrier. The instant the user picks up his telephone handset, he will be interacting with the DVAESA, not the telephone system. A large number of VAs could be accomplished without ever involving a telephone carrier as the Voice Application is delivered and provided on the local device. Because the user can directly access the DVAESA without making a telephone call, the operator of the DVAESA will not need to pay a telephone carrier in order to provide the service to users.

As noted above, if the user wishes to place a telephone call, this can be easily accomplished. But there is no need to use a telephone carrier as an intermediary between the user and the DVAESA. This has multiple positive benefits.

Also, for a multitude of different reasons, a DVAESA will be less expensive to deploy and operate than the prior art central voice services platforms. To begin with, because the DVAESA can provide services to users without a telephone link, the DVAESA operator no longer need to purchase and maintain multiple telephone line ports into the system.

Also, the types of equipment used by the DVAESA are inherently less expensive to deploy and manage than the equipment used in a central voice services platform. A DVAESA embodying the invention uses relatively inexpensive network appliances that can be located anywhere, and that can be deliberately distributed over a wide area to enhance reliability of the system. In contrast, a central voice services platform requires expensive and specialized telecom equipment like telecom switches, VoIP Gateways, Media Gateways with DSP and Telephony Processing, IVR servers, and centralized ASR and TTS Engines. The central voice services platforms also require more intensive management and provisioning than a DVAESA, and this management must be provided by highly skilled personnel as most of the equipment used is highly proprietary in nature. In contrast, the DVAESA is largely managed by an automated management system, as will be described in detail below. A prior art central voice services platform is only able to simultaneously service a limited number of users As noted above, in the prior art central voice services platforms, a dedicated voice link, via a telephone call, is maintained for each connected user. Once all lines are connected to users, no additional users are able to access the system. Hence the maximum number of simultaneous users that can be supported at any given time is equal to the lesser of the number of access lines or the number of associated telephony/IVR ports an operator maintains.

In contrast, a DVAESA embodying the invention has a very high limit on the number of users that can be simultaneously serviced. In a DVAESA embodying the invention, the moment a customer picks up his telephone he will be connected to the system. Thus, a DVAESA embodying the invention is "always on." Also, much of the interactions between the user and the system are handled directly by the local device on the customer premises. If the local device cannot immediately service a user request, and additional information is needed, the local device may make an synchronous or asynchronous request over the Internet. Typically, the information will be quite rapidly returned and played to the user. Thus, even if there is a small delay, the user is nevertheless still connected to the voice services system.

With the DVAESA model, the same number of server assets can handle data requests from a much larger number of users as compared to the prior art central voice services platform. This is also another reason why a DVAESA is less expensive to deploy and maintain than a prior art central voice services platform.

In addition to being easier and less expensive to deploy and maintain, a DVAESA embodying the invention can also scale up much more quickly and at a lower cost as new users are added to the system. To begin with, because the DVAESA does not require dedicated telephone lines to operate, there is no cost associated with adding additional telephone ports to the system to accommodate additional users. Likewise, as new users are added, there are no new additional telecommunications expenses for more connect time or access. In addition, for the reasons noted above, the equipment used by the system is far less expensive than the equipment used in a central voice services platform. Thus, adding any new equipment and users is less expensive for a DVAESA. Moreover, because it requires less equipment to service the same number of users in a DVAESA, there is much less equipment to purchase and maintain for each additional 1000 users.

A DVAESA embodying the invention is inherently more reliable than a prior art central voice services platform. Because the assets of a prior art system are typically located in a few physical locations, power outages and other physical problems are more likely to prevent users from being able to use the system. In contrast, a DVAESA can have its equipment distributed over a much wider area to reduce these problems. The points of a failure of a DVAESA can be highly localized and it is very cost effective to replicate DVAESA equipment.

Moreover, the underlying nature of the DVAESA makes it easy to connect multiple redundant servers to the network, so that in the event one or more assets fail, redundant assets can step in to take over the functions of the failed equipment. This was difficult to do in prior art central voice services platforms, and even when it was possible to provide redundant capabilities, the cost of providing the redundant equipment was much higher than with a DVAESA.

In addition, a prior art central voice service platform needs a telephone carrier to provide access to the users. If the telephone carrier has a service outage, the prior art system cannot function. In contrast, a DVAESA does not have any reliance on a telephone carrier.

The only network required to provide the DVAESA is the data network like the Internet. The user in most cases will not experience an interruption to access to the voice services of a DVAESA, even if there is an outage that disables the local device's access to the Internet. The local device could potentially perform some of the applications without connecting to the network. This indicates that for some Voice Applications in the DVAESA, it may be sufficient for the local device to have intermittent access to the Internet.

The architecture of a DVAESA makes it inherently able to deliver certain types of VAs with vastly improved performance. To use one concrete example, as noted above, when a central voice services application is attempting to deliver the same audio message to a large number of users, the central voice services application must place a telephone call to each user, using a dedicated phone line, and deliver the message. Because the central voice services platform only has a limited number of outgoing lines, it can take a significant amount of time to place all those calls.

In contrast, in a DVAESA embodying the invention, it is not necessary to place any telephone calls to deliver the audio message to users. Instead, a server which is part of the system can push instructions to play the audio message, and the message itself (the message could be stored in advance of when the event to deliver the message occurs), to each of the local devices, and the local devices can then play the messages for each individual user. In variations on this theme, the server might only send the instruction to play the message, along with a reference to where a copy of the audio message is stored. Each local device could then download a copy of the message from the indicated location and play it for the user. Regardless, it would be possible for the DVAESA architecture to deliver the audio message to all the users in a small fraction of the time that it would take the prior art central voice services platform to accomplish the job.

Moreover, as also explained above, while the prior art central voice services platform is making calls to deliver audio messages to a plurality of users, it is tying up its phone lines, and thus its capacity to allow users to call in for services. In contrast, when a DVAESA is delivering audio messages to a plurality of users, the users are still able to access their voice services for other purposes.

As another example of how a DVAESA embodying the invention delivers better performance than prior art central voice services platforms, recall the earlier discussion about what happens when a user is logged into a first voice services platform, but wants his call to be transferred to a live operator, or a second provider's voice services platform. It was costly to enact a transfer, and the transfer either relied on features of the telephone carrier, or the first voice services platform had to establish a second call, using a second dedicated line, and then bridge the two calls.

In contrast, if a user is interacting with a VA on a DVAESA embodying the invention then he is not yet connected to anything via the telephone network. If the user wishes to be connected to a live operator, the DVAESA can simply setup an outgoing telephone call from the user's phone. In fact, it might even be possible to connect the user to the operator or third party voice service platform using the network. Thus, enacting this sort of transfer is far easier with a DVAESA as compared to the prior art central voice services platform.

A DVAESA embodying the invention also makes it possible to deliver many new voice applications and services that could never have been provided by the prior art central voice services platform. Several examples are provided below. In most cases, it is the underlying differences in the architecture of a DVAESA embodying the invention, as compared to the prior art voice services platforms, which make these new services possible.

In the past, the user would either need a telecom provider or a voice services provider to intercept incoming calls and provide voice services like an auto attendant, call screening, or voice messaging. Such call services were possible, but were expensive (feature and toll charges) and complicated to operate as they needed the constant support of the service provider (due to technology complexities). Such services also usually required cumbersome touch tone sequences to enact and control the services. The DVAESA makes such services available to the user in a very cost effective manner, and the services can be easily controlled using the local device powered by Voice Applications that are distributed over the network.

In another example, the user could configure a voice application to run constantly in the background, and then take a certain action upon the occurrence of a specified event. So, for instance, the user could set up a voice application to break into an existing telephone conversation to notify him if a particular stock's trading price crosses a threshold. In this scenario, the voice application would periodically check the stock price. If the threshold is crossed, the voice application could cause any existing telephone call that the user is on to be temporarily suspended, and the voice application would then play the notification. The voice application could then return the caller to his call. This sort of a voice application would also be very complicated to provide under the prior art central voice services platform.

The graceful integration of advertising messages is another example of how a DVAESA embodying the invention can provide services that were impossible to provide with prior art central voice service platforms. As an example, if the user lifted the telephone and spoke a command that asked for options about ordering a pizza, the system could respond with a prompt that said, "to be connected to Pizza Shop A, say one; to be connected to Pizza Shop B, say two. By the way, Pizza Shop A is having a two for one special today." Thus, the advertising message could be gracefully incorporated into the played response. Also, the advertising message would be highly context relevant, which would make it more interesting to advertisers. Thus, advertising revenue could be collected by the operator of the DVAESA system.

A DVAESA embodying the invention could also be used to rapidly collect data from a very large number of users in ways that would have been impossible with prior art central voice services platforms. In this example, assume that a television program is currently airing, and during the program, viewers are invited to vote on a particular issue. In prior art systems, the users would typically place a telephone call to a central voice services platform and make a voice vote. However, as noted earlier, prior art voice services platforms are only able to talk to a limited number of callers at the same time because the callers must be connected by dedicated phone lines.

In a DVAESA embodying the invention, the user might be able to pick up the phone and say, "I want to vote on issue X." The system would already know that viewers of a television program had been invited to place a vote, so the system could immediately take the user's voice vote. The system could also tabulate the votes from all users making similar voice votes, and then provide the voting results to the television show producers in real time. Because so little actual information is being exchanged, and the exchanges are made over the Internet, thousands, and perhaps even millions of votes could be received and tabulated in a very short period of time. This would have been impossible with prior art central voice services platforms. Furthermore, a DVAES can distribute a fully featured voice application that not only plays the message, but further solicits feedback from the user, optionally tailors the interaction with the user, and may record any user feedback or responses. Furthermore, if the producers of the television show were willing to pay a fee to the operator of the DVAESA, the system could be configured such that as soon as viewers are invited to cast a vote, and for the duration of the voting period, anytime that a user of the DVAESA picks up his telephone to access the system, the system would first respond with the question, "would you like to vote on issue X?" This would be yet another way to derive advertising or promotional revenue from the DVAESA.

There are countless other ways to exploit the architecture of a DVAESA embodying the invention to accomplish tasks and to perform VAs that would have been impossible using the prior art central voice services platforms. The above examples are merely illustrative.

A DVAESA embodying the invention also allows for much greater personalization of the voice applications themselves than was possible with prior art central voice services platforms. In addition, the architecture allows the users themselves to control many aspects of this personalization.

To begin with, as explained above, in a DVAESA a VA Rendering Agent is responsible for customizing voice applications, and then delivering the customized voice applications to the local devices at the customer sites. Thus, the basic architecture assumes that each user will receive and run personalized versions of voice applications. This difference alone makes it much, much easier to provide users with personalized voice applications than prior art central voice services platforms.

The VA Rendering Agent could personalize a voice application to take into account many different things. For instance, the VA Rendering Agent could access a database of user personal information to ensure that a VA takes into account things like the user's name, his sex, age, home city, language and a variety of other personal information. The VA Rendering Agent could also access information about the capabilities of the local device at the customer's location that will be providing the VA, and possibly also the type of audio interface that the user has connected to the local device. The VA Rendering Agent could then ensure that the customized version of the VA that is provided to the user's local device is able to seamlessly and efficiently run on the local hardware and software. The VA Rendering Agent could also take into account user preferences that the user himself has specified. For instance, the VA could be customized to play audio prompts with a certain type of voice specified by the user.

Another important way that VAs could be personalized is by having the DVAESA track how the user is interacting with the system. For Example if the user has a certain type of accent or has a certain pattern of use or has a certain type of background noise, the VA Rendering Agent could take these factors into account on an on going basis to ensure that the customized VAs that are sent to the user are tuned to the user. The system might also note that whenever a three choice menu is played to the user, the user always makes the third selection. In that case, the VA Rendering Agent might be directed to re-render the VA so that the VA presents the third option first, instead of last.

There are any number of other ways that VA's could be customized or personalized to take into account aspects of individual users. And these customizations are easily and automatically accomplished by configuring the VA Rendering Agents to automatically incorporate these personalizations when delivering VAs for users. Because the DVAESA is configured so that each individual user may have his own versions of VAs, preferably stored on his local devices cache, this personalization is not difficult to accomplish. Such personalizations are complimented by the continuous analytics process that is being performed on DVAESA data. This data is collected during the on going functioning of the system and is provided by all DVAESA components. After collection, the data is analyzed, and the results of the analysis are used to continuously tune and improve the functioning of the system on an individual user-by-user basis.

A DVAESA also allows for better, more direct billing for delivery or usage of services. Because there is no telephone company acting as an intermediary, the operator of a DVAESA can directly bill users for use of the system. Also, the way the system is configured, the user can select individual services, which are then provided to him by rendering a VA and loading it on the user's local equipment. Thus, the user can tailor his services to his liking, and the operator of the DVAESA has an easy time tracking what services the user has. For all these reasons, it is much easier to bill the user for use of the services.

Another benefit that flows from the DVAESA model is the ability of a user to access services provided from two different DVAESA operators on a single piece of local equipment. As will be explained in more detail below, a first DVAESA operator could load a first set of VAs onto the user's local equipment, and a second DVAESA operator could load a second set of VAs onto the same piece of operator equipment. For instance, the first DVAESA operator could be one that provides the user with services related to his business, and the second DVAESA operator could be one that provides the user with services relating to the user's personal life. There is no inherent conflict in both having two different sets of VAs loaded onto the local device. And each DVAESA operator can thereafter maintain and update their respective VAs. Likewise, the user can cause both sets of VAs to be loaded on a first device at his office, and a second device at his home. This allows the user to easily and immediately access services from either operator, regardless of his present location. This sort of flexibility would also have been completely impossible in prior art central voice services platforms.

A DVAESA can also provide enhanced security measures compared to prior art central voice services platforms. For instance, because the DVAESA is interacting with the user via spoken commands, it would be possible to verify the identity of a user via a voice print comparison.

In addition, and as will be explained in much greater detail below, the individual local devices can be identified with unique ID numbers, and credentials verifying the identity and permissions of users and devices can all be created and stored in various locations on the system. By using these unique identification numbers and certification files, one can ensure that only authorized users can access sensitive information or perform sensitive functions.

The foregoing explanation has been focused on the differences between a DVAESA embodying the invention and a prior art central voice services platform, and the inherent advantages that are offered by the DVAESA. In fact, there have been some prior attempts to provide speech recognition enabled voice applications to a user via a device that is located in the user's home or office. However, none of the prior art attempts ever contemplated the full distributed architecture of a DVAESA embodying the invention, in which network assets cause personalized VAs to be rendered and delivered to local devices, and wherein an overall management agent controls the system assets.

In addition, most prior attempts focused on the use of speech recognition software that was loaded onto a typical desktop PC or laptop computer. As will be explained immediately below, the use of PCs and laptops has many inherent disadvantages which are overcome by a DVAESA embodying the invention.

To begin with, the cost of a PC or laptop computer is much greater than the projected cost of a local device embodying the invention. In many embodiments of the invention, the local device will not include a display screen, a keyboard, speakers, or any of the other typical peripheral devices associated with PCs. In addition, a local device embodying the invention need not be capable of performing any functions other than the speech recognition enabled VAs. For all these reasons, a local device embodying the invention can be produced and delivered to a customer for a fraction of the cost of a PC or laptop computer, and associated speech recognition software.

In addition, a simple local device embodying the invention is likely to be far more reliable than a PC or laptop computer running specialized software. As is obvious to those skilled in the art, a typical home or office PC is used for many different functions, is frequently used by multiple different individuals, and it is exposed to all sorts of potential problems in the form of computer viruses and physical risks. As a result, the typical PC or laptop computer cannot provide the "always-on" type of reliability that we associate with telephones, cell phones and other simple computing devices. For these additional reasons, a simple local device embodying the invention will be much more reliable than a PC or laptop running specialized software.

In addition, in the prior art systems, the user would typically need to load and configure the specialized speech recognition software onto his PC before he could begin using speech enabled voice applications. This often requires a relatively high degree of technical ability. In contrast, and as will be explained below, a simple local device embodying the invention can be plugged into a telephone jack and an Internet connection, and associated systems supporting the local device can automatically handle all the required registration and configuration tasks. This sort of simple setup makes systems and methods embodying the invention far easier to use than prior art systems that utilize specialized software running on PCs or laptops.

Another place that speech enablement is found is in consumer electronic devices. Examples could include cell phones that are capable of hand-free dialing, or perhaps GPS devices that are used in vehicles and that allow a user to control the GPS unit using voice commands. Here again, the DVAES Architecture embodying the invention also provides many benefits and advantages compared to the speech recognition systems found in these sorts of consumer electronic devices.

In consumer electronic devices, the speech recognition engines are necessarily designed to be usable by a large number of different users. For this reason, they are designed to be usable by "the lowest common denominator." Basically, this means that the functionality must be very easy to understand, and that the voice prompts and voice inputs must be very simple and predictable. In these devices, the user's responses are merely compared to a simple list of acceptable responses. If there is no match, the device has no way of understanding the user's response or of asking a different question to elicit more detail.

With the DVAES architecture, one can provide speech enabled consumer electronic devices which have greatly expanded capabilities. To begin with, as noted above, in a system embodying the invention, each individual user will be provided with a voice application that is specifically tailored to their characteristics and needs. And no special device training or complex setup procedures are required to provide that customized voice application to each user. The VA Rendering Agent automatically customizes the voice application when it is prepared and provided to the user's local device. Also, even if the initial voice application provided to the user is not efficient, as explained in more detail below, a system embodying the invention has ways of reviewing usage history to automatically improve and replace the original voice application with a new voice application that better serves the user's needs.

In addition, because the VAs are being rendered from a central rendering agent, the actual VAs can be more complex, and could be varied over time. For instance, if the system notes that a first user only needs a relatively simple VA to interface with the device, the VA rendering agent could load a simple VA on the user's device. But if a second user needs a more complex VA to effectively use the device, the system could ensure that a more complex VA with better and more detailed prompts is loaded onto the second user's device.

Furthermore, because of the network connection between the local device and the other elements of the system, such as the network data storage and other processing and data elements, the local device can provide a much more complex and sophisticated voice recognition interface than is possible with prior art consumer electronic devices. For instance, if the user's local device has difficulty interpreting a user response, the local device could enlist the aid of a more powerful speech recognition engine on a network server to help interpret the response. Because of the greater sophistication that is possible with a system embodying the invention, if the local device does not understand something, it can often ask another question of the user to clarify the situation. In addition, the local device can offer a greatly expanded vocabulary and speech processing by enlisting the assistance of network agents. For all these reason, a consumer electronic device that is coupled into the DVAES architecture can provide a much more sophisticated voice application than prior art devices which were not connected to a network.

In addition to the advantages described above, the inventors have developed a comprehensive system which supports and in some measure controls the local device present in a user's home or office. The comprehensive system which stands behind the local device, and the multitude of advantages that it provides as compared to the above-described prior art systems, will be fully described below. However, it is important to note that the Applicants are not aware of any similar comprehensive system which is designed and configured to support a simple low-powered device that is located at a user's home or office, so that the low power device can interact with the user via a customized speech enabled interface, and wherein that local low-powered device provides some or all of the actual speech recognition functionality.

Having now provided a broad overview of the how a system embodying the invention would operate, and the inherent advantages of a DVAESA system as compared to prior art systems, we will now turn to a slightly more specific description of the main elements of a DVAESA embodying the invention, with reference to FIG. 2B. In doing so, we will introduce some new definitions and terminology which will be used throughout the following detailed description. Once this more detailed overview is complete, we will then turn to a much more detailed description of preferred embodiments of each of the system elements, and descriptions of preferred methods of accomplishing various functions.

A DVAESA would be configured to deploy and utilize one or more Voice Application Agents (hereinafter "VAAs") which themselves enable the delivery of a VA through a local device that would typically be located in a user's home or office. In some instances, a VAA may be wholly resident on a single local device. In other instances, the functions of a VAA may be split between multiple portions of the overall system. Likewise, a single local device may only be hosting one VAA. Alternatively, a single local device may host multiple VAAs. These variations, and the flexibility they provide, will be discussed in more detail below. The important concept is that a VAA is the agent that is responsible for delivering or performing a VA for the user.

The network 2130 shown in FIG. 2B could be the Internet. However, in some instances, the network 2130 could be a public or private local network, a WAN, or a Local Area Network. In most instances, however, the network 2130 will be the Internet. Also, the network 2130 could also comprise portions of the PSTN, existing cellular telephone networks, cable television networks, satellite networks, or any other system that allows data to be communicated between connected assets.

The devices 2110 and 2120 appearing in FIG. 2B would be the local, relatively low-powered devices that are typically located at a user's home or office. As shown in FIG. 2, in some instances, a local device 2110 could simply be connected to the user's existing telephone. In other instances, the local device could be coupled to a speaker 2007 and microphone 2009 so that the local device can play audio to the user, and receive spoken commands from the user. In still other embodiments, the local device may be a standalone telephone, or be included as part of a cellular telephone, a computing device with wireless access, a PDA that incorporates a cellular telephone, or some other type of mobile device that has access to a data network. Details about various local devices and their capabilities will be provided below.

A system embodying the invention also includes components that deliver voice applications, data and other forms of content to the local devices. These components could include one or more Voice Application Services Systems (hereinafter VASSs). In the system depicted in FIG. 2B, there are two VASSs 2140 and 2150. A system embodying the invention could have only a single VASS, or could have multiple VASSs.

One of the primary functions of the VASSs is to render VAs and to then provide VA components to VAAs. In preferred embodiments, the VASS would provide customized VAs components to VAAs, upon demand, so that the VAAs can perform the customized VAs components for the user. The VASSs could personalize generic VAs based on known individual user characteristics, characteristics of the environment in which the VA components will be performed, information about how a user has previously interacted with the system, and a wide variety of factors. The VASS would then distribute the personalized VAs components to the VAAs so that the VAAs can perform the VAs components for the users. The distribution of the personalized VA components to the VAAs could also be accomplished in multiple different ways, as will be discussed below. A detailed description of the VASSs, their functions, and the multiple different ways that they can be configured into a system will be explained below.

A system embodying the invention may also include one or more Content Distribution Services (hereinafter a "CDSs"). This is an optional component that basically serves as a storage and content distribution facility. If a system embodying the invention includes one or more CDSs, the CDSs would typically provide network-based caching of content, such as VA components, configurations, DVAESA components, and other shared or frequently used content. The CDSs would be deployed throughout the network to help reduce network traffic latency, which becomes particularly noticeable in any speech interaction system.

The DVAESA components could broadly be identified as a Distributed Voice Application Execution System (hereinafter, a "DVAES"), and a Distributed Voice Application Management System (hereinafter, a "DVAMS") A DVAES comprises at least a VASS, one or more VAAs, and the underlying hardware and software platforms.

The system shown in FIG. 2B includes a DVAMS. The DVAMS handles a wide variety of management functions which include registering users, specific items of hardware and other DVAES components, directing the rendering, caching, distribution and updating of VAs components, organizing and optimizing the performance of system assets, and multiple other functions. The DVAMS may also include an interface that allows an individual user to customize how the system will interact with him, and what products and services the user wishes to use. The DVAMS would also provide an interface that allows system operators to manually control various aspects of the system. Details above the DVAMS are provided below.

As mentioned above, individual VAs could be stored on a VASS. A VA is then "rendered" by the VA generator of a VASS to produce personalized distributable VA components to one or more DVAES-enabled devices. This rendering process may make use of specific personal information relating to an individual user. A database of user personal information could be accessed by the VA or the VASS during the rendering process to allow the rendered VA components to be highly personalized to the user. The personalized VA components would then be distributed to a VAA located on one or more pieces of DVAES-enabled equipment which will be accessed by the user.

Figure 3:
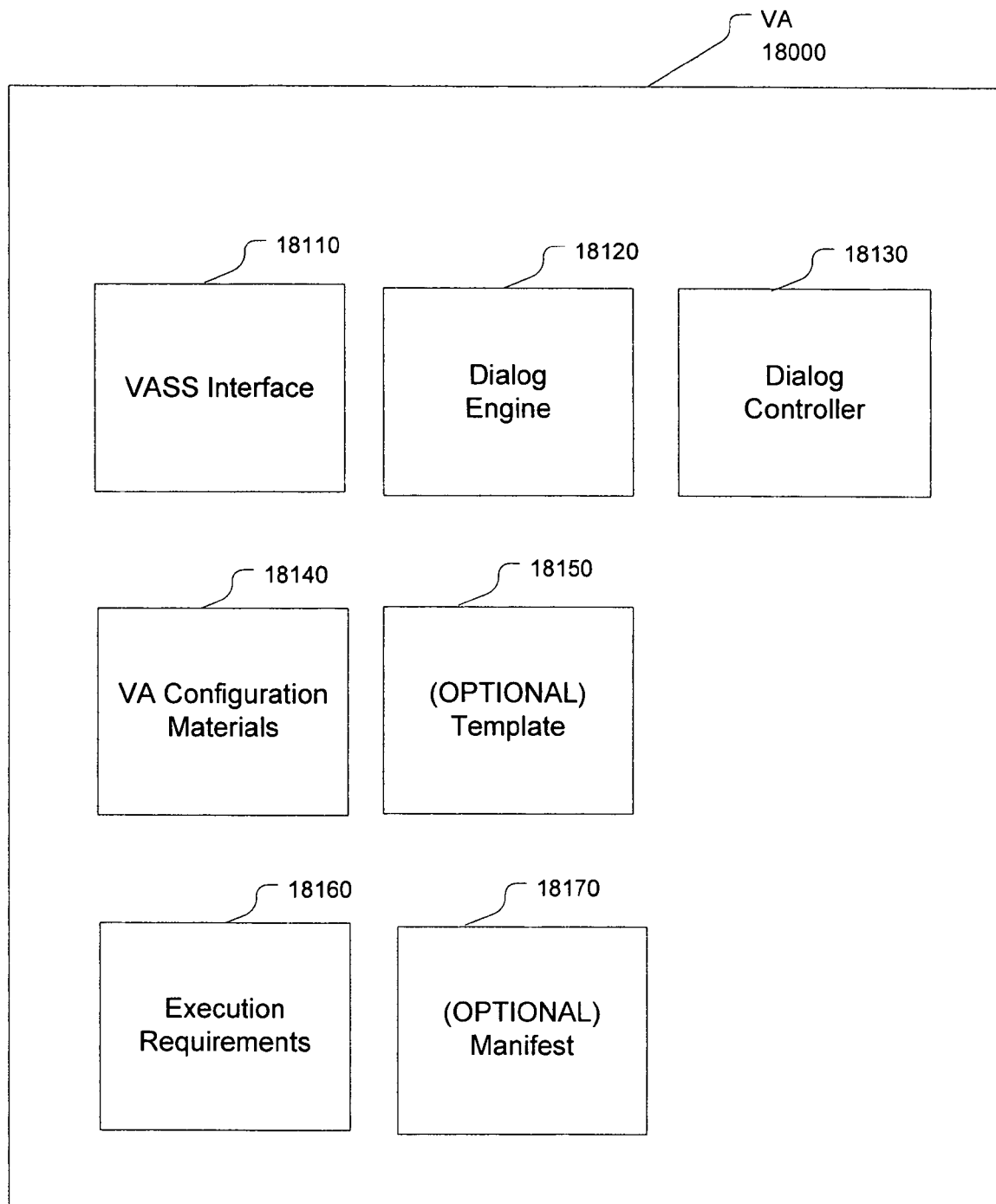
FIG. 3 is a diagram illustrating elements of a Voice Application embodying the invention.

FIG. 3 shows an illustration of an exemplary VA. The VA includes a VASS interface 18110, a dialog engine 18120, a dialog controller 18130, VA configuration materials 18140, an optional template 18150, a set of execution requirements 18160 and an optional manifest 18170.

The VA configuration materials comprise configuration data created during the deployment process. The VA configuration materials could include a deployment specification, which may include life cycle information for the VA, rendering constraints, rules, distributable VA components, and possibly a specification of the VASS storage location. The VA configuration materials could also include a dialog list, a dialog output specification (e.g., SALT, VoiceXML, or others), and optional dialog resources such as audio text, grammars and templates. The configuration materials might also include instructions specifying the flow between dialogs.

The execution requirements provide a description of requirements for execution of a VA during rendering and performance. For example, the execution requirements may name one or more data services that must be available during rendering, or may indicate whether the rendered VA components require access to a high-speed data connection during performance. The VASS Interface 18110 provides access to a VA's internal methods for rendering parts of specific VA components to the VASS. Examples of methods of the VASS interface that are provided to the VASS include generating full or partial VA components, pause generation, abort generation, and clean up generation. The VASS interface could also provide data access services to the VA. This could include data access to user profile data, DVAES performance data, application data and external data.

The VASS interface also provides the VA the capability to log detailed VA-specific events to the VASS OA&M Service. The VA Log items could include details of the VA rendering process, such as start time, end time, VA ID, and a Data Access Attributes component list. Additionally, the VA logs may include detailed error messages. The logging level provided by a VA may be configurable and may provide varying levels of logging in response to a configuration setting. A VA may also perform error notifications to the VASS OA&M Service. The error notifications may be configurable and may provide varying levels of error handling in response to a configuration setting.

The VA dialog controller 18130 is the component that receives the instruction to render the VA from the VASS interface. A dialog is a unit of interaction with the user. In its simplest form, a dialog could be the ability to play an audio file such as a greeting prompt. In more complex forms, a dialog could be the sequence of instructions, along with a speech recognition context specification (such as a. grammar or an n-best List). A dialog in the context of the VA is a dialog specification that defines what the dialog intends to perform, with no specific instructions about how the dialog will eventually be performed by a VAA. The dialog specification is Voice Browser or VAA agnostic.

The dialog controller is aware of all the dialogs, the flow, and the associated logic between dialogs in the VA based upon the VA configuration materials 18140. The dialog controller receives from the VASS partial or complete VA dialog rendering instructions. Based on such instructions, the dialog controller generates the specified dialogs with the help of the dialog engine 18120. The dialog controller also receives all the data from the VASS required by the dialog engine to produce a personalized distributable VA component. The process of data collection is performed by the VA generator.

The Dialog Engine 18120 of the VA is responsible for the creation of personalized and distributable VA components. The dialog engine receives an instruction from the dialog controller to render a specific dialog. Based on such an instruction, the dialog engine loads the dialog specification and begins to render the dialog. The rendering process binds a resource with a dialog. For instance, this could mean associating a prompt file with a dialog like a "welcome greeting." This could also be associating a grammar with the dialog, such as a list of names for a voice dialing VA. The association of the resource is done by the dialog controller based on rules and by accessing the VASS Data access interface.

In some cases, the dialog engine may create the resource. Some of the resources that could be created by the dialog engine include synthesized speech with the support of a TTS engine, compiled grammars based on the support of an ASR engine, and concatenation of audio files.

The dialog rendering process also includes transforming the dialog to the specified output format. As an example, the dialog engine, based on VA configuration materials, may render a distributable VA component in a specified format. In one embodiment, this distributable VA component could be rendered in accordance with the Voice XML specification. Alternatively, the VA component may be rendered in accordance with the SALT specification.

The dialog engine may use a template specification in the target standard as specified by the VA configuration materials, and complete the rendering once appropriate resources are generated and associated with the template. Upon completion of the rendering, the dialog engine generates an output that is in the form of a personalized distributable VA component. Such output is stored in the VASS storage, as instructed by the dialog controller. Once the dialog is "rendered," the dialog engine informs the dialog controller and waits for an instruction to produce the next dialog.

As mentioned, VA components are generated as an output of the VASS rendering process. VA components could be one of multiple different types. For instance, a VA component could be a "resource component" or an "interaction component."

Resource components are typically the most atomic form of VA components. Examples of resource components include audio files, and speech recognition grammars, and ECMA script segments/files. Resource components may be generated by the VASS. For instance, the TTS engine could generate an audio file, or a compiled grammar could be generated by an ASR Service. Alternatively, resource components may be provided by the operator. For instance, the operator could provide audio files.

Interaction components are logical constructs of instructions for a VAA to enable performance. Interaction components enable interactions with the Users. A simple interaction component could instruct the VAA to "Play an audio file." A complex interaction component could instruct the VAA to capture a User personal identification number, and then validate the spoken input. Interaction components reference resource components to successfully perform a VA. A VA interaction component instruction construct may conform to a standard specification, for instance VoiceXML or SALT. An example of such a construct is the <Prompt=foo.wav> Tag in VoiceXML that would instruct the VAA to play the Foo.Wav audio file as a prompt.

The optional manifest provides a description of the VA and its constituent pieces, and may include descriptions and cryptographic hashes for rendered VA components for use by cryptographic integrity checking algorithms.

With the foregoing overview, the discussion will now turn to details about many of the individual components of the system. Once the individual components have been explained, the discussion will return to a more global perspective, and the advantages of the DVAES architecture will be reviewed.

The Voice Application Services System

A Voice Application Services System (VASS) provides the combinations of software components that collaboratively enable the rendering of Voice Applications. The VASS Hardware could include proxy servers, web servers, application servers, load balancers, and other commercially available systems that are integrated to enable the rendering of Voice Applications. Foundation software for a VASS includes standard server based computing technologies such as Dot-Net, PHP, and Java.

As explained above, VAs are deployed on a VASS. The VASS uses the deployed VAs to render one or more VA Components. These VA Components are personalized and are distributable to one or more DVAES-enabled devices to be performed by a VAA.

Figure 4:
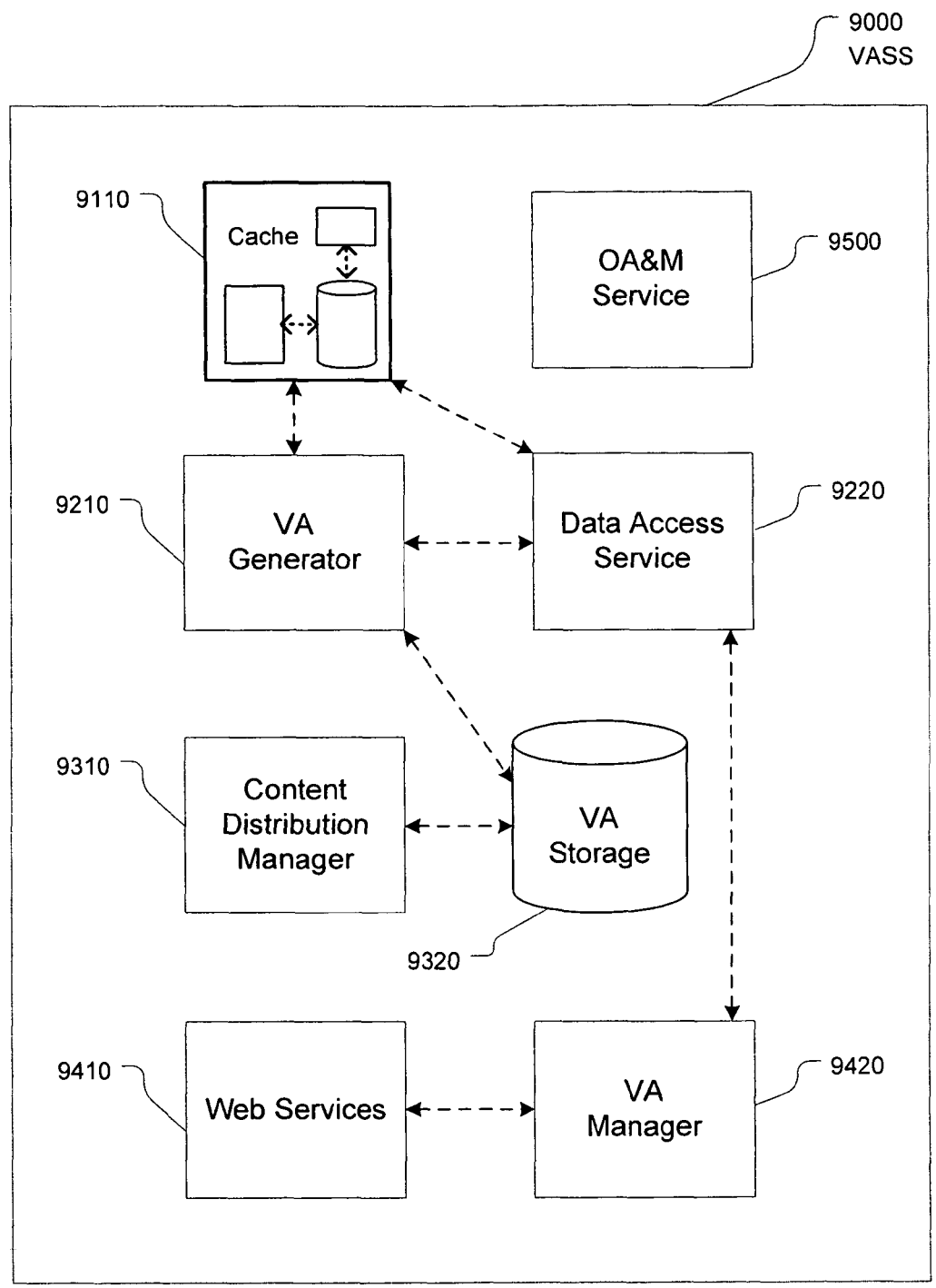
FIG. 4 is a diagram illustrating elements of a Voice Application Services System embodying the invention.

FIG. 4 illustrates one embodiment of a VASS 9000. The VASS comprises a Voice Application Generator 9210, a Data Access Service 9220, a Content Distribution Manager 9310, a Voice Application Manager 9420, a web service component 9410, an optional cache subsystem 9110, a Voice Application Storage 9320, and an OA&M Service 9500.

The VA generator 9210 implements the "rendering" process by which distributable VA components are created. It takes instructions and configuration parameters from one or more DVAMSs, combines them with third party information and user-specific personalization instructions, and produces a set of distributable VA components for use by a VAA loaded on one or more DVAES-enabled devices. The Data Access Service 9220 may provide an interface between the Voice Application Generator and a plurality of data sources, including DVAES-specific sources for personalization information, and public data sources.

The VASS could maintain and manage access to several data sources to enable aspects of the DVAES. The rendering process may require that systems external to the VASS be referenced and materials collected from one or more data sources for use in the rendering process. The Data Access Service provides the data collection and interface services that collect information from one or more data sources, reformats, if necessary, to a form usable by the VA generator, and then provides those materials to the VA generator. Information collected by the Data Access Service could fall into multiple different categories.

The information collected by the Data Access Service could include user profile data, user configuration information, and user-defined application specific preferences. User configuration information includes such data as account number, zip code, VDAE association(s), and allocated VAs. Some examples of user-defined application preferences include attributes of an address book for voice application dialing, and handling characteristics for re-direction to voice mail.

The information collected by the Data Access Service would also include performance data that is application-specific, VAA specific, environment specific, and configuration specific. The performance data could also include monitoring results and logging results. Application data is information collected or analysis results associated with the use of a VA in order to self-configure and operate effectively. The application data could also comprises volatile application specific information, such as the current number of unread emails, the number of new voice mail messages, a reminder in a calendar application, or information about specific reservations (for a reservation management VA). Application data may be obtained from one or more DVAMSs, VAAs, or other systems. Furthermore, the types of information in the DVAMS and in the DVAES-enabled device may be different, in that the DVAMS information may have had the above referenced analysis step performed on it, and the DVAES-enabled device data may comprise raw VA logs from a voice browser.

The Data Access Service also provides an interface to external data services to obtain external information. These services may include stock quotes, external email systems, information clipping services, and the like. In other exemplary embodiments, the Data Access Service may provide information from common information sources, such as news wires and RSS feeds.

For example, if a VA that is to be rendered is to provide a user a near-real time stock quote whenever they access the system, the VA generator recognizes the request for a stock quote while processing the VA, and personalizes the request using the user's specified stock symbol specified in the user preferences. The VA generator then requests a piece of content from the Data Access Service that represents the current stock price of the stock represented by the user's symbol. The Data Access Service obtains that information and provides a VA component to the VA generator that comprises the current stock price. The VA generator adds the reference to the Data Access Service component to the personalized VA, and causes the VA to be published. The Data Access Service, meanwhile, publishes the VA component to VA storage and starts a process in which the Data Access Service regularly updates the VA component with the current stock price and republishes the component for use by the DVAES.

The Data Access Service is especially useful in that some of the required content is stored in differing locations and in different formats. For example, user preference materials may be stored in a local database, cache, or directory of the registry component of a DVAMS, while dialog personalization materials may be scattered between a plurality of DVAMS and DVAES-enabled devices. The Data Access Service has a data transform capability in which it can transform the format of information from one format to another, and may optionally call external services to assist with the transforming. In the above example, the Data Access Service might call an external service provided by a DVAMS to analyze a user's raw logs obtained from a DVAES-enabled device in order to determine specific types of personalization required and to produce the necessary personalization information to enable the VA generator to personalize an aspect of a VA.

The VA Storage 9320 is local or network storage for rendered VA components. The VA storage is accessed by the VA generator and by the DVAMS. The VA storage in combination with the content distribution manager 9310 and/or the DVAMS are responsible for pushing rendered VA components to a content distribution service (CDS) or to individual DVAES-enabled devices. The VA storage is also accessed by the CDS or individual devices that may request content from the VA storage.

The Voice Application Manager 9420 and its associated web services 9410 provide a service by which un-rendered VAs may be provided to a VASS. These components are discussed in more detail below. The Voice Application Manager and its associated web portal interface provides for the collection and management of voice application configuration information. The VAM may include a web portal interface, a database, a directory or registry in which to store the application configuration information, and application logic to manage access to voice application configuration information. These types of data storage mechanism are well understood to those skilled in the art.

In at least one embodiment, the Data Access Service may make requests of the VAM for user preference and application configuration information in support of the VA generator. Additionally, the VA generator may also make requests of the VAM for needed personalization materials. These requests may be made directly to the VAM, or may be made using the web services portal provided by the VAM.

The optional cache subsystem 9110 provides a cache for obtaining information published by other VASSs, DVAMSs, or DVAES-enabled devices.

The Voice Application Storage 9320 is the primary storage for rendered voice application components prior to and post distribution. Voice application storage may be a disk store, a directory service, a content manager system, or other mechanism, as are well known in the art for storing voice application components in a manner in which they may be stored and retrieved by other system components.

Voice Application Storage optionally exposes an external interface so it may be accessed from other systems. The external interface may be a service (such a WEBDAV), a directory (such as LDAP), a database, or other method well understood to those skilled in the art.

A VASS may "render" a VA by producing a version of VA components that are customized to operate within the constraints of each DVAES-enabled device that the VA is allocated to. For example, rendering may generate VA components that take into account DVAES-enabled device limitations, such as system memory, the version of a VAA available on the device, historical or projected network performance, or other DVAES-enabled device factors.

The VASS may further customize each instance of the VA components with personalization information associated with a specific user or group of users. The personalization of VA components may also take into account. For example, if a specific voice/user interface paradigm (for instance user skill level=assisted, or user skill level=advances), or other personalization preference is specified, these changes are applied to the specified instance(s) of the rendered VA components. Also, user usage and behavior trends, and speech recognition grammar tuning results may also be taken into account during the rendering process to personalize the VA components.

Finally, the VASS makes the rendered VA components available to one or more DVAES-enabled devices, and facilitates the distribution of VA components through the CDS and caching components of the VASS and DVAES-enabled device to maintain the currency of the VASS components at each DVAES-enabled devices.

The VA generator could be activated by a VASS event listener, by the DVAMS or by a VAA request. The VASS event listener is a service that actively listens or monitors for events in DVAES and the DVAMS. The VASS event listener detects the occurrence of an event and initiates the rendering process. Alternatively, the DVAMS initiates the rendering process upon the occurrence of an event in a DVAES and/or the DVAMS. In some circumstances, an external service such as a VAA, could initiate the rendering process directly by issuing a request over the network.

The rendering process could be partial or complete. During partial rendering, only select voice application components could be rendered. The specific voice application components that are rendered are a function of the impact area based on a DVAES or a DVAMS event. Complete rendering is a process by which all components of a voice application are rendered. The motivation for rendering could be the creation of a new user or a configuration change in a device.

When a VA generator is notified of a change in the DVAES and/or the DVAMS, the generator loads the VA from the VA storage and executes the generation process for the VA to generate personalized instances of the VA components for distribution. If disparate devices require different renderings, the VA generator produces as many rendered instances of the VA components as required.

Figure 5:
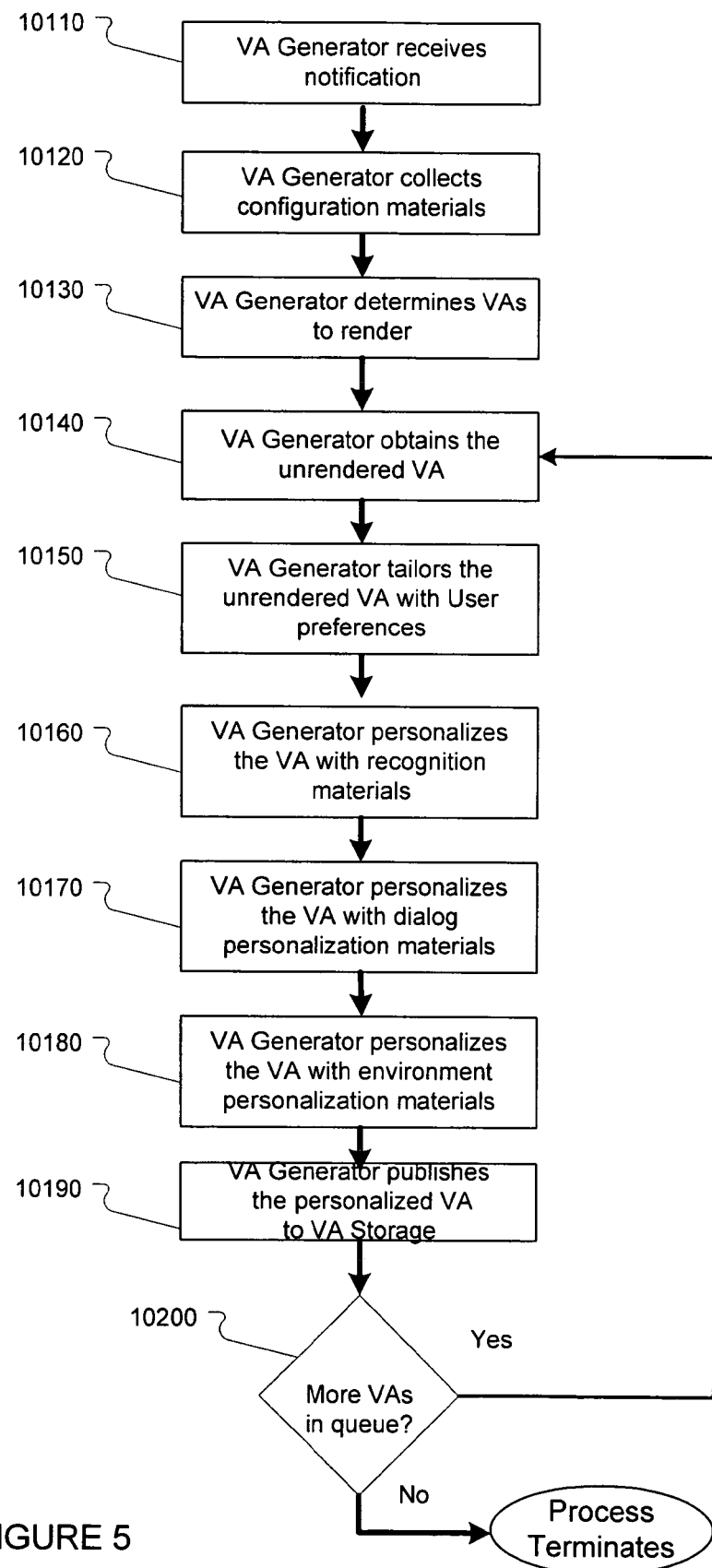
FIG. 5 is a diagram illustrating a method embodying the invention for rendering voice applications.

An example rendering process is shown in FIG. 5. In this process, a VASS is notified that something has changed, and that it is necessary to render a VA.

As shown therein, in step 10110, the VA generator receives a notification indicating that an aspect of data or content has changed. In step 10120, the VA generator collects relevant DVAMS, DVAES and VA configuration materials, and user specific personalization materials from various sources by calling the data access service of the VASS to obtain the materials. In some cases, the materials are already available on the VASS (e.g. in a local database, or in a cache). In other cases, the data access service must contact the appropriate service, database, or registry to obtain them.

Once the materials are collected, in step 10130 the VA generator determines the changed materials, and by inspecting the changed materials, determines the scope of the changes. After determining the scope of the changes, the VA generator determines the VAs that must be rendered in order to provide rendered VA components to the DVAES in accordance with the configuration and personalization materials.

Next, in step 10140 the VA generator loads the un-rendered VA from VA storage that is relevant to the notification. For each rendering of a VA that is required based upon the above change determination, the VA generator may take into account user preference materials, historical recognition performance, previous dialog interactions, and various device and environmental factors (e.g., network quality, background noise) associated with the environment (s) in which the VA is expected to be performed.

Then, in step 10150 the VA generator tailors a VA by associating the user's preference materials with a VA. The user preference materials may be used to adjust aspects of specific VA components, such as dialogs, language, audio, synthesized speech, and a variety of other items. In this way, a user may select the "sound and feel" of the voice applications that they are presented with. The user preference materials are obtained by the VA generator using the VASS's data access service, which in turn obtains the materials from the DVAMS. Alternatively, the personalization materials may be stored in one or more devices, in the CDS, or in an Internet application. The data access service locates these materials and makes them available to the VA generator.

The VA generator may then initiate the rendering of personalized VA components in one or more of three optional steps. The VA generator interacts with the dialog controller of the VA to perform each of the personalizations and to produce VA components. Personalization of VA components using these materials may be a multi-part process. In some embodiments, the VA generator performs both parts of the process as one operation. In other embodiments; the steps are performed in two distinct operations. Generally, the operations are one of collecting user activity information that relates to a user's prior interactions with a DVAES, and performing a first operational analysis upon this information to determine patterns of use, patterns of failure, and/or patterns of interaction. Then, a second operation is performed in which the VA is personalized based upon the results of the analysis. In this example embodiment, the process assumes that the analysis operation is already performed and the resulting personalization materials are made available to the VA generator.

For instance, the VA generator may create personalized VA components using recognition materials in step 10160. This results in a VA that has been personalized to account for prior experiences of a user with the ASR services available upon a user's DVAES-enabled device. Recognition personalization uses information collected from previous interactions with a user that identifies how a user has interacted with the ASR components in the past, and may include the specification of alternate ASR services, different grammars, or different recognition techniques.

In some embodiments of the invention, the VA generator requests the recognition personalization materials from a VASS's data access service, which in turn obtains the materials from information published by a DVAMS to a database, directory, or registry. In other embodiments, the recognition personalization materials are published from a DVAMS and are stored in a CDS, and may be obtained directly from a cache. In still other embodiments, the recognition materials are stored in a DVAES-enabled device and are obtained directly from the device by the VASS's data access service.

The VA generator may also optionally generate personalized VA components using dialog personalization materials in step 10170. This results in VA components that have been personalized to account for prior interactions between the user and the VA. Dialog Personalization can result in changes in the Voice User interface and the dialog flow of the VA.

Dialog personalization uses information collected from previous interactions with a user that identifies how a user has interacted with dialogs contained in VA components in the past. For example, the dialog personalization information may take into account the fact that in the past, a particular user always selects the third option in a list of information. Based on this fact, the order in which the options or information are presented can be changed. For example, if the user is presented with "you have 5 appointments, 2 emails, and 2 voice mails", and the user regularly selects the voice mail option, the dialog may be regenerated to present "you have 2 voice mails, 2 emails, and 5 appointments," or even "you have 2 voice mails and some other items, voice mail 1 is . . . ".

In some embodiments, the VA generator may request the dialog personalization materials from a VASS's data access service, which in turn obtains the materials from information published by a DVAMS to a database, directory, or registry. In other embodiments, the dialog personalization materials are published from a DVAMS to other DVAES systems and may be stored in a CDS, may be obtained directly from a cache, or may be obtained from one or more DVAES systems. In other embodiments, the dialog personalization materials are stored in a DVAES-enabled device and are obtained directly from the device by the VASS's data access service.

Further, the VA generator may also optionally generate personalized VA components with environmental personalization materials in step 10180. This results in VA components that have been additionally personalized to account for factors related to the anticipated performance environment. Aspects of the DVAES-enabled device(s) and VAA(s) to which the personalized VA components will be distributed are considered in this step.

Environment personalization materials use information collected about the environment that the personalized VA components will likely be performed in. These materials include VAA and DVAES-enabled device configuration information and other materials regarding network latency. These materials are used to adjust requirements for services that may not be available in specific devices and to determine which portions of a VA's components are already available without additional publishing of the components.

In step 10190, the VA generator then publishes the personalized VA components to VA storage or forwards it to the VAA. The completely personalized VA components are now considered "rendered" and they are published to VA storage or delivered directly to the VAA. Publishing to VA storage involves making a local copy of the rendered VA components in VA storage and informing the DVAMS and the Content Distribution Manager that an updated VA component is now available.

In some instances, it may be necessary to send rendered VA components to multiple different VAAs. This could occur when a user has multiple different local devices, and the user wants to be able to access his VAs from each of the multiple local devices. In this situation, the DVAMS would ensure that the rendered VA components are sent to all the user's VAAs on all the user's local devices.

In step 10200, the VA Generator determines if there are more VAs requiring rendering. If so, the process returns to step 10140, in which the next set of VA and personalization materials are selected for rendering. If not, the process terminates.

The Operations, Administration, and Monitoring service 9500 of the VASS is responsible for ensuring that the VASS components are working efficiently. The OA&M Service is also the DVAES component that interfaces with the DVAMS. The VASS's OA&M service provides services similar to the OA&M service of a VAA.

Upon start up, the OA&M Service loads configuration materials and establishes a connection with the DVAMS. The OA&M service could operate in an active mode and/or in a passive mode. In active mode, the OA&M service starts all the other services in the VASS based on the order specified in the configuration data. In passive mode, all the VASS Services self-start based on a startup routine in the OS. Once the services have started, they register with the OA&M.

The interface between the OA&M Service and the VASS services may be based on an API or a messaging protocol. Examples of messaging protocols that may be used include SNMP, RPC, SOAP, and TCP/IP Messaging. The connection between the OA&M service and the DVAMS may also be based on a network provisioning, communication, and monitoring protocols like SNMP or tr-069.

The OA& M Service, based on an external instruction, such as one from a DVAMS, a DVAES-enabled device, or service condition, may shutdown and restart the VASS components and services. Device and service conditions include such items as CPU load, available memory, and changes in configuration. The OA&M service may notify services to reload changed configurations as an alternative to a service shutdown and restart.

The OA&M Service may provide a heartbeat service in deployments that require one.

The OA& M Service may receive and store log and error events received from the VASS components and services.

The OA&M service may propagate such log and error information to the DVAMS and optionally to an additional network management system. Additionally the OA&M service may send a health heartbeat signal to the DVAMS.

The VASS may be implemented as a single system, or the components of a VASS may be distributed across a plurality of systems to provide redundancy and the necessary performance. Accordingly, each component of the VASS must register with a DVAMS before it may be used within a DVAES, and each VASS component reports its current operating status to a DVAMS on a periodic basis.

Each VASS component is registered with at least one DVAMS when it is first integrated as part of a DVAES. Registration is preferably automatic and performed at the component level when the VASS component is first instantiated. Once the address of a DVAMS is established by a VASS component, the VASS component connects to the registration service published by the DVAMS and registers itself. Preferably, the VASS component provides a unique machine ID along with IP address and port information as part of the registration process. Authentication optionally may be required in order to permit registration. Authentication techniques are well understood to those skilled in the art and may include hardware certificates, account/passwords, or other mechanisms. Once satisfied that the request is both valid and should be completed, the DVAMS updates its registration directory with the information provided by the VASS component, and enables the VASS component for use.

Each VASS component may be registered with multiple DVAMS systems. In some embodiments, each VASS component may be registered with a DVAMS associated with a specific DVAES. In other embodiments, where there is a plurality of DVAES implementations (for example, where two different, competing vendors have deployed DVAES architectures), a VASS component may register with separate DVAMSs associated with each of the DVAES deployments.

DVAES-Enabled Devices

The local devices that will typically be used at a user's home or office would be configured to host VAAs which perform VA components. In this respect, a DVAES-enabled device would typically be considered Customer Premise Equipment. Saying that a VAA deployed on the DVAES-enabled equipment performs VA components means the ordered processing of VA components, in which audio input is received and processed, and/or audio output is produced and/or actions are taken in accordance with the performance of voice application components.

One or more VAAs could be deployed on a single DVAES-enabled device. Also, in some instances, the functions of a single VAA might be shared between two or more such devices. The establishment and configuration of the VAAs on the DVAES-enabled equipment would be controlled primarily by the DVAMS, as explained in detail below.

In some embodiments of the invention, the DVAES-enabled device could be a dedicated network appliance, similar to a cable set-top box or a cable modem. In other instances, the DVAES-enabled device could act as both the host for one or more VAAs, and perform other functions. For instance, a DVAES-enabled device could be a part of common network and telecommunications devices such as VoIP telephony adapters, cable and DSL modems and routers, integrated access devices, fixed-line and wireless devices, dedicated network appliances, VoIP telephones, residential gateways, set top boxes, cellular telephones, automotive telematic devices, wearable computing devices, media center controllers, mobile computing devices (e.g. PDAs), or any other device which has network access.

Most existing customer premise equipment and consumer devices that could be DVAES-capable lack the DVAES components, configurations, and membership credentials that would allow them to participate in one or more DVAESs. Adding a DVAES-enablement layer of software components and configuration materials would make them DVAES-enabled, and thus capable of participating within the DVAES architecture. In many instances, it would probably not be feasible to retrofit existing devices so that they are DVAES-enabled, although this is certainly possible. However, it should be no problem to add the DVAES-enabling elements to many different types of commonly sold and distributed customer premise equipment and/or consumer electronics. Thus, the Inventors envision that in the future, many existing types of commonly sold and distributed customer premise equipment and/or consumer electronics could be sold, pre-configured, with all the elements necessary for the device to be integrated into a DVAES. This would provide an easy way for customers to activate a DVAES service using equipment that is already present in their home.

It is appreciated by those skilled in the art that DVAES-enabled devices may be virtualized.

Furthermore, the DVAES architecture components may integrate with and support components of extant legacy systems to facilitate migration from centralized voice service platforms to a distributed architecture.

Figure 6:
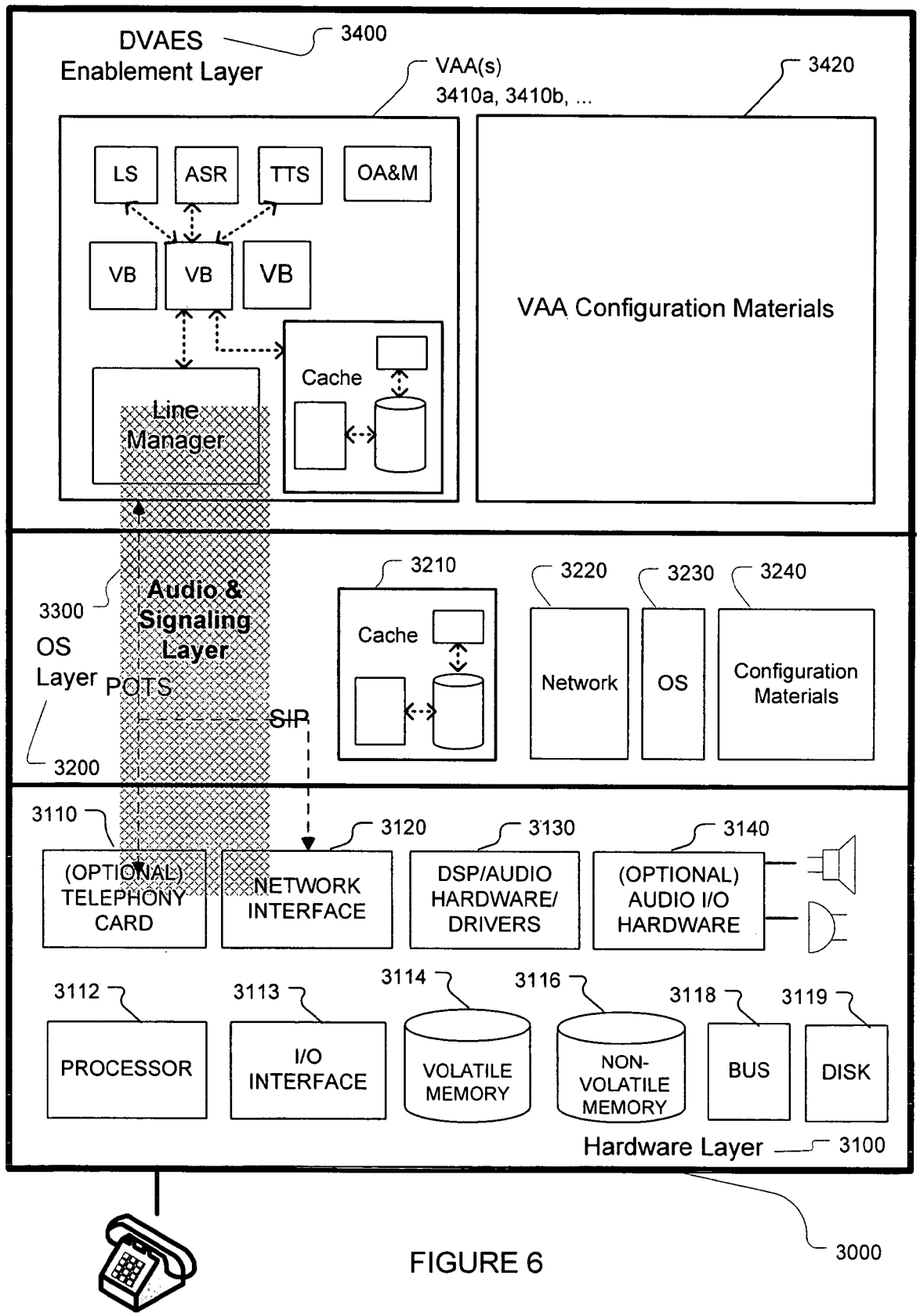
FIG. 6 is a diagram that illustrates elements of a DVAES-enabled device embodying the invention.

FIG. 6 shows elements of a typical piece of DVAES-enabled equipment that would be located at a user's home or office. Alternatively, as noted above, the DVAES-enabled equipment could be part of a mobile computing device which connects to a wireless network. The DVAES-enabled equipment 3000 includes a hardware layer 3100, an operating system (OS) layer 3200, an Audio and Signaling Layer 3300, and a DVAES-enablement layer 3400. The DVAES-enablement layer includes DVAES-enabling components, including at least one instance of a VAA 3410, 3410b, and VAA configuration materials 3420.

A DVAES-enabled hardware layer 3100 preferably provides computer hardware and firmware for the operation of DVAES architecture components. The hardware and firmware of the DVAES-enabled hardware layer 3100 is used to provide an operable computing platform upon which to host the DVAES-enablement layer 3400. The DVAES-enabled hardware layer supporting the DVAES-enablement layer described herein is exemplary in nature and may be provided by any hardware, firmware, or software combination that fulfills the operating requirements of the DVAES-enablement layer.

A DVAES-enabled device's hardware layer 3100 comprises an operational computing platform combined with specialty hardware interfaces and firmware to enable the DVAES architecture. A DVAES-enabled device's hardware layer 3100 comprises a processor 3112; volatile 3114 and non-volatile memory 3116 (e.g. RAM, ROM, FLASH or other forms of memory devices); a bus 3118; one or more optional hard disks or other mass storage devices 3119, optional I/O interfaces 3113 which could include USB, serial, parallel and other types of interfaces; optional audio I/O devices which would typically include a speaker and a microphone 3140; optional telephony interfaces 3110; at least one network interface 3120; and optional DSP/audio hardware/drivers 3130.

A DVAES-enabled device requires a sufficient processor to effectively run the DVAES components assigned to the device. Some aspects of hardware may be provided using software or firmware; this is an implementation decision that may require additional CPU processing capability or may require the use of clustering technologies. An example CPU is an Intel XScale processor from Intel Corporation of Santa Clara, Calif.

A DVAES-enabled device requires sufficient RAM to effectively run the DVAES components assigned to the device. The amount of RAM required is implementation dependent. Additional RAM can improve the effectiveness of a DVAES-enabled device and optionally may be included. For instance, adding additional RAM may enable the device to perform more complex voice applications A DVAES-enabled device requires sufficient persistent storage such as ROM, FLASH memory (EEROM or other suitable technologies), or other types of non-volatile memory to persistently store information required for the operation of the devices within the device itself. Examples of types of information that may be stored in the non-volatile memory include device firmware, configuration materials, copies of an operating system, VAA components, VAA configurations, VA components, and user personalization information. Persistent storage such as FLASH memory may be provided within the DVAES-enabled device, or may be alternatively accessed using a wired or wireless I/O interface.

A DVAES-enabled device may be equipped with a local hard disk for the persistent storage of materials as described above.

Optional I/O interfaces, including USB, serial, and parallel interfaces may be provided for extensibility, and to interconnect with external devices and accessories. Example accessories might include a wireless networking interface or a USB-based Bluetooth wireless connection for a headset.

Optional audio I/O Devices such as one or more speakers and a microphone could be used to interact with the user. The speaker(s) would play audio to the user, and the microphone would pickup the user's spoken responses.

At least one network interface would be used to connect the DVAES-enabled device to the network. The network interfaces could be a wired interface, a wireless interface, an infrared interface, or any other technology that would enable the DVAES-enabled device to communicate over the network. Preferably the network interface would provide 10baseT or better Ethernet, or 802.11-b/-g wireless connectivity.

The device could also include optional telephony interfaces, such as FXO and FSO interfaces for connecting with telephony devices and central office hardware. These interfaces may be used to connect the DVAES-enabled device to a PSTN, VoIP, or an internal PBX system.

An optional DSP may be included to manage audio capture/playback, digitization, and speech conversion. An example DSP is a Freescale StarCore, from Freescale Semiconductor of Austin, Tex.

The device might also include other optional hardware, such as interfaces for a display screen, a keyboard, a mouse, a touch screen, other pointing device and the like (all not shown) as appropriate for specific implementations of a DVAES-enabled device.

A DVAES-enabled device preferably provides an operating system layer 3200 to abstract the functionality of the hardware and network voice and data implementation details from the functionality of the DVAES-enablement layer 3400. The OS layer 3200 comprises traditional operating systems and device drivers, as well as traditional networking applications such as the network protocol stack, routing, firewall, and related service applications. The operating system layer supporting the DVAES-enablement layer described herein is exemplary in nature and may be provided by any operating system that fulfills the operating requirements of the DVAES-enablement layer.

The Operating System layer of a DVAES-enabled device comprises an optional cache 3210, network components 3220, operating System components 3230, configuration materials 3240 and an audio and signaling layer 3300. An optional web interface (not shown) for configuring device configuration materials may also be included.

The DVAES-enabled device's operating system could be based on an embedded version of the Linux or VxWorks operating systems, although embodiments that support embedded versions of Microsoft Windows (and Windows for Devices), Symbian, QNX, PalmOS, BlackBerry OS and other embedded operating systems are also envisioned. The DVAES-enabled device's operating system additionally comprises the drivers, modules or loadable operating system components required to identify, interface to, and operate each type of hardware present in a DVAES-enabled device. In Linux-based operating systems, these drivers are sometimes called modules or device drivers. Modules for FXS and FXO interface cards, as well as audio I/O devices are envisioned as part of the device operating system layer.

The network components of a DVAES-enabled device include protocol stacks, network management components (e.g. SNMP management components), routing software, protocol and network address translation components, and firewall components. These components include any required configuration files or other software required to make them operate. The networking components preferably operate using the TCP/IP protocol, although other protocols are envisioned.

In some embodiments, the DVAES-enabled device's networking layer may include networking components for managing VoIP calls, including, for example, such components as a SIP stack or H.323 services. Components required to interface to external PSTN and PBX systems are supported as part of this layer. Collectively, all such components are considered part of the network layer of a DVAES-enabled device.

The network management components may include remote management and monitoring agents configured to manage and report upon the status of DVAES-enabled device operations to one or more DVAMSs. The network management components may include SNMP-based trap mechanisms, SNMP agents, TR-069 agents, or other remote management and monitoring components of types well known to those skilled in the art of network-based device management and monitoring.

A DVAES-enabled device preferably provides an audio and signaling layer 3300 to abstract the functionality of network voice and data mechanisms from the OS layer 3200 and from the DVAES-enablement layer 3400. The audio and signaling layer 3300 provides audio I/O device abstraction for DVAES components. In one exemplary embodiment, the audio and signaling layer 3300 abstracts a local audio device such as a microphone and speaker into an input/output device associated with a VAA, without regard to the type or location of the physical audio I/O device. In other embodiments, the audio and signaling layer 3300 provides support for network voice components of the DVAES-enabled device, such as support for VoIP.

The audio and signaling layer 3300 of a DVAES-enabled device provides DVAES component interfaces to hardware audio and signaling services and network audio and signaling services (collectively audio and signaling services).

Hardware audio and signaling services includes FSX interfaces connected to a telephone and audio I/O device (speaker/microphone or USB headset) interfaces. Network Audio & Signaling Services includes support for Voice Over network Signaling and transport protocols and standards such as SIP, H323, MGCP, RTP, PSTN and WiFi or Bluetooth based audio I/O device interfaces. The Audio and Signaling Layer applies aspects of device hardware, the supporting operating system and drivers, and configuration materials for establishing sessions between audio and signaling services and one or more DVAES components. It maps the rules for establishing a connection between audio and signaling services to one or more DVAES components (e.g a VAA). Optionally, the Audio and Signaling layer may provide such mapping based on configurable rules. The applications of mapping rules may be based on physical and derived attributes of audio and signaling services.

An audio and signaling session is a uni-directional or bi-directional connection established with hardware audio and signaling source(s) or a connection established with a network audio and signaling source. The audio and signaling layer 3300 manages audio and signaling sessions by providing a connection between DVAES components (e.g. a VAA) and the audio and signaling services. As an example, when a user activates a phone connected to an FXS interface of the DVAES device, the audio and signaling layer 3300 creates an audio and signaling session that is made available to a VAA based on mappings and rules. Generally, audio and signaling sessions are connected with one or more voice sessions in the line manager component of a VAA, as will be explained in more detail below. The features of the audio and signaling layer vary in accordance with the capabilities of the underlying hardware. These features may further include aspects of hardware device controllers, such as home automation controllers, enabling voice applications to control locally connected hardware and control systems. Furthermore, the audio and signaling layer can support one or more audio and signaling sessions depending upon capabilities of the hardware, software resources and configuration of the DVAES-enabled device.

Thus, by utilizing the audio and signaling layer 3300, a DVAES-enabled device can utilize audio associated with standard analog telephones, a microphone/speaker combination (such as a microphone and speaker), VoIP-based telephony devices, locally connected telephones (e.g. FSX interface connected telephone devices), and other devices located on a PSTN or data network.

Thus far, the discussion has not provided any detail about the DVAES enablement layer 3400. Before describing the details of the DVAES enablement layer, a description of how a particular piece of DVAES-equipment is configured and registered will be provided. There will also be a discussion about updating or replacing configuration materials in a DVAES-enabled device. After that, we will return to a detailed description of the DVAES enablement layer of a DVAES-enabled device.

A DVAES-enabled device optionally supports device-level configuration materials that define the configuration and operation of the hardware, operating system, and networking, and audio and signaling layers of the device. The configuration materials may be stored in any combination of flat files, XML files, registry databases, or other databases as dictated by the operating system, network, and audio and signaling layer components being configured. In some embodiments, the configuration materials may be stored in a cache.

In a first embodiment, the device configuration materials are not originally stored in non-volatile memory of the DVAES-enabled device itself. Rather, these materials are loaded into each DVAES-enabled device when it boots and requests its network address and other information from the network. Traditional mechanisms for providing device configuration materials include the well-known BOOTP, DHCP, and the TFTP protocols. Alternatively, some or all of the device configuration materials may be stored within a network-based cache mechanism such as a content distribution service, and may be obtained by the device using protocols appropriate to accessing the content distribution service. Some of these protocols include HTTP and FTP. In other embodiments, at least some of the device configuration materials are stored on each DVAES-enabled device, either within the DVAES-enabled device's cache, or in a separate configuration area used to persistently store these materials. Examples of such persistent storage areas include the FLASH memory or optional hard disk drive of the DVAES-enabled device.

In a first example embodiment, device configuration materials stored on a DVAES-enabled device include parameters and configurations that control how the modules and services of the operating system and network layer of the DVAES-enabled device operate. Specific examples of these modules and services include device drivers and loadable module management (e.g. enabled/disabled, specific mappings), networking parameters, (including such items as network boot definitions), PPOE credentials, routing parameters, NAT configurations, and firewall settings.

Additionally, some embodiments of the device configuration materials define telephony line interface definitions, including line interface configuration parameters, associations between specific line interfaces and operating system device drivers, and the like.

Other exemplary embodiments of the device configuration materials define the use of local audio interfaces such as a local microphone and speaker, and provide configuration information that map these devices to audio and signaling layer software that provides a telephony call session that is usable by a VAA (described below). Alternate embodiments combine loadable module management with specific plug-in audio devices, such as USB wireless (Bluetooth) interfaces that support the use of Bluetooth-enabled local audio devices such as a wireless headset.

In some particular embodiments, a DVAES-enabled device may store within its configuration materials a list of its capabilities, including such items as the amount of memory, processor resources, telephony line interfaces, components loaded and configured for use, etc. This information may be automatically generated on demand, may be static, or may be a combination of static and dynamically generated information. The capabilities information provides the DVAES-enablement layer and DVAES management systems (such as DVAMS) information about the capabilities of each specific device.

In still other embodiments, the device configuration materials define specific limits and capabilities of a DVAES-enabled device, and may include limits upon the capabilities of the device. These device configuration materials may define artificial limits in the capabilities of a device, either for enabling resource sharing between components or to provide software limitations to capabilities that may be removed when the device is activated. For example, specific capabilities of a DVAES-enabled device may only be enabled based upon the level of service that a user purchases. In some embodiments, where clustering or cooperative processing of DVAES-enabled devices is a factor, the configuration materials also provide details on how the DVAES-enabled device interacts with other DVAES-enabled devices in the cluster. Clustering is described in more detail below.

The DVAES-enabled device's configuration materials also define basic configurations of DVAES-enabled components present on a DVAES-enabled device. In addition, device configuration materials define the order and parameters that indicate how these components are started when a DVAES-enabled device is started or restarted. The services managed by these configuration materials include operating system, local hardware, networking, interface components, and DVAES-enablement layer components such as VAAs. The configuration materials also define the manner in which each DVAES-enabled device is initially configured for use on the network and with a DVAES.

Device configuration materials may define the locations and addresses of well known services that are available to the device, such as a DVAMS with which a device is to register with, or the location and addresses of specific network services usable by the device such as known CDS servers, external ASR or TTS servers, and the like.

In addition to definitions for external DVAES services, device configuration materials also define the DVAES-enabled services such as the number and configuration of VAAs operating on a DVAES-enabled device, locally cached copies of DVAES-specific device registration materials, and configuration materials that associate specific hardware services and devices with each local VAA instance.

In some more specific embodiments, device configuration materials describe specific addresses for each DVAMS the device must report operational details to (for example, using SNMP).

In some embodiments, the device configuration materials may provide, or may reference, specific device identification materials that may be used to uniquely identify the specific DVAES-enabled device. These materials may include unique MAC addresses for use by the network interfaces, a unique device ID assigned to the device, a public-private key pair, or other materials. In some embodiments, the configuration materials may include authorization and authentication materials that permit access to external services. These authorization and authentication materials may be unique to the DVAES-enabled device, or may be shared across a plurality of devices.

In some embodiments, the device configuration materials described above may be pre-loaded onto a DVAES-enabled device before it is shipped from the manufacturer. In other instances, the configuration materials may be changed as part of a registration process or other automatic process, or may be configured manually using a user interface such as a web-based interface of the type commonly provided with network-based customer premise equipment. The configuration materials are preferably stored in non-volatile memory (e.g. FLASH or ROM) or other persistent storage such as a hard disk and may be protected against tampering using well-known cryptographic techniques such as MD5 or SHA-1 hashes.

External DVAES components such as a DVAMS may make changes in the configuration materials of a DVAES-enabled device. These changes may be made by providing replacement configuration materials for the DVAES-enabled device, either by directly updating the existing configurations, or by other means well known to those skilled in the art. In some particular embodiments, a management protocol that is effective to set specific device configuration materials and their values may be implemented as a service on a device.

Each DVAES-enabled device is registered with at least one DVAMS. Groups of DVAES-enabled devices may also be registered. Registration is the process by which a DVAES-enabled device becomes part of a DVAES.

A DVAES-enabled device is registered with at least one DVAMS when it is first integrated as part of a DVAES. Registration is preferably automatic and performed at the hardware and firmware level. In one example embodiment, the registration process is started when a DVAES-enabled device performs a broadcast to locate a DVAMS, receives a response that includes information about the DVAMS's address, and then proceeds with the registration as described below. In some embodiments, the broadcast/response is part of a DHCP or BOOTP request/response cycle that occurs when the DVAES-enabled device is connected to a network. In alternative embodiments, the broadcast/response mechanism is performed after the DVAES-enabled device is present on the network (e.g. has a network address). Alternatively, if a DVAES-enabled device is already present on a network (e.g. has a network address), a DVAES-enabled device may start the registration process by contacting a well-known service such as a directory or registration service from which the location of an appropriate DVAMS service may be determined.

Once the address of a DVAMS is established by a DVAES-enabled device, the DVAES-enabled device connects to the registration service published by the DVAMS and registers itself. Preferably, the DVAES-enabled device provides a unique machine ID along with owner, location, hardware configuration, software configuration, and available user, group of users, VAAs, and VA information as part of the registration process.

Authentication optionally may be required in order to permit registration. Authentication techniques are well understood to those skilled in the art and may include hardware certificates, account/passwords, or other mechanisms. Once satisfied that the request is both valid and should be completed, the DVAMS updates its registration directory with the information provided by the DVAES-enabled device, and enables the DVAES-enabled device for use. Copies of DVAMS registration materials are preferably stored in the configuration materials associated with each DVAES-enabled device, as described above.

Each DVAES-enabled device may be registered with one or more DVAMS. In a first example embodiment, each DVAES-enabled device is registered with a DVAMS associated with a specific DVAES. In other embodiments, where there is a plurality of DVAES implementations (for example, where two different vendors have deployed the DVAES architecture), a DVAES-enabled device may register with a DVAMS associated with each DVAES. In this second example, a plurality of DVAMS registration materials may be stored as part of the configuration materials described below.

Figure 7:
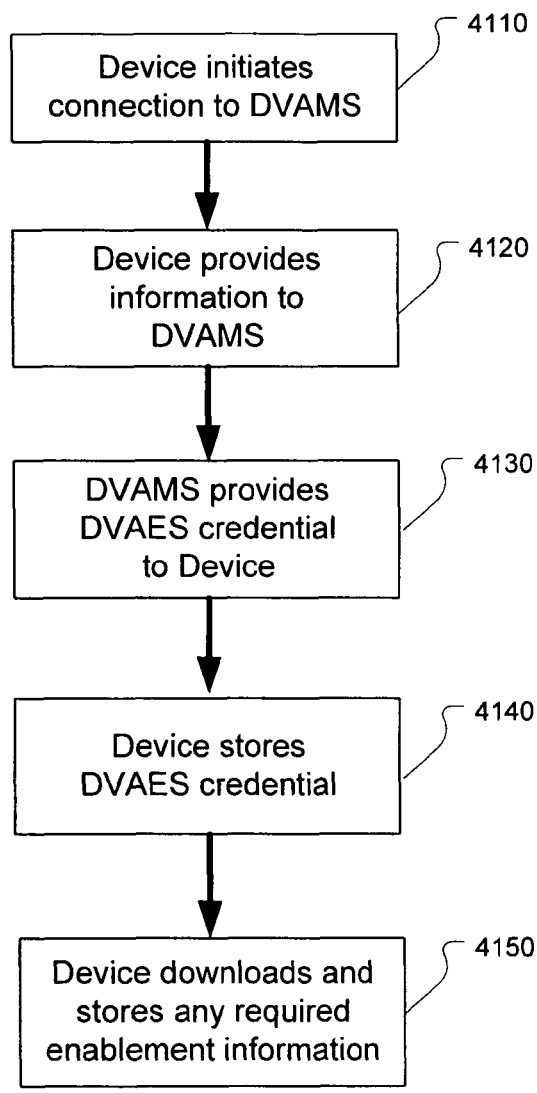
FIG. 7 is a diagram of a method embodying the invention for providing credentials to a DVAES-enabled device.

FIG. 7 illustrates an exemplary set of process steps taken by a device in order to register itself with DVAMS. In step 4110, a device initiates a connection to a DVAMS. The connection can be made using information that is pre-configured or configured on the device and that specifies the DVAMS to access. Alternatively, the connection can be made by referencing a service that specifies the DVAMS to access. In other embodiments, the device may download information that specifies the DVAMS to access, or use downloaded information that specifies a particular service provider, and the service provider may then specify that the device register with a particular DVAMS.

In step 4120, the DVAES-enabled device then provides information about the device to the DVAMS, including its unique ID, any DVAMS or DVAES-credentials already in the device, and possibly a capabilities list. Unique IDs may take the form of MAC, digital certificate, public key, or any other method for uniquely identifying the individual device, and are of well-known construction to those skilled in the art. Optionally, credentials authorizing the registration of the device with the DVAMS are passed. These credentials may take the form of an account ID/password, a digital certificate, or any other authorization materials that may be used by the DVAMS to determine that the device is authorized to be registered. A capabilities list would describe the capabilities of the device, including line interfaces, audio interfaces, network interfaces, available memory, and any other pertinent items. The capabilities list includes a DVAES-enabled components list and configurations.

In step 4130, the device receives a membership credential from the DVAMS. The membership credential may be directly downloaded to the device, or it may be made available in a directory, database, or content delivery service, from where it is subsequently distributed to the device. Each membership credential associates a specific device, by means of its unique ID, with a specific DVAMS.

In step 4140, the device stores the membership credential within the device. Preferably, the DVAES membership credential is stored with the device configuration materials, but alternatively may be stored with specific VAA configuration materials or may be stored in other places within the device. In some embodiments, the membership credential is further stored in a content delivery service.

Finally, in step 4150, the device downloads (or has distributed to it) and stores any required DVAES-enablement layer components and configurations from the DVAMS. In some embodiments, the device receives the actual required components and configurations from a DVAMS. In other embodiments, the device receives a list of components that are required by the device, and the device is responsible for obtaining these materials via alternate means, such as accessing the materials from a VASS or a CDS.

The DVAES enablement layer materials may include various implementations of one or more VAAs, VAA configuration materials, device configuration materials, user configuration materials, device components, and any other required components of the DVAES architecture. Each implementation of downloaded materials may be embodied as different instances or versions that may have similar or differing features and capabilities.

Embodiments of DVAES components may be developed using various different technologies that operate on differing underlying platforms. In some embodiments, the DVAES components may be implemented using Java, C, assembly language, C++, C#, or other programming languages that are advantageous for the particular application environment of the device.

In some embodiments, DVAES components may be programmed as stand-alone programs, as daemons or services, or as executable object or class components as are applicable to the deployment environment. When operating as a service or daemon, each DVAES component preferably monitors its configuration and if changes occur in the underlying configuration components, each DVAES component reloads the newest configuration, and optionally restarts itself to make the new configurations effective. In other cases, an external service monitors the changes and notifies the applications that are affected to restart or reload their configuration files.

DVAES components are, in most embodiments, inherently downloadable into a DVAES device. DVAES components may be directly downloaded, or if stored in a non-volatile cache, automatically updated by refreshing their cache-based storage. The downloadable nature of the components is embodied in their packaging method. For example, in some embodiments, the DVAES components may be written in Java and are deployed in Jar or Ear files. In other deployment environments, DVAES components may be written in C++ or C# and are deployed as part of .NET assemblies using .MSI install packages. In other embodiments, the applications may be developed in C or assembly language, and require third party installers.

The above registration process is exemplary in nature. Many other variations would be possible to register a piece of DVAES-enabled equipment with a DVAMS.

Figure 8:
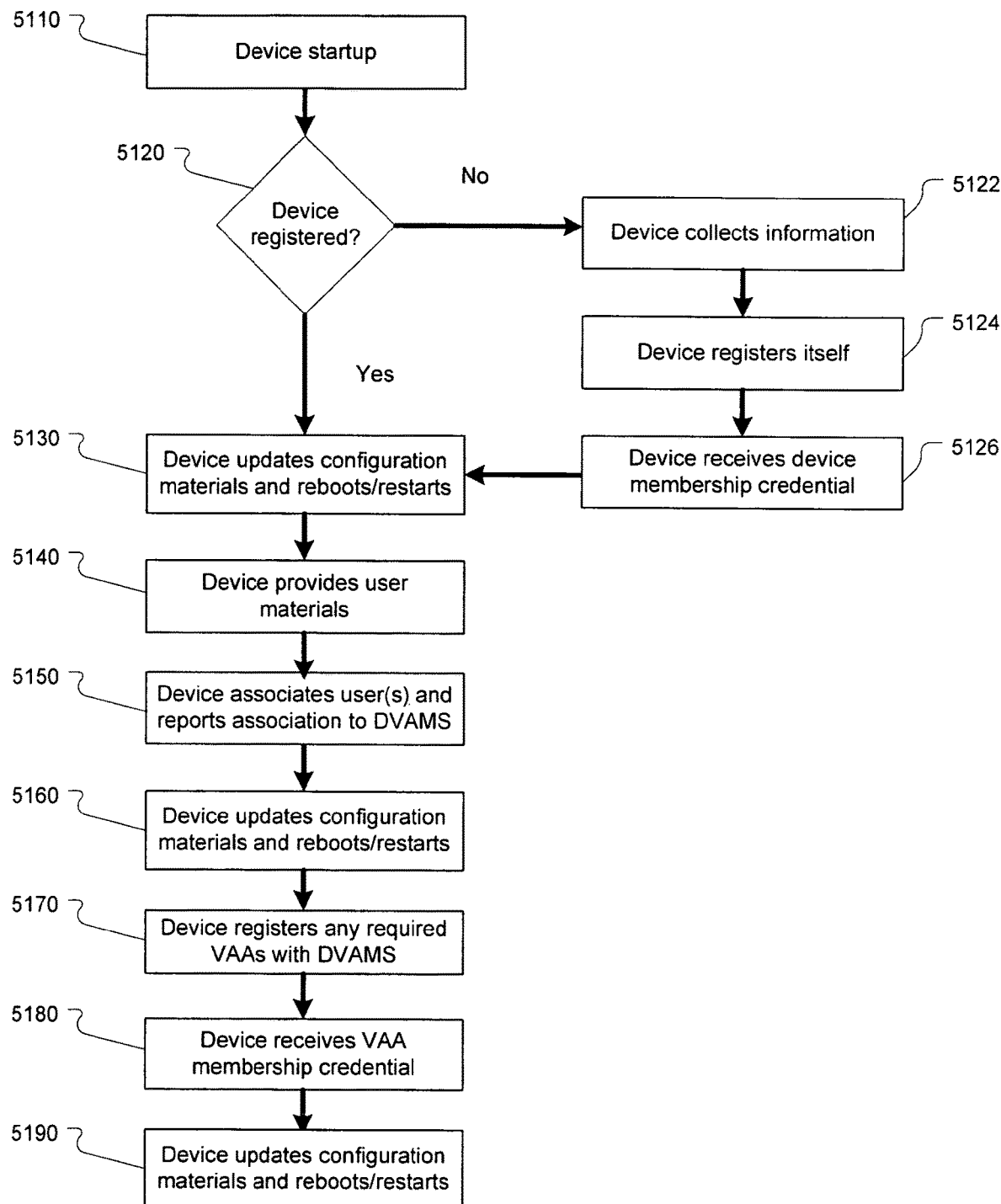
FIG. 8 is a diagram of a method embodying the invention for registering a DVAES-enabled device.

FIG. 8 illustrates another process embodying the invention, by which a DVAES-capable device is registered, has all required components downloaded into it and is made ready for use by one or more users.

In step 5110, the device starts up. In step 5120, the device checks its state to determine if it is already registered with a DVAMS.

If the device is unregistered, in step 5122 the device collects information from the user (account number, etc) and starts the combined registration process. In step 5124, the device registers itself in accordance with a "device registration process," such as the one just described in connection with FIG. 7. In step 5126, the device would receive a membership credential.

If the device determined, in step 5120, that it was already registered, the method would have proceeded directly to step 5130. If the result of the check in step 5120 indicated that the device was unregistered, then after the registration process is complete, the method will eventually reach step 5130. In step 5130, the device performs any required downloads and updates its configuration materials. The device also re-starts any required services, or optionally reboots.

In step 5, the device provides user-provided account materials, and then in step 5150, the device associates itself with one or more users of the system and reports that association to a DVAMS.

In step 5160, the device performs any required downloads and updates its configuration materials. Also in step 5160, the device would re-start any required services, or optionally reboots, depending on whether updated materials requiring such an action were downloaded. In step 5170, the device registers any required VAAs with a DVAMS. In step 5180, the device receives VAA membership credentials. Finally, in step 5190, the device performs any required downloads and updates its configuration materials, and the device re-starts any required services, or optionally reboots.

The above discussed methods explain how a DVAES device would initially register itself with a DVAMS, and then acquire any necessary configuration materials and/or credentials. For various reasons, a DVAES device may need to replace or update its configuration materials after the initial configuration process. For instance, a DVAMS may identify that one or more components on a device are missing, or are out of date and need to be replaced. An example of components to be downloaded or updated would include a VAA, configuration materials related to a VAA, device drivers, program executables, device configurations, and the like. Generally, replacement of these components in the device may not require a complete reset of the device and can be effected by downloading the components, and performing a restart of the affected service or services. In some cases, rebooting the device may occur to re-start the affected service or services. The decision to restart services or reboot the device is implementation dependent.

In other embodiments, a DVAMS may generate new deployment specifications. This occurs when the allocation of specific users, VAs, and VAAs to specific devices are changed in the DVAMS. These deployment specifications are used by the DVAMS to produce updated configuration materials, and may further introduce requirements for other, new, additional, or updated components into a device.

The distribution of new or updated materials may be performed in one of several ways. In a first embodiment, the materials may be downloaded using a direct download instigated by a DVAMS. Alternatively, they may be distributed using a pull-type distribution mechanism using a service interface, a web service, or the cache. An alternate mechanism for identifying and distributing materials into a device is to have a service that periodically checks the versions of all DVAES-enabled device components to determine if new components are needed. This service would download new components to a target when they are identified.

Having described how a DVAES-enabled device is first registered and configured, we will now turn back to a discussion of the DVAES enablement layer of a typical DVAES-enabled device. References will be made to FIGS. 6 and 9, which illustrates various components of the DVAES enablement layer.

The DVAES-enablement layer 3400 includes one or more VAAs configured to use features of the DVAES-enabled device and operable to perform Voice Applications (VAs). The appropriate VAAs and VA components may be deployed or loaded into each DVAES-enabled device as managed by a DVAMS, as described above. The VAAs and VA components are configured using appropriate configuration materials and enable the performance of VA components by a DVAES-enabled device. More details about how the DVAMS manages the VAAs to perform VA components, and how VAs are rendered to the device will be provided in other sections below.

The DVAES enabling component layer 3400 of a DVAES-enabled device comprises VAA configuration materials 3420 and at least one VAA. The DVAES-enabling layer of devices provides support for performing voice applications, enabling these devices to be effective in providing the performance of distributed voice applications in a widely distributed architecture.

As noted above, the concept of a VAA is partly an abstract logical construct. In the end, a VAA must operate through some physical device. But VAAs need not be tied to a single device. A VAA may be deployed as a single, integrated service, or as a collection of individual services that cooperatively operate to provide VAA services to a DVAES. The components that make up a VAA may be pre-distributed or pre-loaded onto a device upon manufacturing the device. More typically, however, VAAs would be deployed on an as-required basis into DVAES-enabled devices, including standard consumer electronics and networking devices, to enable the performance of voice applications by these devices.

Also, in some embodiments, a plurality of VAAs may be present on a single DVAES-enabled device. These VAAs may perform VA components that may require a specific instance of a VAA. In other embodiments, a device may have a plurality of VAAs, each associated with a different DVAES. The different VAAs may all be associated with a single user, or the various VAAs may be associated with different users. Some examples of how these variations could arise are given immediately below.

In one instance, a single user may end up with multiple VAAs loaded on his local device. In this instance, a first VAA could be configured to perform VA components related to the user's personal use, and a second VAA could be configured to perform VA components related to the user's professional use.

In another similar situation, the user may have registered for voice services with two separate service providers. For instance, assume that a first DVAES is operated by a first operator such as Comcast, and a second DVAES is operated by a second operator such as Verizon. Further assume that the user has registered to obtain voice services from both Comcast and Verizon. Here again, Comcast could be providing the user with services related to his personal life, and Verizon could be providing services related to the user's professional life. In any event, two separate VAAs may be loaded onto the user's local device, one of which is registered with and controlled by the Comcast DVAES, and the other of which is registered with and controlled by Verizon. There would be no inherent conflict in loading both VAAs onto the same customer device. And the DVAMS for the respective service providers would each control, update and maintain their respective VAAs loaded onto the user's device.

In still other embodiments, a single piece of local equipment may be providing support for a plurality of users. In this instance, each of the users could make use of a different VAA. Here again, the VAAs could be provided by, updated and maintained by the same DVAES, or by different DVAESs operated by different operators.

There are a plurality of reasons for deploying individual devices that utilize disparate VAAs, including, for example, different authorization and personalization domains, separation of content and users, and disparate DVAES. Different operator, authorization, and personalization domains occur when a DVAES operator or operators of external systems with which VAs interface require separation of authorization and authentication materials. In some cases, these materials are mutually exclusive or would require additional logic to determine which set to use from a plurality of options. Use of a plurality of VAAs, each operating within disparate operator, authorization, or personalization domains, overcomes this obstacle without introducing run-time complexity.

In other instances, a VAA could operate in a virtualized manner, and not be bound to specific hardware until they are executed. One example of this type of virtualization is deployment of a VAA using software such as VMWare (commercially available from EMC, of Hopkinton, Mass.), Xen (public domain), or virtual server (commercially available from Microsoft of Redmond, Wash.). This means that a VAA may be loaded onto a particular DVAES-enabled device only after a user identifies that he wishes to use that device to access a voice application.

Each VAA is configurable using VAA-specific configuration materials. These materials may be stored within a DVAES-enabled device, or may be loaded from cache, a CDS, or from a DVAMS or VASS on an as-needed basis.

In one aspect, the VAA configuration materials comprise definitions of the services and components that the VAA requires to operate as configured. These services and component definitions may name services local to the device (such as an ASR or TTS service), or may name remote services (such as remote ASR or TTS services, a DVAMS, TASS, or CDS service). The configuration materials may also identify the number of instances of each service to start for the voice browser pool (e.g. a number and types of voice browser sessions required), and may further specify the voice applications that each voice browser instance may perform. Default voice applications, e.g. voice applications that are associated with a specific voice browser instance on startup, also may be assigned to each voice browser instance.

The VAA configuration materials also provide configuration settings for determining the items to log, log levels, and locations where logs should be sent (e.g. the DVAMS). The items to log may be specified on a service or component level, and may be detailed down to the logging of the performance of specific VA components.

The association between Voice Browsers and specific voice sessions may be made on a static (configuration) basis as defined in the VAA configuration information, or the association may be made on an on-demand basis. Specifically, each voice browser instance may be associated with zero or more voice sessions.

Within each VAA's configuration materials are further configuration materials for the configuration of specific voice browser instances and components. Each set of voice browser configuration materials permits monitoring of each voice browser and internal component states, including specific items such as Voice browser start, Voice browser stop, Voice browser errors, Voice browser VA component currently processing, and Voice browser cache state changes. The Voice Browser is also configurable to monitor and log VA states, including: Initial URL, Page Transitions, Log tags, Event Catch tags, Session variables, VA component Errors, Input Fields, and specific prompts.

In addition to other things, the VAA Configuration materials may include specifications for the following items:
Services and Number of instances of each service;
Associations between services;
Optional Associations of OA&M Service to VAA Services;
Line Manager Configuration Items;
Number of Voice Sessions and Types;
Association of Voice Sessions to Audio and Signaling sessions;
Association of Voice Sessions to ASR sessions;
Association of Voice Sessions to TTS sessions;
Association of Voice Sessions to Voice Browser Sessions;
Optional Associations of Voice Sessions to OA&M Services;
Voice Browser Configuration Items;
Number of Voice Browser Sessions and Types;
Association of Voice Browser Sessions to Voice Sessions;
Association of Voice Browser Sessions to ASR sessions;
Association of Voice Browser Sessions to TTS sessions;
Associations of Voice Browser Sessions to an OA&M Service;
ASR Service Configuration Items;
Association of ASR Sessions to Voice sessions;
Associations ASR Sessions to OA&M Service;
TTS Service Configuration Items;
Number of TTS Sessions and Types;
TTS number of Voice Browser Sessions and Type;
Association of TTS Sessions to Voice sessions; and
TTS associations of OA&M Service;

The configuration materials may also specify the amount of cache used and caching rules. Optionally, these cache configuration rules may be specified by the DVAES-enabled device configuration.

Figure 9:
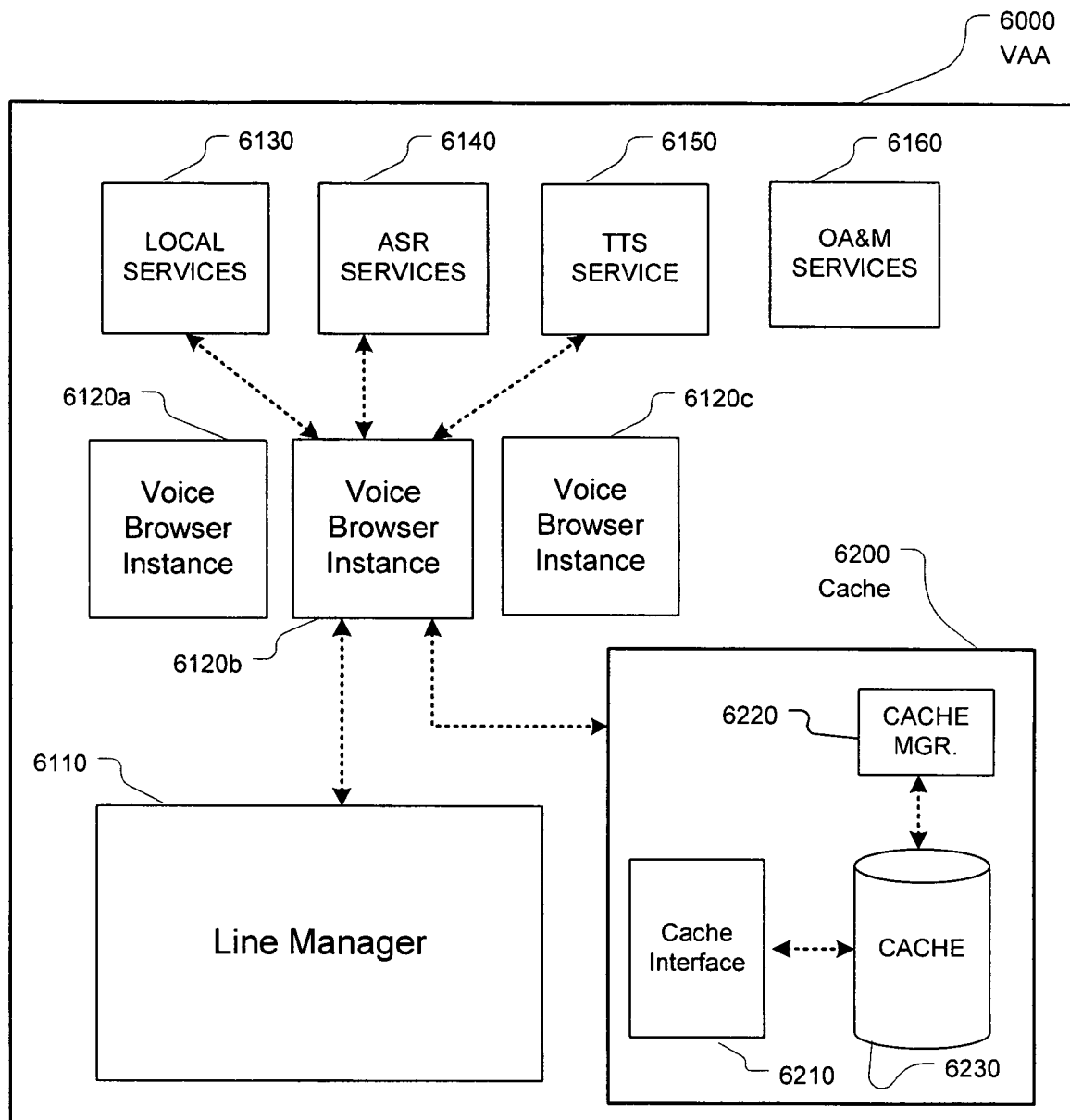
FIG. 9 is a diagram illustrating elements of a Voice Application Agent embodying the invention.

An exemplary VAA will now be described with reference to FIG. 9. FIG. 9 shows an exemplary voice application agent (VAA) 6000 comprising a line manager 6110, an optional cache 6200, a pool of running Voice Browser instances 6120a, 6120b, 6120c, a Local Service Engine (LSE) 6130, an Advanced Speech Recognition (ASR) Service 6140, a Text-to-Speech (TTS) Service 6150, and an Operations, Administration, and Monitoring (OA&M) Service (6160). The VAA cache 6200 may be broken down into an optional cache interface 6210, an optional Cache 6230, and an optional cache manager service 6220.

The line manager 6110 provides comprehensive voice session management features to a VAA. A Voice Session is a bi-directional, managed connection between a voice browser and an Audio and Signaling session. A line manager has channels. Channels could operate in Basic and/or Telephony Mode.

A basic channel provides a uni-directional or bi-directional interface to an Audio and Signaling Session that supports, for instance, a microphone & speaker audio source. This implementation typically relies on the drivers of the DVAES enabled device. A telephony channel is a more advanced implementation of a channel as it provides an interface to Audio and Signaling Sessions that support phone type connections (e.g., an analog telephone, a cordless telephone, WiFi, VoIP, Skype, etc.). A telephony channel propagates audio and signaling events uni-directionally or bi-directionally between a Voice Browser to an Audio and Signaling Session. The Line Manager can support multiple Voice Sessions based on the number of audio and signaling sessions supported by the DVAES enabled device.

The line manager component 6110 manages instances of Voice Browsers. The line manager may create voice browser instances when a VAA is started. One or more voice browsers are managed in a pool by the line manager. The specifics of the number and type of voice browsers that are activated are based on VAA configuration data.

When an audio and signaling session is initiated, a request is made by the audio and signaling layer 3300 to the VAA's line manager 6110 for a voice session. The line manager establishes a voice session by accepting the request, and associates the voice session with one or more VAA components based on VAA configuration data or rules. In some embodiments, this assignment activates a voice browser. In some cases, the line manager instantiates new Voice Browser instances if a sufficient number of Voice Browser instances are not available. The line manager 6110 also manages the starting, stopping, and suspension/resumption of specific instances of voice browser sessions based on VAA requirements, VA requirements, system, voice browser, audio and signaling session instructions, and/or the configuration materials.

Upon activation of a voice browser, the line manager 6110 provides the newly activated voice browser data provided by an Audio and Signaling Session. In the case of a session connected to a public telephony system, the data provided may include any call information provided by the public telephony system such as call time, caller ID, and caller name.

An Audio and Signaling Session connected to a voice session could be as basic as an analog phone connected to an FXS or FXO interface on a DVAES enabled device, or as advanced as a VoIP or Skype-like connection. The Audio and Signaling Session could also be a PBX that treats the VAA as an extension to the PBX. A telephony channel in the line manager may be activated instantly when the user picks up a telephone handset connected to an FXS interface of a DVAES enabled device, or it could be activated when a PBX sends a request to a DVAES-enabled device to accept a SIP call. Effectively, in doing so, the line manager enables the VAA to perform a Voice Application on the off hook event of a connected telephone device, and/or when a DVAES enabled device receives a phone call.

During the voice session, a telephony channel accepts and propagates standard telecom instructions and call/network data (e.g. ANI) to and from the Audio and Signaling Session. Examples of such instructions include "off Hook", "Dial," "Bridge," "Transfer" etc.

The Line Manager, based on rules or system events, may switch a voice session connection with an Audio and Signaling Session from a first voice browser to a second voice browser. This has the effect of switching the user from one VA to another. Alternatively, the Line Manager may accept instructions from a voice browser to pause a voice session and switch the voice session to an alternate voice browser. As an example, the Line Manager could permit the user to switch voice browsers and launch a new Voice Application based on a "Hot word" voice command. So, in this instance, as soon as the voice browser determines that a hot word has been spoken, the voice browser would make the request to pause the voice session and to switch the voice session to an alternate browser. In still other instances, when a telephone channel is being used, the switch to a different or new voice browser might be triggered by keying a specific DTMF key sequence. Whenever such an instruction is received by the line manager, the current voice browser is paused and the voice session is connected to a new voice browser.

Figure 19:
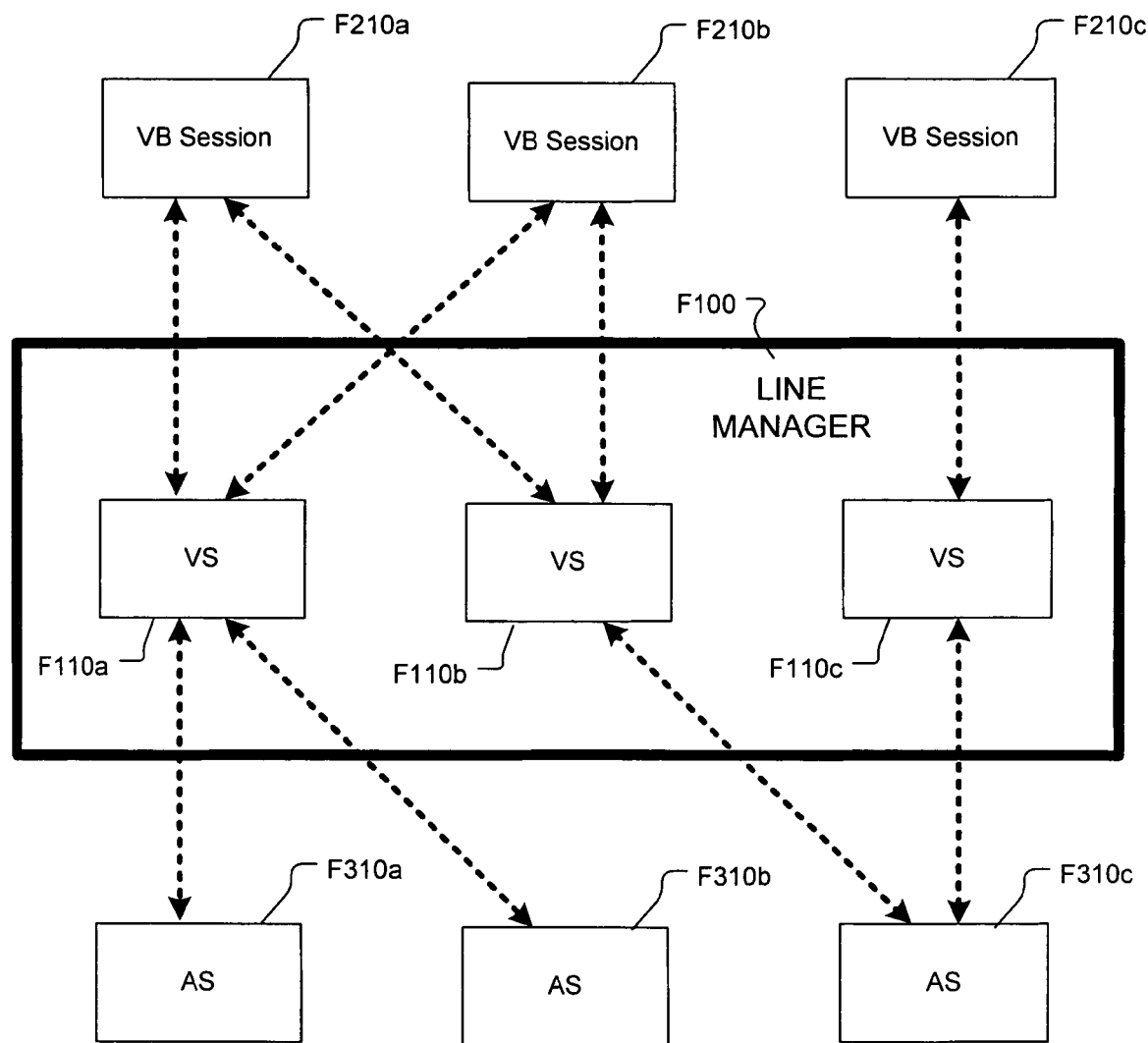
FIG. 19 is a diagram used to illustrate how voice browsers, voice sessions and audio and signaling sessions are interrelated.

FIG. 19 is intended to illustrate some exemplary uses of the line manager to connect a plurality of audio and signaling sessions (F310a, F310b, F310c) to one or more voice browsers (F210a, F210b, F210c), using voice sessions.

In a first example, A&S sessions F310a and F310b are jointly connected with a single voice session, F110a. The voice session F110a is connected to one or two voice browsers F210a, F210b sequentially or in parallel, depending upon the voice application being performed. This has the effect of providing voice application(s) to a plurality of simultaneous users (similar to a conference call during which a VA performs).

In a second example, A&S session F310c is connected to a voice session (F110c), which is further connected to a single voice browser (F210c).

In a third example, A&S Session F310c is connected to a plurality of voice sessions F110b, F110c, which are in turn associated with a plurality of voice browsers F110a, F110b, F110c. An example of this type of configuration might include a user participating with one or more voice browsers, and a second VA providing "hot word" recognition and processing. The line manager 6110 provides logs detailing line manager events to the OA&M Service 6160. The Line Manager Log items may include details of one or more voice sessions, including Start time, End Time, Voice Browser ID, Line Manager Channel ID and Type, Audio and Signaling session ID and Type. Additionally line manager log information may include detailed error messages. The logging level provided by the line manager is configurable and provides varying levels of logging in response to a configuration setting.

The Line Manager may also provide error notifications to the VAA OA&M Service. The error notifications may range from severe to warning, and the detail level could be configurable.

As noted above, the VAA additionally may include a cache subsystem 6200, that itself may include a cache interface 6210, a cache 6230, and an optional cache manager 6220 that provides transparent local caching of VA components within the context of each VAA. In some embodiments, the cache is shared between a plurality of VAAs on a specific DVAES-enabled device. In such a configuration, each voice browser could make requests for VA components to the local caching subsystem via the cache interface 6210. Thus, if the requested component is located in the cache, the requested VA components could be fetched from the cache 6230, instead of making a network request for the content.

In embodiments that include a plurality of caches (e.g. a VAA and a device cache), the VAA cache may make a request to the devices cache, which makes a request over the network to the source. The configuration of cache behaviors is defined by caching rules. Unlike traditional proxy-based cache systems, the cache with a cache manager component extends local as-needed caching algorithms to content distribution service components, and further provides predictive and push-based cache updates to the proxy server. The size of the cache, cache update frequency, caching rules, caching schemes to use, lookup locations for a CDS, and content sources at a DVAMS and/or a VASS are specified as part of the appropriate layer's (e.g. device's, or VAA's) configuration information.

As described above, the configuration determines whether a single cache is provided for an entire DVAES-enabled device, whether a plurality of caches is provided at the VAA level, or whether a combination of the two distribution strategies are deployed.

The cache manager component provides active management of the cache associated with each VAA. Each cache manager component is started when its respective VAA is started on a DVAES-enabled device. The cache manager could use rule-based configuration information to determine the size of the cache, cache update frequency, and other parameters related to the management of the cache and the cached materials. In some embodiments, the cache manager may be shared between VAA instances on a specific device.

The cache manager is preferably configured to proactively review the contents of the cache and to refresh the cached materials on the basis of predicted use. For example, a cached item that is used regularly will be updated in the cache more frequently than an item that is not used regularly. This approach reduces the network latency apparent to a user when a voice browser is performing a VA component using cached components by limiting the number of times that the cache must be refreshed while VA components are performing in real-time.

The cache manager may be configured to register a messaging interface to receive update requests from other components of a DVAES or DVAMS. Upon receipt of a message indicating a change in cached materials, the cache manager automatically initiates a refresh of its cache of these changed materials. In most cases, the refresh operation can occur in the background without the user noticing the operation.

In some embodiments, the cache manager may publish a public interface outside the device for use by the DVAMS, a VASS, or other devices to provide directions to update specific materials stored in the cache. This interface can be a programmatic interface, a specific protocol, or a web-enabled interface using a protocol like SOAP over HTTP to service these requests.

Each voice browser provides a runtime environment for performing voice applications components. A voice browser comprises a voice application interpreter and the necessary messaging interfaces between the voice browser, shared VAA services, and components such as Line Manager, ASR, TTS, cache, and OA&M Services.

There may be multiple types of voice browsers, each with their own different voice application interpreters. The type of a voice browser required is based upon its need to access services of the VAA and the DVAES enabled device, upon characteristics of the voice application interpreter, and upon instructions of the VA component being performed. As an example, a first voice application interpreter (VAI) may not support any telephony features, hence the only voice application that the interpreter could perform is one that has no telephony instructions. Alternatively, a second, more complex voice application interpreter would support the complete VoiceXML 2.0 standard, which includes telephony standards.

Embodiments of the voice application interpreter support established voice application specification standards such as VoiceXML, X+V and SALT. Additional embodiments could also support vendor-specific extensions and derivatives of such standards. Alternatively a voice application interpreter may support proprietary or non-standard voice application components. A voice application interpreter may additionally support scripting languages such ECMA Script or a similar mechanism that extends the voice application specification with scripted logic.

The voice application interpreter provides service interfaces to VAA services. These service interfaces are messaging conduits between a Voice Browser and the VAA services, such as the ASR service, the TTS service, and the OA&M service. The service interfaces may be based on open standards messaging and control protocols (e.g. MRCP for ASR), a standard services interface language such as SOAP, or the service interface may be based on a specific direct API implementation.

Furthermore, a voice browser may access the Local Services Engine (LSE) to provide VA components additional capabilities, or to improve the efficiency of VA component performance. The Voice Browser will provide the ability to process VA component requests and propagate such requests to the LSE. The interface between the LSE and the voice browser could be an API or a proprietary inter-process protocol.

A voice browser session is initiated when a new request is made by the line manager 6110 for a voice browser to perform a particular VA component. Typically, each voice session is associated with one voice browser session, however one voice session may be associated with a plurality of voice browser sessions. In example embodiments, "Hot Word" and transcription services may be implemented by having a voice session associated with both a first voice browser session, and a second voice browser session performing a voice application that provides the "Hot word" or transcription service.

Once a voice browser session is initiated, the voice application interpreter required to process the voice application is activated. The voice application interpreter would then typically load and validate the first VA component into memory and begin to perform the VA component by interpreting, running, or playing each of said VA's components. An instruction to load a VA component may be based on the configuration materials, user input, or an aspect of a running VA component. Some examples of such aspects include VA component logic, a specification within a VA component, a DTMF interaction with the user, or the starting of a session with a voice browser.

When a voice browser is first instructed to begin running a set of VA components, the voice browser or its voice application interpreter may pre-obtain a required set of VA components to ensure that the VA components are immediately available from the cache when they are needed. In some embodiments, a voice browser or voice application interpreter may pre-fetch a complete or partial set of VA components at a time prior to performing the first component of a VA, thus ensuring that a consistent set of VA components are present in the cache of a DVAES-enabled device. The list of required VA components may be found in the manifest. This permits the VA's performance to progress without delays that might occur if VA components were obtained from a network resource. Pre-fetching VA components eliminates a user's perception of poor performance by providing near-real-time VA component loads during VA performances. Performance improvements are attained by limiting the amount of time that a user must wait for a VA component to be loaded (including collecting VA components from external servers), and in supporting immediate context switches between performing VAs.

The association between a voice browser and a VA and its components may take the form of specifying a URI or URL. The association may be made based upon the capabilities of the voice browser and the requirements of the voice application, the needs of the user, and performance considerations. Furthermore, a voice browser and voice application interpreter further enable the performance of a VA component by accepting input from a voice session, processing said input in accordance with instructions provided by a VA component, and by communicating instructions between a voice application interpreter and a Voice Browser based on aspects of the currently loaded VA components. Additionally, a voice application interpreter may pass service requests to other VAA components and services Alternatively, a voice application interpreter could also support its own network component, such as a HTTP component, to fetch VA components from cache or remote locations. Preferably, a voice application interpreter would have the ability to instruct the voice browser to play an audio source, such as an audio file which is a VA component, and receive processed user speech, DTMF input, or telephony signaling information. Optionally, an implementation of the voice application interpreter may support Multi Modal capabilities that can perform VA components that instruct the Voice Browser to process voice input and output text to a screen, or process textual input and output audio to a speaker.

VA components provide instructions to the voice application interpreter, and the voice application interpreter may in turn instruct other VAA components and external services to do certain things based on the instructions it receives from the VA component. The voice application interpreter may function in an instruction only mode or in a control mode. The voice application interpreter in an "instruction only" mode propagates performance instructions to the voice browser, and the voice browser then further propagates such requests to VAA services. The voice application interpreter in a "control mode" functions as a voice application interpreter in the instruction mode, and additionally manages at least some VAA resources, and acts as a conduit for passing resources between VAA components.

As an example, in the instruction only mode, a voice application interpreter might fetch a VA component containing an audio prompt, and instruct the voice browser to play the audio prompt. The voice browser would simply propagate the play instruction with the location of the loaded VA component to the line manager, who in turn would instruct the Audio and Signaling Session, which will in turn instructs a module supporting the hardware or network service on the DVAES enabled device to execute a "Play audio" request.

If a voice application interpreter was acting in the control mode, the voice application interpreter is responsible for playing of a prompt by managing the buffering of the Audio to the Voice Session, hence intimately interfacing with the Audio and Signaling session. In another example of the instruction mode, a voice application interpreter could pass an instruction via the Voice Session to Audio and Signaling session to terminate user spoken input stream directly to the ASR Service.

The Voice Browser Voice Application Interpreter loads and performs the VA components. This performance includes the performance of the interaction VA components and the performance of referenced resource VA components (e.g. audio files and grammars) in a specified order and organization as specified by the interaction VA components. During the performance of the VA components, the Voice Application Interpreter performs the component to enable interactions with the user. Additionally the VA components also have the ability to instruct the Voice Browsers to load and transition to other VA components. A meaningful interaction is typically established by loading and transitioning to and from many VA components. The possible permutations and combinations of the VA component performance sequencing are generated by the VA in the VASS during the rendering process. The specific combination of VA components that are performed is typically determined by the User during a Voice Browser Session. For example, the VASS may provide VA components pertaining to the "Main Menu Selection", "Voice Mail", and "Address book." While these are the possible VA components that a User could interact with, the specific combination of VA components is determined during the interaction with the user, as he may simply just navigate from main menu VA components to Voice Mail VA components during a given Voice Browser Session.

As mentioned, a Voice Browser could perform multiple transitions between VA components. These transitions could be enabled by fetching VA components from the cache that may be distributed by the DVAMS beforehand, or may be fetched from the VASS storage in real time or may be fetched from the VASS as a result of a rendering process by the VASS in real time. A Voice Browser session could support all such transitions and fetches of VA components in any order. A voice browser may include certain features that may be available for all VA components to access. These features are geared to streamline and standardize the VA development process by natively providing certain capabilities in the voice browser that all VA components could access. The voice browser may also support global navigation controls that are accessible to all VA components. Navigation controls include the capability for a user to issue commands like Back, Forward, Repeat, Home, Main Menu etc., and for the Voice Browser to process such input without any performance instruction from the VA component. The voice navigation facility would be available to all applications. In this embodiment the Voice Browser will pass instructions to the ASR service independent of the VA component performance.

Optionally the voice browser may provide comprehensive error and exception handling support to all VA components. By doing so, the VA components errors and exceptions are always handled in a standard manner without any special handling. A VA component may choose to override or suppress such capabilities either via instructions in the VA components or via configuration parameters.

Each voice browser may provide detailed logs of internal voice browser events to the OA&M Service. The voice browser log items may include details of one or more voice browser sessions, including start time, end time, voice browser ID, line manager channel ID and type, Audio and Signaling session ID and type, VA Component instruction, Audio Played, ASR Service ID, ASR or DTMF Request, and ASR or DTMF response. Additionally, the voice browser logs may include detailed error messages. The error logging level provided by the Voice Browser is configurable and may range from severe to warning.

Local Services Engine (LSE) 6130 is a VAA execution environment for pluggable utility components that provides a Voice Browser and VA components additional application processing and logic support for the performance of VAs.

In some circumstances, the Voice Browser is either unable to perform a VA component request, the VA component performance by the Voice Browser may be inefficient, or the VAA is configured to provide performance acceleration services for specific common services. In such circumstances, the LSE may provide a VA component support by offloading certain computing requirements, for example: date arithmetic, zip code validation, pass code verification, City and State verification, and other similar functions. By providing such services, the Local Services Engine exponentially improves the VA component performance.

In other cases, the logic of determining and controlling the order of the VA component performance may be provided by the LSE. For example, the decision to switch to DTMF VA components if background noise is hindering speech recognition may be initiated by the LSE. In still other cases, the Local Services Engine provides VASS-like features of rendering VAs for key voice applications in order to eliminate any network latency or dependency for performing the Voice Applications.

The LSE provides a standard pluggable interface API that will allow LSE utility components to operate. The Voice Browser may also provide LSE messaging constructs to allow a VA to access the LSE utility components.

The LSE may propagate requests and data received from a Voice Browser to the appropriate LSE utility components. The LSE utility component operates on that request. Such operations may be synchronous or asynchronous. An example of a synchronous request is an authentication request to an external system. Once the requests are processed by the LSE components, the appropriate output is returned to the VA being performed by the Voice Browser.

The ASR Service 6140 provides Speech Recognition features to a VAA. The ASR service abstracts the interface to commercial Speech Recognition engines and provides the VAA a standard interface to access the Speech Recognition engines. The Speech Recognition engines are typically locally deployed on a DVAES Enabled device and provide a standard API or protocol such as MRCP to provide Speech recognition features to the VAA. Alternatively, the ASR service may provide an interface to a network based ASR engine via standard or custom protocol. Commercial Speech Recognition Engines include IBM, Nuance, and Sensory.

The voice browser initiates a connection with the ASR Service when VA components issue a speech recognition request. Such a connection between the ASR service and the Voice Browser is called an ASR Session. An ASR Session has a unique ID. The ASR could provide an instruction and transport session, an instruction only session, or a transport only session.

An instruction and transport ASR session provides a voice browser the ability to instruct the ASR engine to load a grammar (a VA component) by providing a reference to the grammar, and to begin recognition upon receiving such instruction. The ASR Service would then be waiting for the transport of the audio stream from the voice browser. Once the audio is received, and the ASR engine processes the audio, the ASR service provides the recognition results back to the Voice Browser.

Alternatively an ASR service could establish an instruction only session with the voice browser. In this case, the voice browser would instruct the ASR engine to load a grammar (a VA Component) by providing a reference to the grammar and the Voice Session ID with the Line Manager. The ASR Service would establish a transport only session with the Line Manager to receive the audio data directly from the Line Manager. In this case, the Voice Browser would be functioning in instruction only mode, and would have no control of the audio stream. The ASR session could be active and persistent for the duration of the voice browser session, hence maintaining multiple recognition contexts for the entire duration of the voice browser session. Alternatively, the ASR Session could be transient and could be established and destroyed several times during the course of a voice browser session. Also, in some embodiments an ASR session could be active and persistent for the duration of the voice session. In this case, the ASR session could potentially be maintaining multiple recognition contexts to support more than one voice browser session if such sessions are associated with a voice session.

The ASR service preferably supports a plurality of recognition engines. The ASR service may support multiple simultaneous ASR sessions providing Speech Recognition services to one or more Voice Browsers. The ASR service could also be shared between multiple VAAs or other DVAES-enabled devices.

In some circumstances the ASR Service could provide intelligent recognition management capabilities. These include the ability to do simultaneous recognition of the same utterance across different recognition engines, which could be local or remote. The ASR service could also manage the ability to use an external ASR engine for specialized (complex grammars) or higher quality speech recognition. An example of the above includes the capability to use a remote recognition engine when the local recognition engine does not provide the desired recognition accuracy for given utterance.

In an alternate embodiment, the ASR service could provide an interface to a remote transcription service. The transcription service could be used in a just-in-time mode, or in an asynchronous mode. In the just-in-time mode, the spoken utterance could simultaneously be sent to the recognition engine and to a remote live agent/person transcription service. The live agent/person transcription service may transcribe or interpret the result and provide results to the ASR service. The live agent/person could also be provided with a menu of potential choices with the audio he must transcribe. This menu could be provided by the VA in the context of what the VA expects the user's answer might be. This allows the operator to make a quick selection, to reduce any lag time in the voice application. Also, the user might be played a stalling prompt while the transcription is being accomplished. Optionally the recognition results may also be sent to the live agent/person. The live agent/person transcription service would transcribe the utterance by hearing the utterance and provide the transcription results to the ASR Service. Optionally the live agent/person transcription provider may also compare the transcription results with the recognition results provided by the ASR service and inform the ASR Service of the results of such comparison.

In the just-in-time mode, the Voice Browser would be waiting for the ASR service to complete the transcription function before it proceeds to further perform the VA component. In the asynchronous mode, the ASR service receives the utterance for transcription and informs the Voice Browser of such receipt, based on which the Voice Browser proceeds with the performance of the VA component.

The ASR Service could also provide VA components with speaker verification capabilities. A voice browser could initiate a speaker verification request to the ASR service. Once the ASR service receives such instruction, and the corresponding user utterance, the service initiates the speaker verification component of the ASR engine. The Speaker verification component would verify the utterance against a registered voice print and provide the verification results to the voice browser. The ASR service may access an external voice print database to complete the verification. Alternatively the ASR service could also perform the speaker verification process by accessing a remote speaker verification service.

Each voice browser, through its voice application interpreter, may support a plurality of grammars. This could include DTMF grammars, and ASR grammars. The voice browsers would preferably support some combination of GrXML, ABNF and NLSML (Natural Language Semantic Markup Language) to establish a recognition context for the recognizer to process spoken utterances. The recognition engine would either be provided the grammar by the voice browser, or the recognition engine would be provided a URI/URL reference to the grammar, in which case the recognition engine would fetch the grammar from a network source. Once the grammar is available, the recognition engine would compile the grammar (if it is not pre-compiled) load the grammar, and establish a recognition context for the spoken utterance. The recognition engine might also record the utterances and provide the recordings for use within the voice application.

The ASR Service 6140 would preferably provide detailed logs of internal ASR Service events to the OA&M Service 6160. The ASR Service Log items could include details of all ASR sessions, including Start Time End Time, Voice ASR Session ID, Browser ID, Line Manager Channel ID and Type, Audio and Signaling session ID and Type, ASR or DTMF Grammar, ASR or DTMF Recognized output, confidence score, n-best list, and Recorded Audio. Additionally the ASR Service logs could include detailed error messages. The logging level provided by the ASR Service may be configurable and may provide varying levels of logging in response to a configuration setting.

The ASR Service could also perform error notifications to the VAA's OA&M Service. The error notifications could range from severe to warning, and the detail level could be configurable.

The TTS Service 6150 dynamically converts text-based content to close-to-natural sounding speech and provides such capability to the Voice Browser. The TTS service abstracts the interface to commercial TTS engines and provides the VAA a standard interface to access the TTS engines. The TTS engine typically is locally deployed on the DVAES enabled device and provides a standard API or Protocol to provide TTS features to the VAA via the TTS Service. Alternatively, the TTS service could provide an interface to a network based TTS engines via standard or custom protocol. Commercial TTS Engines include, IBM, AT&T etc.

The TTS Service would receive an instruction from a voice browser to convert Text to Audio. The voice browser would initiate a connection with the TTS Service when a VA component issues a TTS request. Such a connection between the TTS service and the voice browser is considered a TTS Session. A TTS Session has a unique ID. A TTS session could be an instruction and transport session, an instruction only session, or a transport only session.

An instruction and transport TTS Session with a voice browser provides the voice browser the ability to instruct the TTS engine to convert text to synthesized audio, and to begin the conversion. Upon receiving such an instruction the TTS Service would convert the text to synthesized audio and transport the audio back to the voice browser.

Alternatively, the TTS service could establish an instruction only session with the voice browser. In this case the voice browser would instruct the TTS engine to convert text and transport the synthesized audio to a target voice session.

The TTS Service could also establish a transport only session with the Line Manager to send the audio directly to a TTS Session with the Line Manager. In this case, the Voice Browser would be functioning in instruction only mode and would have no control of the Audio Stream.

A TTS session could be active and persistent for the duration of a Voice Browser Session. Alternatively, a TTS Session could be transient and could be established and destroyed several times during the course of a Voice Browser Session. Also, in some embodiments, a TTS session could be active and persistent for the duration of a Voice Session. In such a case, the TTS session could potentially be supporting more than one Voice Browser session if such sessions are associated with a single Voice session.

The TTS service could support a plurality of TTS engines. The TTS Service could therefore support multiple simultaneous TTS Sessions providing TTS services to one or more Voice Browsers.

A TTS engine could either be provided with text by a voice browser, or the voice browser could provide a URI/URL reference, in which case the TTS engine would access the text from a network source or cache. Once the text is available, the TTS engine would convert it to synthesized audio. A TTS engine may also store the synthesized audio in a cache, or somewhere on a network resource.

The TTS Service would provide detailed logs of internal TTS Service Events to the OA&M Service. The TTS Service Log items could include details of all TTS sessions, including Start Time, End Time, Voice Session ID, Browser ID, Line Manager Channel ID and Type Audio, Signaling session ID and Type, text, and a resulting synthesized audio file. Additionally the TTS Service logs could include detailed error messages. The Logging Level provided by the TTS Service may be configurable and may provide varying levels of logging in response to a configuration setting.

The TTS Service could also perform error notifications to the VAA OA&M Service. The error notifications could range from severe to warning, and the detail level may be configurable.

The Operations, Administration, and Monitoring service of the VAA is responsible for ensuring that the VAA components are working efficiently. The OA&M Service is also the primary VAA component that interfaces with the DVAMS.

Upon start up, the OA&M Service loads the configuration materials and establishes a connection with the DVAMS. The OA&M service could operate in an active mode and/or a passive mode. In the active mode, the OA&M service starts all the other services in the VAA based on the order specified in the configuration data. In passive mode, all the VAA Services self-start based on a startup routine in the OS. Once the services have started, they register with the OA&M.

The interface between the OA&M Service and the various other VAA services may be based on an API or a messaging protocol. Examples of messaging protocols that may be used include SNMP, RPC, SOAP, and TCP/IP Messaging. The connection between the OA&M service and the DVAMS may also be based on a network provisioning, communications, and monitoring protocols or specifications like SNMP or tr-069.

The OA& M Service, based on an external instruction, such as one from a DVAMS, or a DVAES Device or service condition, may shutdown and re-start the VAA components and services. Device and service conditions include such items as CPU load, available memory, and changes in configuration. The OA&M service may notify services to reload changed configurations as an alternative to a service shutdown and restart.

The OA& M Service may receive and store log and error events received from the VAA components and services. The OA& M service may propagate such log and error information to the DVAMS and optionally to an additional Network management system. Additionally the OA&M service may send a health heartbeat signal to the DVAMS.

The OA&M service may continue to function if the DVAES-device is temporarily disconnected from the network. The OA&M Service would cache normal real-time logs until a connection is available. If the cached log size is too large, extra logs are purged as necessary to free up space to record the logs.

VAA's may be clustered to provide redundancy, to distribute processing loads, and to optimize the use of specific resources. In some embodiments, VAA services may be provided by a plurality of DVAES-enabled devices, with the dispatch of specific voice sessions to any of a plurality of VAA instances operating on disparate DVAES-enabled devices. By utilizing the voice session transport mechanisms in this manner, VAA services may be provided by whichever DVAES-enabled device is able to best provide the requested services at a specific point in time.

In addition, VAA services may be provided on specific hardware platforms in which specialized hardware assistance is provided. For example, if a DVAES includes a high-end server that provides complex speech recognition, a VAA may be configured to attempt local speech recognition on the local hardware, but to send complex or unrecognizable speech to the high-end server for further analysis. Upon receipt of the results from the high-end speech recognition server, the VAA may continue processing of VA components locally.

A VAA registers itself with a DVAMS when it is first instantiated. The registration process associates one or more specific DVAES-enabled devices, and the capabilities of those DVAES-enabled devices, with a specific VAA. The registration also signifies that the VAA instance is available for use within one or more VDAEs, which will be explained in greater detail below.

In some embodiments, a VAA may be present on a DVAES-enabled device when the device registers. However, the VAA itself needs to register with the DVAMS to receive the appropriate membership credentials and to make it available so VAs and users may be allocated to it. In other embodiments, "new" VAAs are instantiated, either by pushing them from a central repository, or by instantiating a "new" VAA (or portions thereof) on a DVAES-enabled device by downloading VAA materials. Each "new" VAA registers with a DVAMS upon instantiation, and provides information to the DVAMS regarding its capabilities, resources, and its association with specific DVAES-enabled device(s).

Figure 10:
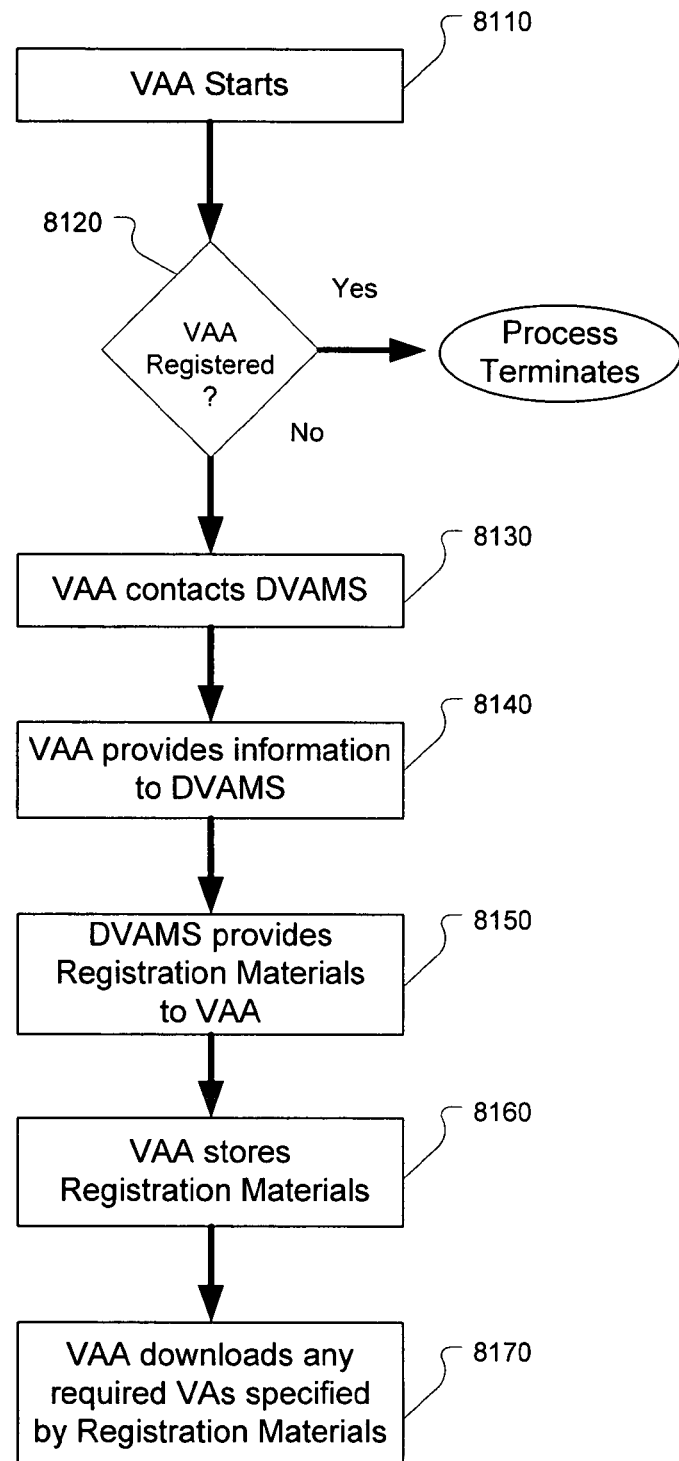
FIG. 10 is a diagram illustrating a method embodying the invention for registering a Voice Application Agent.

FIG. 10 illustrates an exemplary set of steps taken by a VAA in order to register itself. This process assumes the VAA is being instantiated on a DVAES-enabled device that has already registered with the DVAMS.

In step 8110, the selected VAA starts. Next, in step 8120, the selected VAA does a self-check to determine if it is registered. The self-check looks for materials provided by a DVAMS when the VAA is registered, and if found, uses these materials to determine if the VAA is registered. If the VAA is already registered, the process is complete. The VAA may optionally perform an integrity self-check to ensure that it is complete and has not been tampered with. If the integrity self check fails, the VAA shuts down without further processing.

Assuming the VAA has not already been registered, in step 8130, the VAA contacts a DVAMS. The DVAMS used may be the same DVAMS with which the device itself registered, or a different DVAMS. The DVAMS to use is specified in the configuration materials or certification materials for the device and VAA.

Next, in step 8140, the VAA provides the DVAMS with its device ID, VAA ID, and device/VAA configuration information. If the VAA does not already have a VAA ID, one is generated by the VAA using the unique device ID. In step 8150, the DVAMS returns membership materials to the VAA, which bind device ID, and VAA ID to the VAA. These materials may be provided by the DVAMS directly to the device, or it may be provided to a distribution mechanism from which they are subsequently downloaded by the device.

In step 8160 the VAA stores VAA registration materials in VAA configuration materials. Finally, in step 8170, the VAA downloads any required VA components specified by the VAA registration materials. Further, if a local service component is required by the VAA configuration materials, the VAA startup process starts the local service component If a DVAES-enabled device has multiple VAAs configured on it, the registration process repeats for each VAA on the device. Note, this process can repeat for each user and VAA on the device. Different users may be associated with different VAAs, and with different DVAES, or a single user may be associated with a plurality of VAAs in the device. Associations between the device, user, and VAA are managed between the device configuration materials and the respective DVAMS's.

Each VAA also starts its own line manager, which in turn starts the defined voice browsers and voice applications defined in the configuration materials. If no startup voice browsers are defined in the configuration materials, a VAA may not initiate a voice browser upon booting and functions as a telephony gateway.

If a VAA-specific caching component is required by the VAA configuration materials, the VAA startup process also starts the cache manager and cache interface, as necessary.

Changed items in the cache are refreshed during the booting process as required by the appropriate cache rules. For example, if a user changes his voice application preferences on a remote server, the changes are propagated to the DVAES-enabled device as part of the requisite re-rendering and propagation of the user's personalized VAs.

Figure 11:
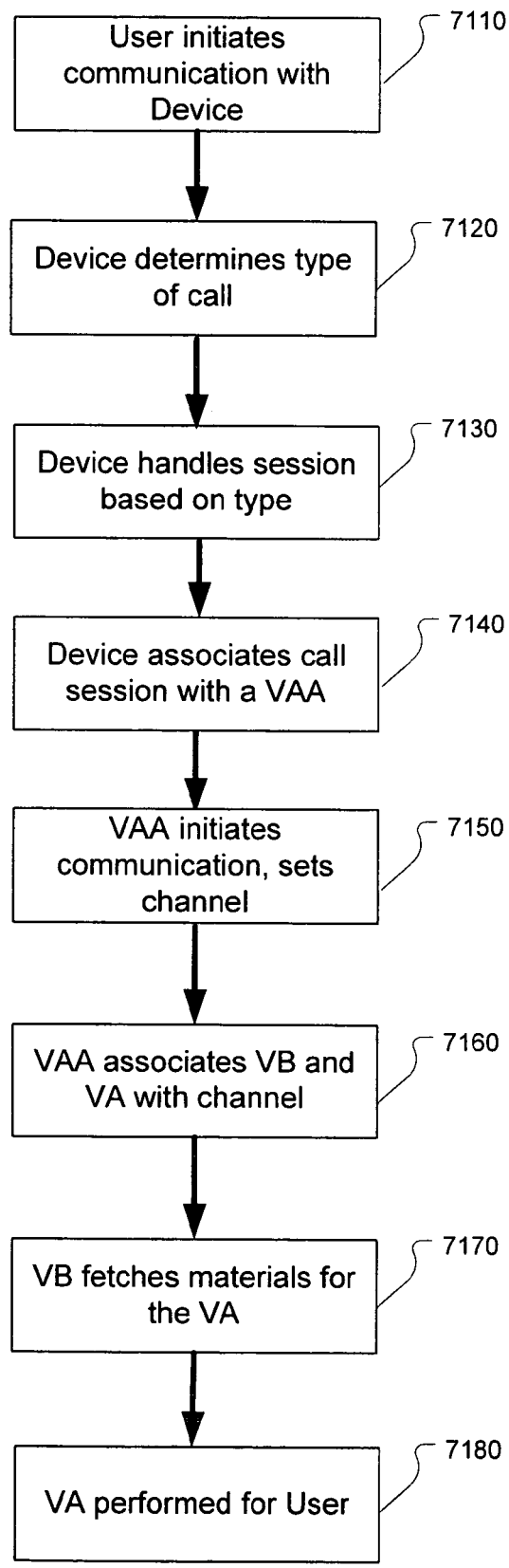
FIG. 11 is a diagram of a method embodying the invention for conducting a Voice Application with a user.

We will now turn to a typical process which would occur when a user wants to run a voice application. References will be made to FIG. 11, which illustrates this method.

In step 7110, a user action occurs to initiate communication with the DVAES-enabled device. This could occur when the user lifts a telephone handset off hook on a connected telephone device, or possibly by pushing a physical or virtual switch on a telephone device or a microphone to signal that the user wants to initiate activity. This could also occur if a call is received from a phone network, whether that be a PSTN or via a VoIP network. Further this could occur if a user speaks a key word or phrase that signals that the user wishes to initiate activity.

In step 7120, the DVAES-enabled device determines the type of audio and signaling session. In steps 7130 and 7140, the DVAES-enabled device associates an audio and signaling session with a specific VAA on the basis of the configuration materials for the device and/or VAA. This association is a voice session. The DVAES-enabled device performs a lookup of configuration materials as part of the process to associate the session with a specific line manager, based upon attributes of the session such as the hardware device, ANI, or other attribute.

In steps 7150 and 7160, the line manager establishes a connection between the voice session and a voice browser, which creates a voice browser session. The line manager determines which voice browser and VA to run (although in alternate embodiments, the user may make this determination) based on configuration data or dynamic rules (e.g., rules based on hardware interface, phone line, date, time, etc.). In some instances, the voice browser is already running and the VAA connects the voice session to an already running instance of the voice browser. For example, a voice browser may be preconfigured to listen for "hot words" and DMTF instructions. This voice browser may be left running between uses to reduce the amount of time spent stopping and restarting a voice browser with the same voice application. In other instances, the VAA may create a new instantiation of a voice browser to handle the VA.

In step 7170, the voice browser fetches materials as necessary for the voice application. The running voice browser fetches (if needed) the specified voice application components from the cache mechanisms of the VAA, or possibly from a VASS or CDS, in accordance with the DVAMS provided content management rules. Voice application components, including required resources, audio files, and data may be located in VAA cache, device cache, local storage, a CDS, a VASS, a DVAMS, and/or a third party network.

Finally, in step 7180, the voice browser performs the VA to enable interactions with the user.

The Content Distribution Service

The Content Distribution Service (CDS) may be deployed in strategic locations of the network. The CDS is an optional component of a DVAES that may be helpful to overall system performance when the DVAES user base substantially increases. The CDS provides network-based caching of content such as VA components, audio files, grammars, etc. in the broadband service provider's network. This caching helps performance by reducing network traffic latency by moving static content closer to the network edge.

Content Distribution Service systems are well understood by those skilled in the art, and are provided commercially by companies such as Akamai Technologies, Boston Mass.

The Distributed Voice Application Management System

A Distributed Voice Application Management System (DVAMS) is responsible for operating, monitoring, and administering a DVAES. The DVAMS also provides device, user, and DVAES-component registration services, and provides administration support for configuring one or more Virtual Distributed Application Environments (VDAEs) that may be deployed using specific DVAES implementations. The concept of a Virtual Distributed Application Environment is discussed in greater detail below.

The DVAMS hardware includes proxy servers, web servers, application servers, load balancers, and other commercially available systems that are integrated to accomplish the goals, functions and purposes of the DVAMS. Foundation software for a DVAMS includes standard server based computing technologies such as Dot-Net, PHP, and Java.

Some of the functions performed by the DVAMS include:
1. Real time voice application management, which includes voice application installation, activation, deactivation, monitoring, and parameter configuration.
2. System monitoring, which includes monitoring hardware and third party software, monitoring for errors, warnings and notifications.
3. System configuration, which includes setting parameters and configuration files, executing recovery routines, and platform image rollback capabilities.
4. Allocation of resources to individual users, DVAES-enabled devices, and services to effect a smoothly operating DVAES. This allocation of resources could help to establish one or more Virtual Distributed Application Environments (VDAEs), which are discussed in more detail below.
5. Collection and analytical processing of system data produced during the operation of each DVAES. This data primarily includes system configuration settings and information collected during runtime from various DVAES services and components. For instance, the data could include monitoring results, tuning logs, and error notifications. As noted above, this data can be analyzed and used during the VA rendering process to help customize or personalize individual rendered VA components that are allocated to particular users.

One of the important functions performed by the DVAMS is the registration of users, DVAES-enabled devices, VAAs and VAs. The DVAMS may maintain one or more registration directories to track registration information, and associated credential information. The DVAMS registration directories can function to integrate and publish information about a user, a group of users, devices, VAAs, VAs and VASSs. The registration directory may be constructed using a commercial directory product such as openLDAP (open source). Alternatively, commercial directory services such as those provided by Novell (Provo UT) may be used. In other embodiments, a database such as those commercially available from Oracle or Microsoft may be used.

As explained in more detail below, the DVAMS Registration Service could be a web-based interface, or the Registration service could function through one or more VAs. One preferred implementation of the DVAES registration service is a SOAP-based web service, although other forms of service may be provided as implementation requirements dictate. The registration service accepts a request for registration from a DVAES-enabled device, a user, a group of users, VAAs, and VASSs, validates this request, and if the request is valid and authorized, enters the registration information in the DVAMS registration directory.

Figure 12:
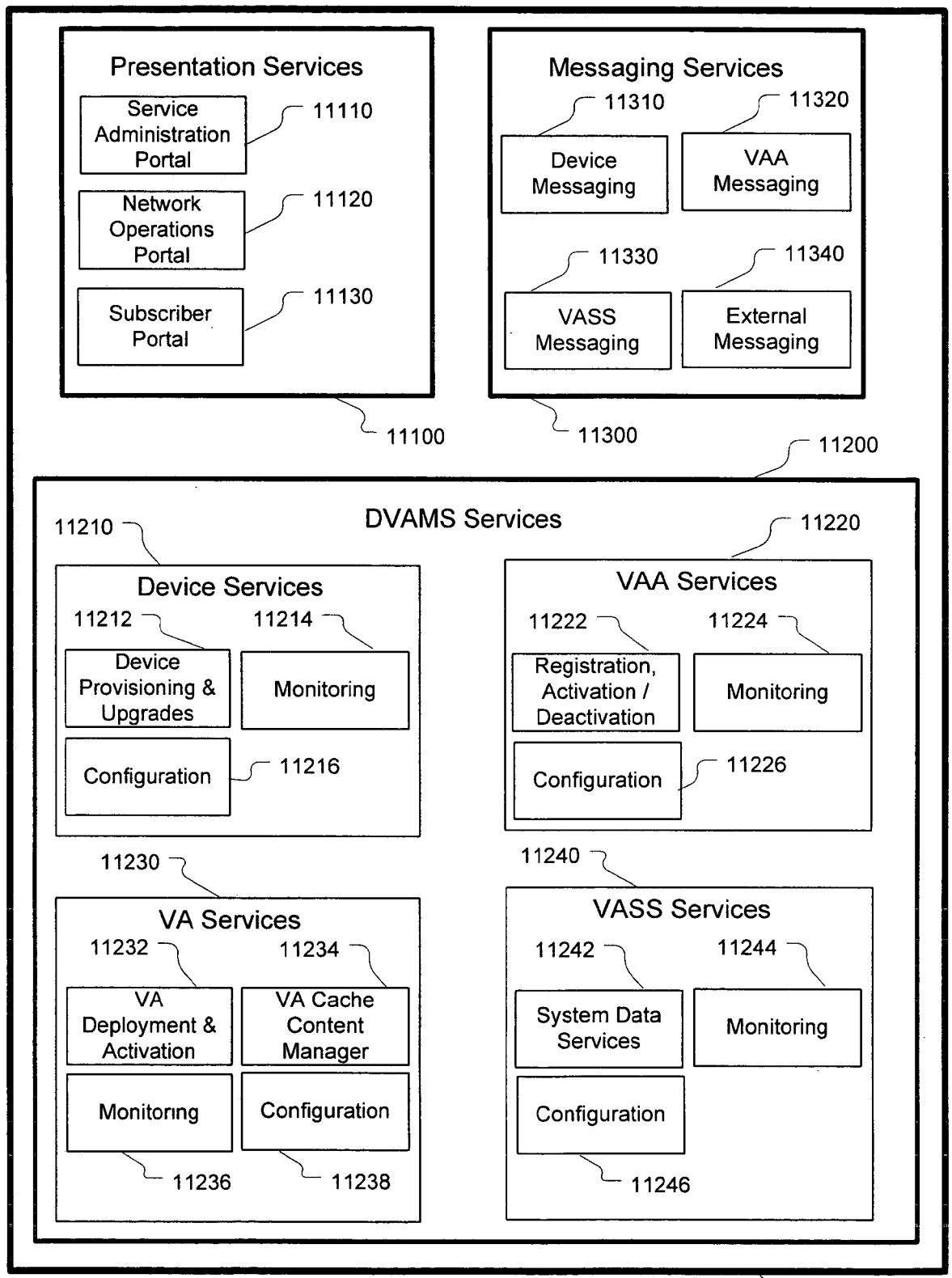
FIG. 12 is a diagram of elements of a Distributed Voice Application Management System embodying the invention.

FIG. 12 shows the components of an exemplary embodiment of a Distributed Voice Application Management System (DVAMS) 11000. The DVAMS comprises Presentation Services 11110, DVAMS Services 11200, and Messaging Services 11300.

The Presentation Services 11100 include the components of a DVAMS that provide user interfaces, service and administration interfaces for operations personnel, and other public interfaces to DVAMS and DVAES services. Specifically, the presentation services can include a Services Administration Portal 11110, a Network Operations Portal 11120, and a Subscriber Portal 11130.

The Service Administration Portal 11110 would be used by Customer Care and DVAES Operators to manage a DVAES, its voice applications, and users. The Service Administration Portal would typically be a web based system that provides user and device management features. The Service Administration Portal will also facilitate provisioning of application features by establishing configuration parameters and application preferences for different users.

Operators will use the Service Administration Portal to create users and provision the different application features available to the user. The Service Administration Portal could also provide an operator the ability to organize users into groups and to assign roles and permissions to the users and groups for the purpose of administering the applications available to the users/groups of users. The users could be grouped based on regional locations, or communities, or based on their membership in a particular organization.

An operator may enable a device associated with a user using the Service Administration Portal. Activation of the device will allow the user to access the different voice applications using the device.

The Operator may additionally create one or more VDAEs using the Service Administration Portal, and assign users, applications and associated devices to particular VDAEs.

The Service Administration Portal could also be used by an operator to generate reports and device monitoring and error notification information that would facilitate management of the applications and devices associated to a user.

The Network Operations Portal 11120 could be used by Network Operations Center (NOC) personnel to manage and monitor the underlying hardware and software elements of the DVAES. Network-centric monitoring applications are well understood by those skilled in the art. The Network Operations Portal could also be a web-based application.

The Subscriber Portal 11130 provides a personalized environment for users to manage and access their voice applications and device configurations. The subscriber Portal might also allow new users to register for services, as described below. Additionally, the portal may act as a medium for operators to provide users with enhanced applications in the form of pluggable user interface components called "portlets." The Subscriber Portal may also facilitate the provision of promotional information and customer support to the users.

In some embodiments, users may be able to manage aspects of their DVAES-enabled devices, such as the device configuration settings. In addition, the Subscriber Portal may allow a user to add or subscribe to new VAs, to modify their existing VAs, and to cancel VAs.

The Subscriber Portal may also provide users with the ability to customize various VAs based on user preferences, and for the user to associate themselves with one or more DVAES-enabled devices. The customized VAs would then be used by one or more DVAES-enabled devices to provide a personalized user experience.

One example of how a user might customize a VA would involve a VA designed to provide the user with messaging via e-mail, or voice mail. The user could customize the messaging application to greet callers with personalized messages, or provide call handling of incoming calls based on different caller profiles. In other embodiments, the user may be able to customize e-mail messaging applications to notify the user of the receipt of important e-mails by ringing a phone connected to the device and playing an alert message. Of course, the Subscriber Portal could allow a user to customize VAs in many, many other ways.

Figure 13:
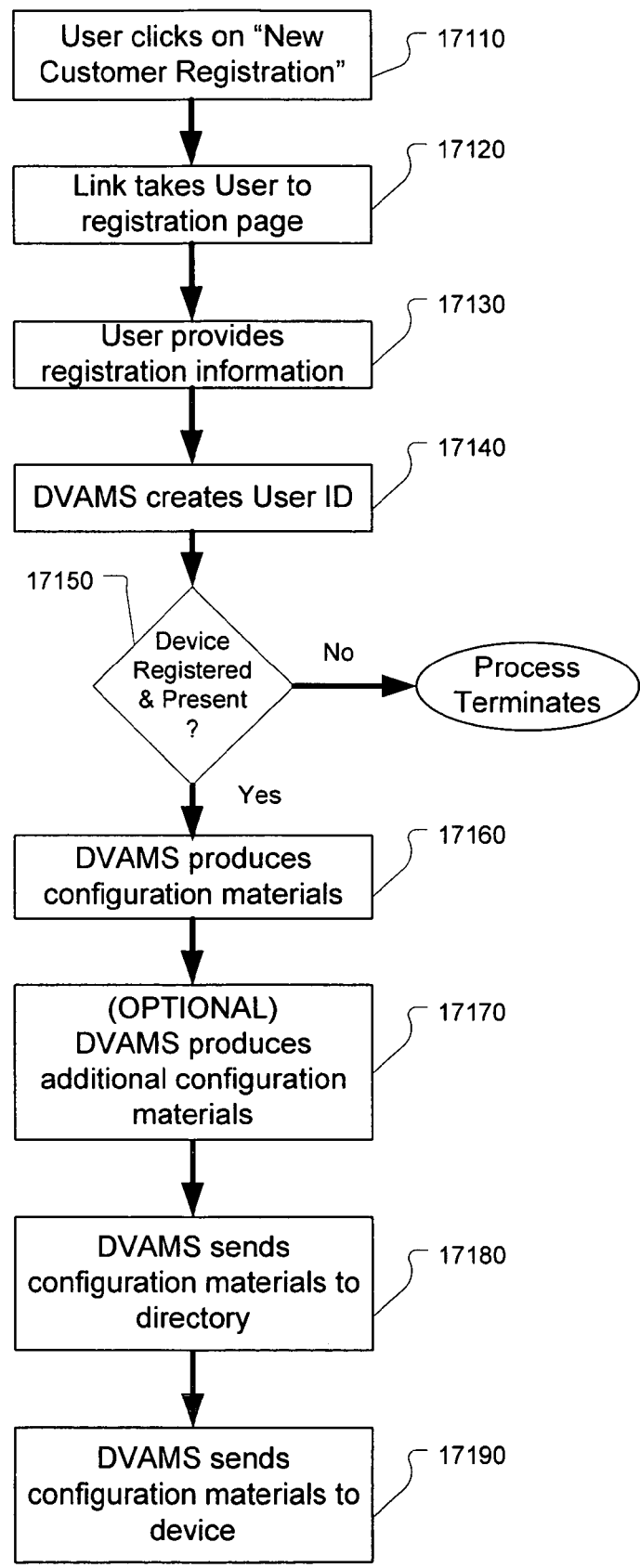
FIG. 13 is a diagram of a method embodying the invention for registering a new user.

As noted above, the Subscriber Portal 11130 may allow a user to register with a DVAES. This would typically be a web-based portal that a user could access to register for services. FIG. 13 illustrates a process in which a user registers and activates their account using a web-based Subscriber Portal of a DVAMS.

In step 17110 the User clicks on the new customer registration link. In step 17120, the link takes the user to the new customer registration page. This page is hosted/controlled by a DVAMS.

In step 17130 the user inputs personal information via the web interface. The Personal information could include Name, Address, Phone Number, a Password, a list of Device ID(s) (as provided by the device documentation), service selections, and additional personalization information.

In step 17140 the DVAMS would create a user ID, if necessary. As mentioned above, a user could be authenticated in various different ways, including through a voice print analysis. Thus, the input or generation of a user ID and password may not be necessary.

In step 17150 the DVAMS checks to see if a DVAES-enabled local device which is available to the user is already registered. If not, the process would terminate. Of course, the user could always return to the portal after a device available to the user has been registered. Also, as explained below in connection with FIG. 14, once the user is registered with the system, the user could access the DVAMS using an activated and registered DVAES-enabled device to associate himself with the device.

If the result of the check in step 17150 indicates that a DVAES-enabled device available to the user has already been registered, then in step 17160 the DVAMS produces configuration materials, including binding materials for user/devices. In optional step 17170, the DVAMS may also produce other, optional configuration materials. In step 17180 the DVAMS pushes he configuration materials to a directory. A notification may also be sent to an associated VASS of this change in the system configuration, which would cause the VASS to render personalized VAs to the device associated with the user. In step 17190, the DVAMS would push configuration materials to the device itself, possibly via a CDS. An optional notification may be sent to the device or DVAES components to facilitate the pushing of the materials from the CDS to the device.

Figure 14:
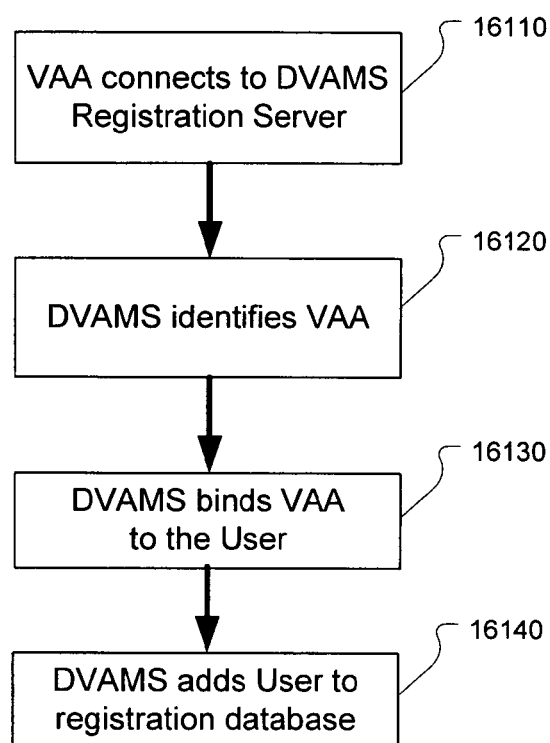
FIG. 14 is a diagram of a method embodying the invention for associating a user with a particular DVAES-enable device.

As noted above, if a user has been registered and activated, and the user needs to associate himself with a DVAES-enabled device, the association could be accomplished using a VA. This might be necessary the first time that a user subscribes to the DVAES, or the user might wish to associate himself with a second or additional device in the DVAES. For this to be possible, the user would need access to a DVAES-enabled device, and that DVAES-enabled device and a VAA on the device would need to be registered and connected to the DVAES. FIG. 14 illustrates such a process.

In step 16110 the VAA would connect to a registration service in a DVAMS. Next, in step 16120, the DVAMS would identify the VAA from configuration materials. In step 16130 the DVAMS would bind the VAA to the user. Then, in step 16140, the DVAMS adds or updates the user information in a registration database.

Note, the processes of registration of a DVAES-enabled device, a VAA, and optionally a user may all be combined in a single process.

Returning now to a description of the other elements of the DVAMS, the Messaging Services 11300 of a DVAMS could comprise, among other things, a Device Messaging component 11310, a VAA Messaging component 11320, a VASS Messaging component 11330, and an External Messaging component 11340.

The Device Messaging component could operate to send notification messages to DVAES-enabled devices. This could include messages regarding cache updates and refresh notifications. In addition, the Device Messaging component could function to receive messages from DVAES-enabled devices. Received messages could include device operation logs, and error messages.

Likewise, the VAA Messaging component 11320 could send messages to VAAs regarding cache update and refresh notifications, or regarding the need to receive new VAs. The VAA Messaging component could also function to receive and process messages from operating VAAs, including operations logs, and error messages.

The VASS Messaging component could operate to send messages to VASSs regarding such things as the need to render new VA components for particular DVAES-enabled equipment, or the need to re-render VA components to a particular user's DVAES-enabled equipment to further modify or personalize the VA. The messages could also direct VASSs to transfer or copy various items of content into one or more CDSs. The VASS messaging component could also operate to receive messages from the VASSs, such as operations logs and error messages.

The External Messaging component 11340 could be used to send messages to various users, and/or to various third parties, such as service providers that are available to users via the DVAES. For instance, audio and/or e-mail messages could be sent to users to advertise the availability of VAs. The decision to generate these sorts of messages could be based on the user's patterns of use, or their personal characteristics. Likewise, the External Messaging component could generate and send messages to third parties, like service providers, to inform them of new DVAES capabilities, or the existence of new user-subscribers who might be interested in using their services. Or course, the External Messaging component could be used to send any number of other sorts of messages to users and third parties.

The DVAMS Services component 11200 can be broadly divided into Device Services 11210, VAA Services 11220, VA Services 11230, and VASS Services 11240.

The Device Services component 11210 could include, among other elements, a Device Provisioning and Upgrades component 11212, a Monitoring component 11214, and a Configuration component 11216. These services provide support for device registration, deployment, and device tests, as well as monitoring and configuration services. The Device Provisioning and Upgrades component 11212 could include deployment and boot testing for a DVAES-enabled device, its OS, firmware, networking, and audio and signaling layers. The Monitoring component could function to monitor device heartbeat signals, device logs, device errors, device CPUs, and device memory and cache allocations. The Configuration component 11216 could function to manage and control device settings, device start-up, and device shut down.

The Device Services component 11210 would typically provide a service interface to a device registry which enables the registration of DVAES-enabled devices within the DVAES architecture. Registration is a process by which information about a specific DVAES-enabled device is collected and stored in the device registry, and the device is issued a DVAES credential that indicates that the device has been registered. Information collected about each device could include the device's unique ID and device configuration materials, including component versions present on the device, hardware capabilities, and the like. Examples of the type of materials collected are included in the list of device capabilities described elsewhere.

Once information about the device has been collected, it is stored within the device registry. The device registry can be a unique registry dedicated to the management of device information, or it may be a more general service such as a DVAMS registration directory.

After the device has been registered, a DVAES credential is constructed that indicates that a particular device has been registered with a DVAMS. The DVAMS credential may indicate the device's unique ID, that it was registered with a particular DVAMS, and also may indicate an expiration date after which the credential is no longer valid. Other information also may be included in the credential. The DVAES credential is returned to the device as an indication that it has been successfully registered.

The service interface to the device registry that is provided by the Device Services component 11210 could take at least two forms. First, the service interface could include a web user interface that would allow DVAES operators to manually register and manage DVAES-enabled devices and associated information stored within a device registry. The service interface could also function as a fully or partially automated interface that allows devices to directly register with a DVAMS once they are connected to the network. Such an automated service interface to the DVAMS's device registry could take the form of RPC, SOAP, or other well-known service interface mechanisms.

Figure 15:
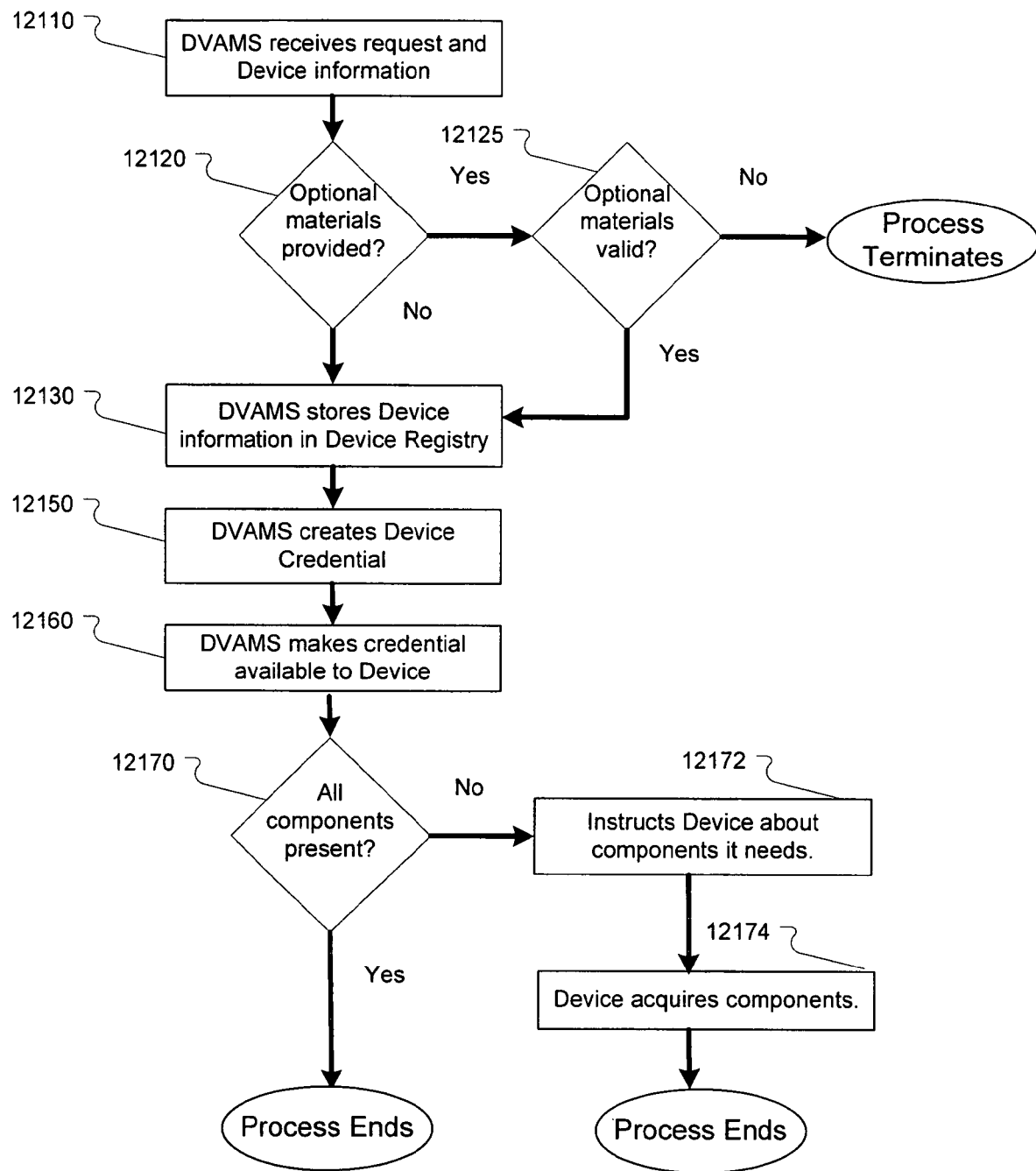
FIG. 15 is a diagram of a method embodying the invention for registering a DVAES-enabled device, and providing the device with credentials.

A device registration process that would be conducted by the Device Services component 11210 is depicted in FIG. 15. Such a process would typically be performed by the DVAMS in response to a "register device" request.

First, in step 12110, the DVAMS would receive the registration request, along with the device's unique ID, and the device's capabilities/configuration materials. Optional information included with the request may also include an account/password or other materials indicative of the business relationship between the DVAMS operator and the device's owner.

Next, in step 12120, the DVAMS makes a determination if the materials provided by the device need validation. If so, the method proceeds to step 12125 where the materials are checked to determine if the device can be registered. If the device cannot be registered, the process terminates with a failure to register the device. If the device can be registered, or if no materials requiring validation were provided in the first place, the method proceeds to step 12130, where the DVAMS stores the device's information in the DVAMS device registry. If information about this particular device was already present in the registry, the DVAMS replaces the contents in the registry with the newly provided information.

In step 12150, the DVAMS creates a device credential. In one embodiment, the device credential is a SAML assertion that binds the device's unique ID with the DVAMS that registered it. Note, the device credential may bind the device to another DVAMS if so required by the architecture. This would result in the device being registered by a first DVAMS, but being controlled by a second DVAMS. A copy of the credential may be optionally stored in the device registry.

In step 12160 the DVAMS makes the device credential available to the device. This could be accomplished by having the DVAMS directly downloading the credential to the device, or by publishing the credential to a CDS and informing the device of the location of the credential.

In an optional additional step 12170, the DVAMS may check the device's configuration to determine if the device has all required DVAES-enablement components. If not, method may proceed to step 12172, during which the DVAMS would instruct the device as to the additional components it requires. This instruction from the DVAMS could also include information about where the device can acquire the additional components. Then, in step 12174, the device would acquire the additional required components. Steps 12172 and 12174 could also be accomplished by having the DVAMS simply downloading the required components into the device.

In other alternate embodiments, the results of steps 12172 and 12174 could be accomplished by having the DVAMS create a new instance of the device's component list, and then publishing that list to a CDS. The DVAMS would then notify the device that the component list has changed, and require the device to download the new component list from the CDS. The device could then download any missing components.

Returning now to the description of the elements of the Device Services component 11210, the Device Monitoring component 11214 could function to monitor device heartbeat signals, device and operating system error reporting, and resource utilization, including utilization of CPU and memory. The DVAMS device-monitoring component preferably comprises an instance of a heartbeat service, an SNMP trap sink for error reporting, and an SNMP-based resource-monitoring component.

The Device Configuration component 11216 provides configuration management of devices, including management of service configurations, which comprises two aspects, configuration collection, and the management of the configuration section of the device registry. Configuration collection may be provided using SNMP, TR-069, or other protocols for collecting configuration materials from a device. Once configuration materials are collected, they are associated with a device and stored in the device registry for subsequent use.

The VAA Services component 11220 could include, among other elements, a Registration, Activation, and Deactivation component 11222, a Monitoring component 11224, and a Configuration component 11226. The functions of the Registration, Activation, and Deactivation component are self-explanatory. The VAA Monitoring component could function to monitor various VAAs aspects, such as VAA heartbeat signals, VAA application logs, VAA recognition logs, and VAA errors. The VAA Configuration component could function to enable VAA extensions, VAA lines, VAA codices, and recognizer tuning parameters.

The DVAMS VAA services component provides a service interface to a VAA registry, which enables the registration of VAAs on DVAES-enabled devices within the DVAES architecture. The service interface to the VAA registry could take at least two forms. First, a web user interface for DVAES operators would permits DVAES operators to manually register and manage VAAs on specific DVAES-devices and associated information stored within a VAA registry. Alternatively, the service interface could be a fully or partially automated interface that allows VAAs to directly register with a DVAMS. An automated interface to the DVAMS's VAA registry may take the form of RPC, SOAP, or other well-known service interface mechanisms.

The service interface provides the capability to "register" a VAA. Registration is a process by which information about a specific VAA and its underlying device is collected and stored in the VAA registry, and the VAA is issued a DVAES credential that indicates that the VAA has been registered. Information collected about each VAA includes the VAA's unique ID, VAA and device configuration materials, including component versions present on the device, hardware capabilities, and the like. Examples of the type of materials collected are included in the list of device capabilities described elsewhere.

Once information about the VAA has been collected, it is stored within the VAA registry. The VAA registry can be a unique registry dedicated to the management of VAA information, or it may be a more general service such as a DVAMS registration directory.

After the VAA has been registered, a DVAES credential is constructed that indicates that a particular VAA has been registered with a DVAMS. The DVAMS credential indicates the device's unique ID, the VAA unique ID, and that the VAA was registered with a particular DVAMS. The credential may also indicate an expiration date, after which the credential is no longer valid. Other information may also be included in the credential, as desired. The DVAES credential is returned to the VAA as an indication that it has been successfully registered.

Figure 16:
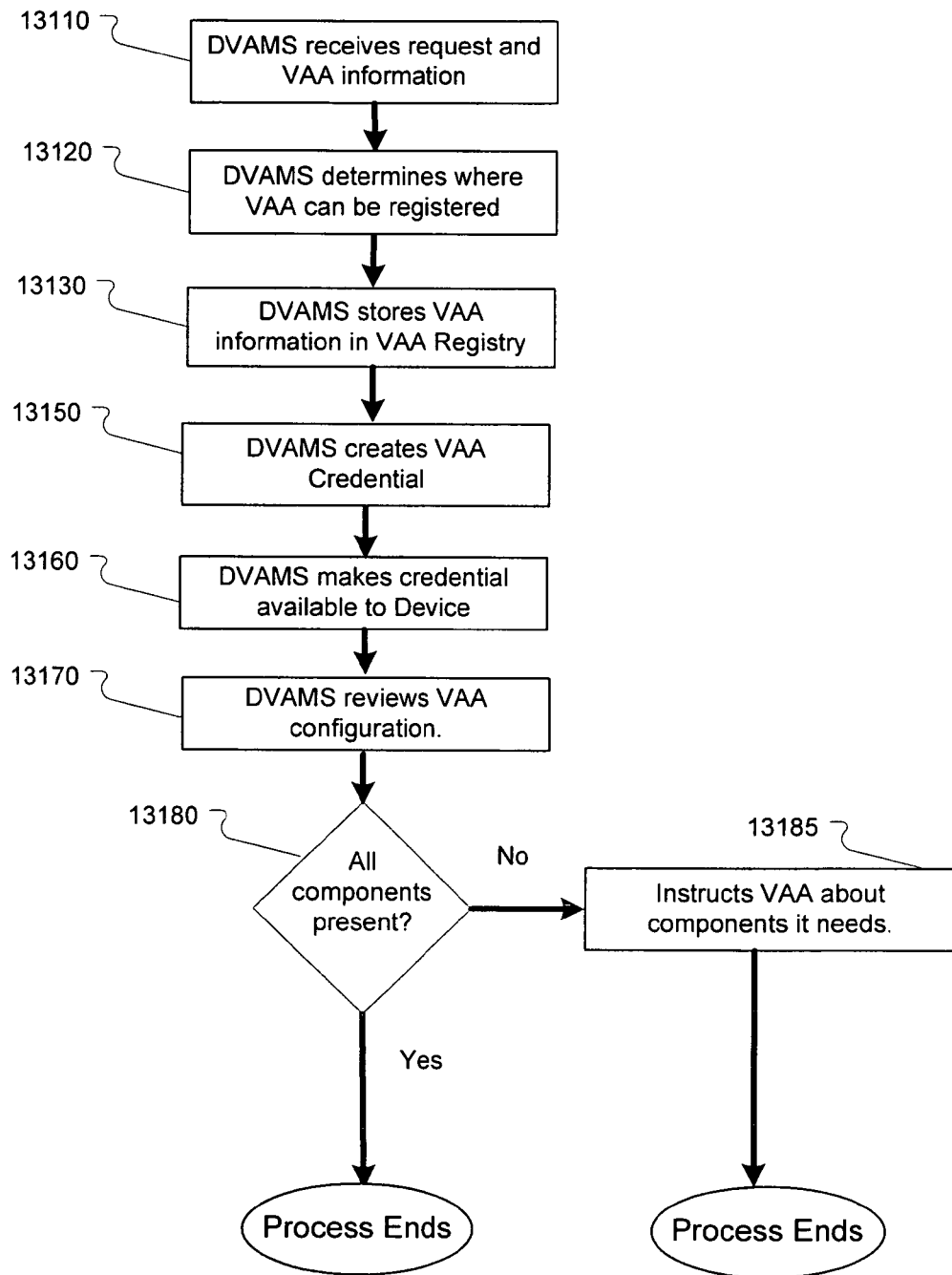
FIG. 16 is a diagram illustrating a method embodying the invention for registering a Voice Application Agent.

A process such as the one shown in FIG. 16 is performed by the DVAMS in response to a "register VAA" request. This process would typically be performed by the Registration, Activation and Deactivation component 11222 of the VAA Services component 11220.

In step 13110, the DVAMS receives the request, the device's unique ID, the VAA's unique ID, and the device's capabilities/configuration materials. In step 13120 the DVAMS makes a determination about where the VAA can be registered. The decision may be made based on a number of factors, including aspects of the device the VAA is running in, details about the owner of the device, or other factors such as performance and the ability of a DVAES to support the particular device or device configuration.

In step 13130 the DVAMS stores the VAA's information in the DVAMS VAA registry. If the VAA was previously registered, the process replaces the contents in the VAA registry with the newly provided contents.

In step 13150 the DVAMS creates a VAA credential. In one embodiment, the VAA credential is a SAML assertion that binds the device's unique ID with the VAA's unique ID and with the DVAMS that registered it. Note, the VAA's credential may bind the device to another DVAMS. In this instance, a first DVAMS would have registered the VAA, and a second DVAMS would be responsible for future monitoring and control of the VAA. A copy of the credential may be optionally stored in the VAA registry.

In step 13160 the DVAMS makes the VAA credential available to the VAA, either by downloading it to the device, or by publishing the credential to a CDS and informing the device of the location of the credential.

In step 13170, the DVAMS reviews the VAA configuration. Then, in step 13180 the DVAMS determines if the VAA has all required components. If all required components are present in the VAA, the process ends. However, if the result of the check in step 13180 indicates that all required components are not present in the VAA, the method proceeds to step 13185, wherein the DVAMS instructs the device as to the new components it requires. This instruction may be performed by downloading required components directly into the VAA, or by providing to the VAA a list of the required components, or by other means.

The result of step 13185 could also be accomplished by creating a new instance of the VAAs component list, publishing that list to a CDS, and then notify the VAA that the component list has changed. The VAA could then download the new component list, download any missing components, and then restart to load the new components.

Returning now to a description of the elements of the VAA Services component 11220, the VAA Monitoring service 11224 could include an instance of a heartbeat signal monitoring service and centralized log collection from the VAA. Log collection may be undertaken using a common logging protocol such as syslog, or may be implemented using a custom log management process. ASR and TTS logs are also managed in this way.

The DVAMS receives performance logs, VA logs, TTS logs, and ASR logs from VAAs, and performance metrics from DVAES-enabled devices. These logs are processed by the DVAMS to identify errors and non-optimum performance. Based on these analyses, changes may be made in the personalization materials associated with a user, a VAA, or a device (depending upon type of change).

For instance, based on the analysis of collected information, the DVAMS may generate a new ASR grammar to correct speech recognition failures for a particular user. The DVAMS would then associate the newly generated ASR grammar with a user's preferences so as to correct ASR deficiencies in all newly rendered VA components. The DVAMS might also cause previously rendered VAs to be re-rendered to incorporate the newly generated ASR grammar.

In a second example, if VA logs indicate that a user consistently makes certain selections during the processing of a voice script, the DVAMS may act to change the presentation order preference associated with the voice script for that user's rendered copies of the VA.

In a third example, if the DVAMS recognizes that there are a significant number of cache misses when performing voice applications on a particular DVAES-enabled device, the DVAMS may take corrective action by adjusting the cache rules to provide additional cache space and to hold VA components in cache longer.

The above examples are merely a few of the ways that the DVAMS can use collected information to improve the processing and performance of a DVAES.

Returning now to a description of the elements of the DVAMS Services of the DVAMS, the VA Services component 11230 could include, among other elements, a VA Distribution and Activation component 11232, a VA Cache Content Manager 11234, a VA Monitoring component 11236, and a VA Configuration component 11238. The VA Distribution and Activation component could function to control rendering, activation, deactivation, and registration of VAs. The VA Cache Content Manager would function to organize content for caching. The caching could be based on various system events. The VA Monitoring component could function to monitor and log user usage for billing, VA heartbeat signals, and/or VA application logs. The VA Configuration component would function to control VA permissions, VA privileges, and default behavior. Some of these items would be controlled or configured based on individual user's characteristics, their usage patterns, and their stated preferences.

The VASS Services component 11240 could include, among other elements, a System Data Services component 11242, a VASS Monitoring component 11244, and a VASS Configuration component 11246. The System Data Services component could provide a VASS with access to DVAMS data (e.g., logs, User billing information, Class of Service, user characteristics, etc.). The VASS Monitoring component could operate to monitor VASS heartbeat signals, VASS errors, VASS logs, traffic, server load, CPU, and memory usages. The VASS Configuration component could operate to control various VASS parameters and data access locations.

In alternate embodiments, the DVAMS could be configured such that the VA deployment and activation component 11232, the VAA registration, activation and deactivation component 11222, and possibly the VASS configuration component 11246, are all organized under a consolidated DVAMS distribution service. The DVAMS distribution service would be responsible for moving the VA components and the VAA components to target locations.

A deployment specification would inform the distribution service to either move VA and/or VAA content to the CDS, or to move the content to a DVAES enabled device, or a combination of the above. The distribution service could process the move instruction by physically moving the components to the target destinations in a push model, or by instructing the targets to refresh themselves from a storage location. The distribution service may also have the ability to interface with cache service on the DVAES enabling layer of a VAA and/or with the VAA cache service.

In other embodiments, the DVAMS may have a deployment service that is responsible for deploying VAAs to DVAES-enabled devices, and also possibly VAs to a VASS.

The deployment of VAAs could be triggered when a user registers with the system, when a DVAES-enabled device registers, or by a deployment specification identifying a required VAA. Upon the occurrence of a triggering event, the DVAMS deployment service would begin deployment by distributing VAA components and VAA configuration materials to DVAES-enabled devices. The VAA components may initially be stored in a DVAMS storage area such as a registry.

The DVAMS may use the above-mentioned distribution service for deploying the VAA components and VAA configuration materials on DVAES-enabled devices. First, the DVAMS would create and provide a deployment specification to the distribution service. The deployment specification for a VAA may include information about the VDAE, the location of a CDS, a deployment model (pull/push), a list of VAA components that need to be deployed, and other DVAES specific deployment considerations (for instance, the component Packing and Unpacking modes supported by the DVAES OS). The DVAMS may, in some circumstances, may only deploy the VAA configuration materials or a few VAA components.

The deployment of VAs could be triggered by an automated instruction, or a manual instruction from an operator which is input via the Service Portal. The VA may initially be stored in the DVAMS storage area. Upon the occurrence of a triggering event, the deployment service would generate VA deployment specifications and move the VA and the deployment specifications to the VASS storage area. The deployment specifications for a VA may include instructions for the VASS that are used in the rendering process (for instance, a location for the rendered VA components, DVAES constraints etc.). In addition, the VA deployment specifications could also be used by the DVAMS distribution service.

As mentioned, the DVAMS manages many broad categories of data. The DVAMS can use this data as part of an analytics process, which is continuous, which is intended to constantly improve the customization of VAs for individual users. The objective of this analytics process is to intelligently correlate data generated by the DVAES during its functioning with historical DVAMS data, and with the data stored in all repositories, to improve the usability of the Voice Applications. The improvement to user experience could be specific to a user, a group of users, a specific device, a VDAE, or some combination of the above. The impact of the analytics could be to render VA components, or the VAA, or in some cases even the VASS and the DVAMS itself.

The analytics are configured to detect that a specific user is not getting a desired usability result from a VA or a group of VAs. This could be due to a variety of factors such as speech recognition accuracy, VA user interface design flaws, device performance degradation, a particular input device not operating properly with a specific user, user voice accents, certain other user demographics, and a variety of other factors.

The analytics engine correlates available data about a user, and possibly data about that user's local devices, with other pertinent system data to determine root causes of any problems. In some cases, a VA might be provided for the user to collect information from the user to further narrow or determine root causes of lack of performance. For example, the analytics process might determine that the device under use is constantly low on memory and/or CPU, hence it does not perform well on large grammar recognitions. The analytics might determine that the device is used in an environment that has very poor background noise, or that the user is saying a phrase that is not supported by the grammar etc. Based on such results, the Analytics engine will take corrective steps to personalize the VA or the VAA to resolve such issues.

These steps taken to resolve any detected problems could include a change in a component of the VAA, such as an acoustic model of an ASR engine, an alteration to a grammar or audio resource VA component, a change in the order of VA components that are performed, an addition of more error recovery and management features to VA components, or a variety of other steps.

The analytics engine could also operate to render highly personalized VA components in a more proactive manner to improve user performance. The analytics engine could decide that the user's skill level has changed based on observing the user's usage pattern. As a result, the analytics engine may determine that the user should use a more intuitive and streamlined user interface, instead of a verbose interface. The engine could also change the size of the cache of the VAA based on how the rest of the resources on a device are utilizing the memory.

Also, the analytics process may initiate content distribution to the device proactively to eliminate latency. For instance, the analytics engine may determine that a user accesses certain types of content at approximately the same times each day. For instance, the user may access sports team scores or news headlines at approximately the same time each day. In that instance, the analytics engine will ensure that the desired content is proactively cached on the user device in advance of the time that the user would typically access the data, which should make the delivery of the information to the user more rapid.

Having now described the major elements of a DVAES embodying the invention, the discussion will now turn to how the various described elements can be organized and configured to efficiently provide services to users.

The first concept to introduce is a Virtual Distributed Application Environment (VDAE). A VDAE is essentially a logical grouping of:
1. A set of users, or a plurality of groups of users; or
2. A set of DVAES-enabled equipment; or
3. A set of DVAES-enabled equipment and/or VASSs and/or CDSs; or
4. A grouping of any combination of the above-mentioned elements.

The purpose of creating a VDAE is to provide a logical connection between VDAES users and elements to facilitate the management of the users and elements. The best way to illustrate the benefits of creating VDAEs is to provide some specific examples.

In a first example, assume that multiple employees of a large corporation are provided with various defined services of a DVAMS as part of their job with the corporation. Assume that the DVAMS services are provided from Provider X. This would mean that each employee would have one or more VAAs associated with Provider X, and that those VAAs could be resident on devices located in their offices, in their homes, and possibly also on some mobile computing devices. Each of these VAAs would have VAs that provide the employees with services related to their employment with the corporation.

Also assume that some of those employees have separately obtained additional DVAMS services for their personal use, and that these personal use services are obtained from Provider Y. This would mean that the employees would also have additional VAAs associated with Provider Y that are also stored on some devices located in the employees' offices, homes and mobile computing devices. These VAAs would provide the employees with services in their personal lives.

A DVAMS could define a first VDAE to include all the employees VAAs that are associated with their corporate employment, and that are associated with Provider X. This would allow the DVAMS to make global changes to the DVAMS services that the corporation provides to its employees. A certain change could be made for all the employees by applying the change to all of the elements defined in the first VDAE.

Note an employee would likely have both a first VAA from Provider X (for business services) and a second VAA from provider Y (for personal services) stored on the same device in his home. The employee could also have another VAA from Provider X (for business services) and another VAA from Provider Y (for personal services) stored on a device in his office. When the DVAMS is instructed to make changes to the employee's work related services, by altering only the VAAs that are in first VDAE, no changes will be made to the employees personal VAAs, even though they are resident on the same devices.

Now, take the same basic fact pattern outlined above, and let's define a second VDAE as encompassing all VAAs that are associated with a single employee. This would mean that all the work related VAAs from Provider X and all the personal VAAs from Provider Y would be grouped in the second VDAE. Now, if some aspect of personal information regarding the employee changes, that change can be applied to all of the employees voice services by making the change for all elements in the second VDAE. The change could be applied regardless of who provides the services, and regardless of where the VAAs are located.

For instance, assume that the employee moves from New York City to Los Angeles. If this change in personal information is applied to all the elements in the second VDAE, this change would be reflected in all the work related VAAs from Provider X, and all personal VAAs from Provider Y. Thus, if the employees access the services to get the local weather, all of the VAAs, both work related and personal, would know to provide a weather forecast Los Angeles.

Likewise, a logical VDAE could be defined to include all VAAs, VAs and services that are provided by a particular service provider. This would allow a DVAMS to make global changes to all elements of its system by applying the change to all things grouped within that VDAE.

Or, a VDAE could include all users, devices and elements within a certain state. This would allow a DVAMS to apply the same change to all elements within the state. For instance, a change in the time caused by daylight savings time.

A VAA can be a part of multiple different VDAEs, and may perform voice applications associated with a plurality of VDAEs. For instance, in the examples given above, a particular employee's personal services VAA, which is provided by service provider Y, could be a part of a first VDAE that associates all of that user's VAAs, and a part of a second VDAE that associates all of the VAA's located within one state, and a part of a third VDAE that associates all VAA's provided by service provider Y.

Any grouping of users, equipment, VAs, VAAs, VASSs, CDSs or other system components could be grouped into a VDAE by some common logical connection. And that VDAE grouping could then be used to help manage the system, and delivery of services to the users.

Each VA is allocated to at least one VDAE, which maps its deployment across one or more DVAES-enabled devices and VASS platforms that are similarly associated with the VDAE. The allocation is performed by a DVAMS as described below. Each VA to be deployed is allocated in this manner. Once deployed, a VASS allocated to the VDAE "renders" the VA, producing a version of the VA components customized to operate within the constraints of each allocated VAA (and thus the devices that the VAAs are associated with). User associations within each VDAE may provide further information that is used to customize each VA with personalization information associated with a specific user or group of users.

Figure 17A:
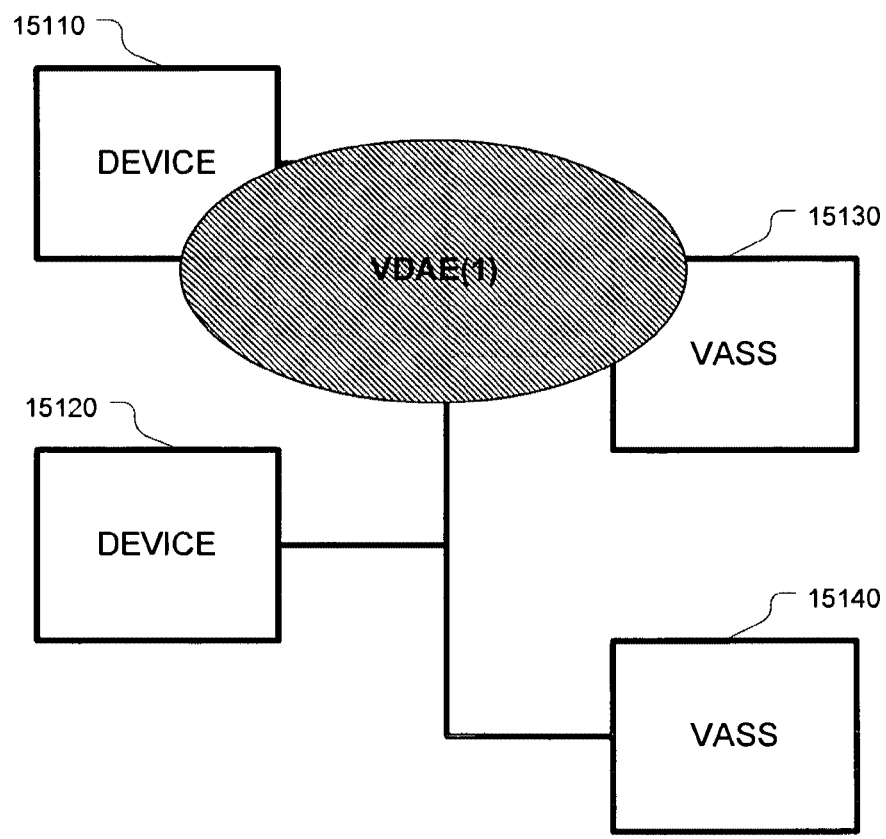
FIGS. 17A and 17B are diagrams used to illustrate how a Virtual Distributed Application Environment is defined.
Figure 17B:
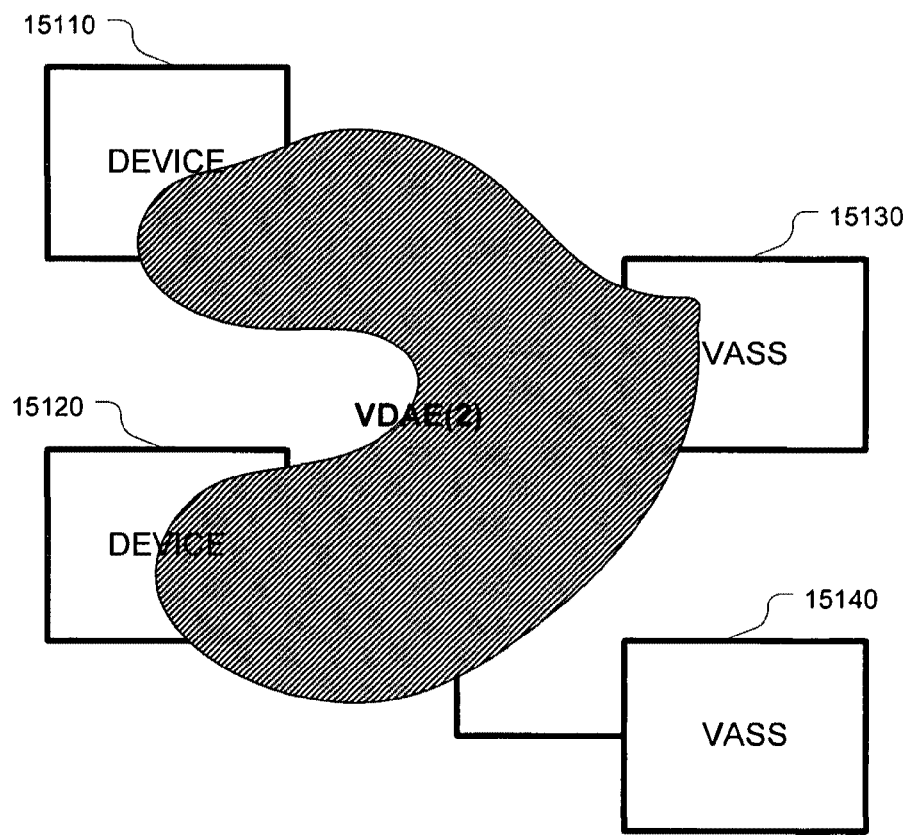

A VDAE comprises associations between at least one DVAES-enabled device, at least one VASS, and at least one user. FIG. 17a shows one exemplary configuration, where a first VDAE comprises Device 15110 and VASS 15130 (user and VAs not shown). FIG. 17b shows an alternative exemplary configuration, where second VDAE comprises Device 15110, Device 15120, and VASS 15130. As noted above, a VDAE can encompass any number of different system elements that are all tied together by some common logical connection.

A VDAE has users allocated to it after the user is registered with a DVAMS. In some instances, the allocation of users to a VDAE is automatically performed on the basis of a default VDAE named in an account or device profile associated with the user's account or device respectively. Furthermore, users may be allocated to a VDAE from the operator interface.

A VDAE has devices allocated to it because of relationships established between the devices and VAAs. Devices are rarely directly mapped to a specific VDAE. Direct mapping of devices to one or more VDAEs is performed in the operator interface.

A VDAE has VAAs allocated to it, based upon relationships between users and devices. If a user and device are both associated with a VDAE, a VAA is associated with the user+device. If no VAA is presently associated, a new VDAE is created and is then associated with the user and device.

A VDAE has one or more VASSs associated with it. VASS's are associated with a VDAE based upon requests received from the operator interface.

A VDAE has one or more DVAMS's associated with it. DVAMS associations are made based upon the operator interface.

A VDAE may have one or more CDS's associated with it. CDS associations are made based upon the operator interface.

A VDAE has one or more VAs associated with it. Association between VAs and a VDAE is made an operator or user interface. VAs may be associated with a VDAE automatically if an allocated user has specified certain VAs as part of their preferences.

A VDAE may be used in several ways.

In one usage, a VDAE may be used to represent a group of users of a specific device (e.g. a premise device). The VDAE represents the set of users, VAAs and VAs that are assigned to a particular premise device.

In another usage, a VDAE may represent the set of users, devices, and voice applications that are managed by an operator.

In another usage, a VDAE could represent a social group, a workgroup at an office, members of an affinity group, members of a loyalty program (like a frequent flyer program), or members of a group that have signed up for a specific voice service.

VDAEs may be nested. Thus, a first VDAE may encompass or include a plurality of subordinate VDAEs. For example, a first VDAE may represent a user's home. Multiple subordinate VDAEs might represent each family member in the home. The VDAEs for each family member would be encompassed by or included within the first VDAE for the entire home.

As noted above, a single user may be associated with a plurality of VDAEs, each of which represents a real world grouping of users. For instance, a first VDAE may be associated with said users' home device, and with voice applications appropriate for home use. A second VDAE may be associated with the user's office premise device, and has voice applications appropriate for an office setting associated with it. In this situation, it may be possible to logically join the user to both VDAE's, using the DVAMS, and having done this, the user becomes able to perform his business voice applications on his home device.

One or more VDAEs may be deployed to one or more DVAESs. A VDAE is deployed by translating a VDAE specification into a deployment specification. The resulting deployment specification names the VAs to be deployed to specific devices for use of specific users. For example, if a VDAE associates a first user and a second user with a first device, and further associates a first VA with said first user, and second and third VAs with the second user, and determines a first VAA is present on the first device, and a second VAA is present on a second device, a deployment specification that requires: 1. The first VA should be rendered for the first user considering the environment of the first VAA and the first device; 2. The second and third VAs to be rendered for the second user should consider the environment of the second VAA and the second device; 3. The first VA components are distributed to the first VAA; and 4. The second and third VA components are distributed to the second VAA.

A DVAMS can use the VDAEs to help update or upgrade system components. For instance, let's assume that a VDAE logically associates all users of a particular VA. And let's assume that a voice dialing grammar in that VA must be changed. In order to make this change, the VA must be re-rendered to all of the users who make use of the VA. These re-rendered VA components must then be propagated to all affected DVAES-enabled devices.

The DVAMS can use the VDAE for mapping all of the users of the VA to generate a deployment specification that lists all affected users and/or VAAs, and the DVAES-enabled equipment that uses the VA. The DVAMS would then provide this deployment specification to the VASS and instruct the VASS to re-render the necessary VA components for all the users/VAAs in the deployment specification. The VASS would then re-render the necessary VA components for each of those users/VAAs listed in the deployment specification. The VASS would also distribute the re-rendered VA components to the appropriate DVAES-enabled devices. This could be done by notifying each of the affected DVAES-enabled devices to update their caches with the newly tendered VA components.

Figure 18:
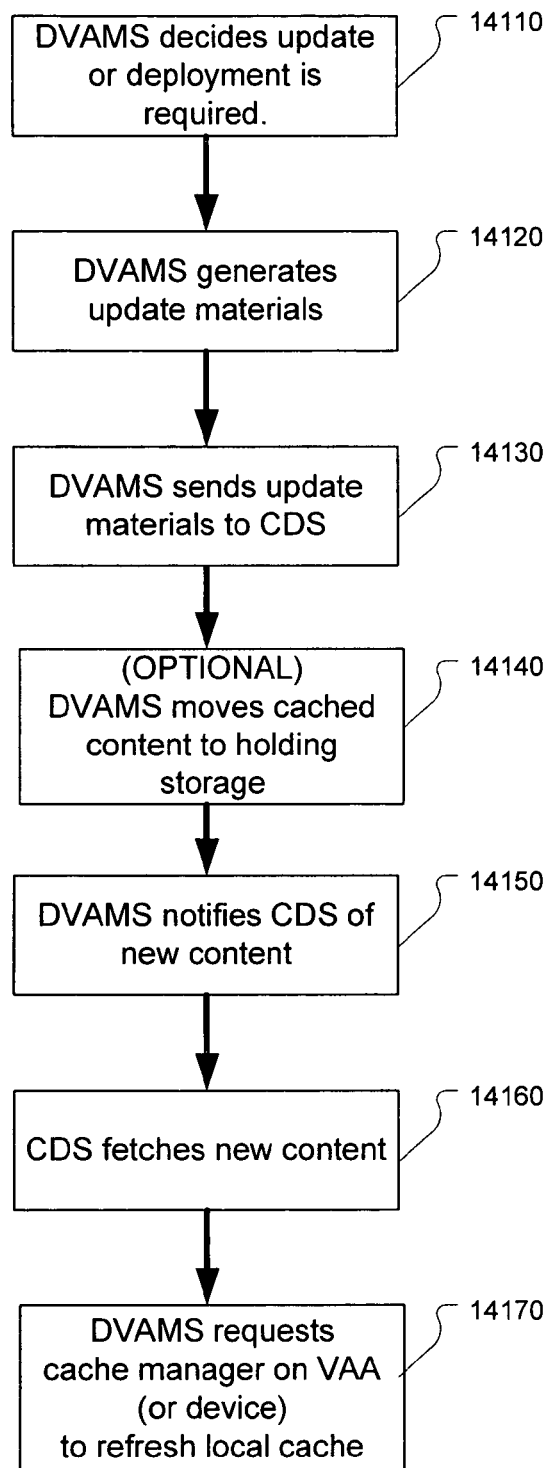
FIG. 18 is a diagram illustrating a method embodying the invention for updating information in a system embodying the invention.

The foregoing explained how VA components might be updated and sent to VAAs/devices. This process required the participation of the VASS to re-render the VA components. In other situations, the DVAMS might determine that it is necessary to update the configuration materials of a device. One embodiment of this sort of process, which is depicted in FIG. 18, does not require the involvement of a VASS. In this process, the DVAMS creates the updated configuration materials and ensures that they are sent to the appropriate device.

In step 14110, a DVAMS determines that a particular device requires an update of one or more of its configuration materials. This determination could be based upon a change in the allocation of a device to a VDAE (and thus a DVAES). This determination could also be based upon receiving notification of a change in required components on a device, or when a device is determined to require adjustments in its configuration based upon performance, network topology changes, etc. In other instances, the DVAMS may have completed an analysis of allocation models, configuration specifications, device performance reports, device capability information, or other materials and concluded that a change in a device's configuration materials is necessary.

In step 14120, the DVAMS generates the updated configuration materials. Next, in a first embodiment, in step 14130, the DVAMS pushes the updated configuration materials to the CDS. In this first embodiment, the method would then proceed directly to step 14170, where the DVAMS would inform the cache manager on the VAA or device, via a communication protocol, to refresh the cache holding the configuration materials. The DVAMS may provide the destination for the refresh i.e. the CDS. Alternatively, the cache manager may know to go to the CDS based on update and refresh rules. Thus, the communication protocol between the DVAMS and the VAA/device may be specific, or it may be a general request to a cache manager to obtain a non-cached version of the content.

In an alternate embodiment of the method, once the DVAMS has generated the new configuration materials, in step 14140, the updated materials are cached somewhere on the network. Then, in step 14150 the DVAMS informs the CDS via a communication protocol that there is new content that needs to be refreshed. Note this request can be a content request made to the CDS specifying delivery of a non-cached copy of the content, or it could be made via a CDS specific protocol/request. In step 14160 the CDS fetches the content that needs to be refreshed. The content can come either from a cache on the DVAMS, from a VASS, or from other DVAES locations. The content that is typically stored on the CDS is common to groups of VAAs. This embodiment would then proceed to step 14170, discussed above, where the cache manager of a VAA or device is instructed to update the cached configuration materials.

A DVAMS can also utilize clustering techniques to cluster VAAs, to thereby provide redundancy, distribute processing loads, and optimize the use of specific system resources. In a first embodiment, VAA services may be provided by a plurality of DVAES-enabled devices, with the dispatch of specific voice sessions to any of a plurality of VAA instances operating on disparate DVAES-enabled devices. By utilizing the voice session transport mechanisms in this manner, VAA services may be provided by whichever DVAES-enabled device is able to best provide the requested services at a specific point in time.

DVAES-enabled device's dynamic configuration mechanism supports the provisioning of DVAES services using whichever device a user is currently accessing. In one aspect of the DVAES, a user may be provisioned fully on a first DVAES-enabled device, and may be provided services of said first device using any of a plurality of DVAES-enabled devices that are appropriately associated using one or more clustering or cooperative processing techniques. Thus, a user may have access to a telephone device connected to a FSX port on a first DVAES-enabled device, and be seamlessly connected over a network to their personalized voice applications deployed on a second DVAES-enabled device when they pick up the handset of the telephone. Similarly, a cluster of DVAES-enabled devices may have user identification/authentication materials deployed on each device within the cluster, and may route the user's requests to one or more DVAES-enabled devices in the cluster for fulfillment. Said selection of services, and routing of requests, may be performed upon the basis of aspects of the DVAES architecture and device loads, including, for example, specific device capabilities, provisioning decisions, current load, network latency, and device location.

DVAES components may be aggregated in any desired manner and will interoperate freely if appropriate credentials are provided. Sometimes, the aggregation takes the form of clustering. Clustering provides redundancy at the platform level and provides redundancy, and in some instances, load balancing. In other aggregations, aggregation takes the form of cooperative processing where multiple hardware instances are members of a DVAES and each hardware instance may independently provide services as required to perform a distributed, personalized voice application for a user. The user receives services at whichever hardware device they are using, without regard to the location that they are accessing the DVAES from or the intervening network topology.

In addition, services may be provided on specific hardware platforms in which specialized hardware assistance is provided. For example, if a DVAES is implemented with a high-end server that provides complex speech recognition, a VAA may be configured to attempt local speech recognition on the local hardware, and to send complex or unrecognizable speech to the high-end server for further analysis. Upon receipt of the results from the high-end speech recognition server, the VAA may continue processing the VA components locally.

The DVAES architecture supports a plurality of caching schemes. The DVAES architecture optimizes the overall performance of the system by using a combination of caching schemes, including the use of predictive, push and pull based caching, combined with the content distribution service (CDS) technologies, and "wakeup-pull" caching schemes. The caching schemes may, in part, be based upon allocations, and those allocations may themselves be based upon VDAE groupings. Typically the caching schemes would be rule based. These rules may be distributed within a DVAES as needed, and may be dynamically changed to account for variations in network latency, processing capabilities, and usage patterns. Traditional web-based content distribution networks (such as Akamai) are an additional caching mechanism that is advantageous to the DVAES architecture. Each of these caching techniques permits content created by a VASS or DVAMS to be transparently propagated to a DVAES-enabled device.

Different cached items may have differing life spans. Some cached items may be persistently stored in cache at a device, others may be stored in a CDS server and re-loaded by the device on a when needed/as needed basis. Still other materials may be stored in their server of record, and be obtained as needed. Accordingly, DVAES caching is typically rule based and is managed using caching rules stored as configuration materials applicable to a specific cache. Caching rules may be generated by a DVAMS on the basis of network topology and each deployment's performance requirements.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although the invention has been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A non-transitory computer-readable medium bearing instructions which, when performed by one or more processors of a local device, cause the local device to perform a method of providing voice services, the method comprising:

sending, to one or more servers of a voice services provider (VSP), one or more messages that include information regarding an event, setting, state and/or variable associated with at least one component of the local device, wherein the local device includes a memory, one or more processors, an operating system, a network interface, an audio and signaling layer with at least one audio I/O device interface, one or more configuration materials and/or settings configured to be controlled by the VSP and a voice services software client configured to run on the one or more processors and to communicate with one or more servers of the VSP, wherein the voice services software client also is configured to start and manage one or more processes and/or threads, wherein each process and/or thread is configured to perform or respond to a voice service instruction that is either received from a server of the VSP or that is based on information received from a server of the VSP, wherein each voice service instruction relates to one or more voice services, and wherein the voice services software client is configured to manage connectivity between the at least one audio I/O device interface and one or more processes and/or threads;

receiving, from one or more servers of the VSP, voice service instructions relating to one or more voice services, where the voice service instructions are based on events, settings, states and/or variables associated with components of the local device; and managing one or more processes and/or threads as the one or more processes and/or threads perform or respond to voice service instructions relating to one or more voice services.

2. The non-transitory computer-readable medium of claim 1, wherein the one or more messages include information regarding an event, setting, state and/or variable associated with the voice services software client.

3. The non-transitory computer-readable medium of claim 1, wherein the one or more messages include information regarding an event, setting, state and/or variable associated with a process and/or thread managed by the voice services software client.

4. The non-transitory computer-readable medium of claim 1, wherein the one or more messages include information regarding an event, setting, state and/or variable associated with a voice service instruction relating to a voice service.

5. The non-transitory computer-readable medium of claim 1, wherein the one or more messages include information regarding an event, setting, state and/or variable relating to a plurality of voice services.

6. The non-transitory computer-readable medium of claim 1, wherein the one or more messages include information regarding an event, setting, state and/or variable relating to a plurality of voice services that are being performed concurrently.

7. The non-transitory computer-readable medium of claim 1, wherein the at least one audio I/O device interface comprises a first audio I/O device interface, and wherein managing one or more processes and/or threads comprises the voice services software client controlling which of the one or more processes and/or threads is connected to the first audio I/O device interface.

8. The non-transitory computer-readable medium of claim 7, wherein the at least one audio I/O device interface further comprises a second audio I/O device interface that is functionally coupled to an audio device that is separate from the local device, and wherein managing one or more processes and/or threads comprises the voice services software client controlling which of the one or more processes and/or threads is connected to the second audio I/O device interface.

9. The non-transitory computer-readable medium of claim 1, wherein at least one of the one or more processes and/or threads is configured by the voice services software client to perform a predetermined function or set of functions.

10. The non-transitory computer-readable medium of claim 1, wherein the voice services software client also is configured to start a plurality of processes and/or threads when the voice services software client starts.

11. The non-transitory computer-readable medium of claim 1, wherein the method further comprises sending update messages, with the voice services software client, to one or more servers of the VSP as the voice services software client manages at least one of the one or more processes and/or threads as the at least one process and/or thread performs or responds to a voice service instruction, wherein each update message includes information regarding an event, setting, state and/or variable associated with a component of the local device.

12. The non-transitory computer-readable medium of claim 1, wherein the method further comprises:

sending, to a server of the VSP, information about a capability or characteristic of the local device; and receiving at least one voice service instruction rendered based on the information about a capability or characteristic of the local device that was sent to a server of the VSP.

13. The non-transitory computer-readable medium of claim 1, wherein receiving voice service instructions comprises receiving at least one voice service instruction rendered based on a capability or characteristic of a data network connection of the local device.

14. The non-transitory computer-readable medium of claim 1, wherein receiving voice service instructions comprises receiving at least one voice service instruction rendered based on a characteristic of a user of the local device.

15. The non-transitory computer-readable medium of claim 1, wherein the voice services software client is configured to manage the one or more processes and/or threads as the one or more processes and/or threads perform or respond to voice service instructions relating to first and second voice services such that the first and second voice services are provided concurrently.

16. The non-transitory computer-readable medium of claim 15, wherein managing comprises managing the one or more processes and/or threads as the one or more processes and/or threads perform or respond to voice service instructions relating to the first and second voice services such that the one or more processes and/or threads are connected to and utilize the same audio I/O device interface.

17. The non-transitory computer-readable medium of claim 1, wherein the method further comprises:

determining that a new process and/or thread is needed to perform or respond to a particular voice service instruction; and starting a new process and/or thread that is to be used to perform or respond to the particular voice service instruction, and wherein managing further comprises the voice services software client managing the new process and/or thread as the new process and/or thread performs or responds to the particular voice service instruction.

18. The non-transitory computer-readable medium of claim 17, wherein determining that a new process and/or thread is needed to perform or respond to the particular voice service instruction comprises determining that none of the processes and/or threads currently being managed by the voice services software client are available for and/or are capable of performing or responding to the particular voice service instruction.

19. The non-transitory computer-readable medium of claim 1, wherein managing the one or more processes and/or threads comprises the voice services software client:
pausing performance of or responses to one or more voice service instructions relating to a first voice service upon occurrence of a trigger event;
causing performance of or responses to one or more voice service instructions relating to a second voice service to commence once performance of or responses to the one or more voice service instructions relating to the first voice service have been paused; and
resuming performance of or responses to the one or more voice service instructions relating to the first voice service when performance of or responses to the one or more voice service instructions relating to the second voice service are completed.

20. The non-transitory computer-readable medium of claim 1, wherein the at least one audio I/O device interface comprises first and second audio I/O device interfaces, and wherein managing the one or more processes and/or threads comprises the voice services software client causing a first process and/or thread that is connected to the first audio I/O device interface to perform or respond to a first voice service instruction and also causing a second process and/or thread that is connected to the second audio I/O device interface to perform or respond to a second voice service instruction.

21. The non-transitory computer-readable medium of claim 20, wherein the first voice service instruction relates to a first voice service, wherein the second voice service instruction relates to a second voice service, and wherein managing the one or more processes and/or threads comprises the voice services software client causing the first process and/or thread to perform or respond to the first voice service instruction concurrently with the second process and/or thread performing or responding to the second voice service instruction.

22. The non-transitory computer-readable medium of claim 1, wherein the method further comprises:
continuously monitoring sounds received via a microphone coupled to the at least one audio I/O device interface;
determining when the received sounds include a keyword or phrase; and
taking a predetermined action when received sounds are determined to include the keyword or phrase.

23. The non-transitory computer-readable medium of claim 22, wherein taking a predetermined action comprises:
receiving audio input after detection of the keyword or phrase; and
sending the received audio input to a speech recognition interface resident on the local device or to a server of the VSP.

24. The non-transitory computer-readable medium of claim 1, wherein the method further comprises sending to a server of the VSP a setting, state or variable of one or more configuration materials or settings of a component of the local device.

25. The non-transitory computer-readable medium of claim 1, wherein the method further comprises sending to a server of the VSP device log messages relating to operations of the local device in real time or near real time.

26. The non-transitory computer-readable medium of claim 1, wherein the method further comprises sending to a server of the VSP log messages and/or error messages relating to operations of the voice services software client.

27. The non-transitory computer-readable medium of claim 1, wherein the method performed by one or more processors of the local device comprises managing the one or more processes and/or threads as the one or more processes and/or threads perform or respond to a voice service instruction contemporaneously with receiving the voice service instruction from a server of the VSP.

28. The non-transitory computer-readable medium of claim 1, wherein the one or more messages include values of multiple variables as of a specific time, and wherein the values of multiple variables relate to at least one of a component of the local device and performance of or responses to a voice service instruction.

29. The non-transitory computer-readable medium of claim 1, wherein the method further comprises sending to a server of the VSP at least one credential of the voice services software client, and wherein the server of the VSP is configured to use the at least one credential to uniquely identify the voice services software client, to uniquely identify the local device, to obtain information associated with the voice services software client and/or to obtain information associated with the local device.

30. The non-transitory computer-readable medium of claim 1, wherein the method further comprises sending to a server of the VSP at least one credential of the voice services software client, and wherein the server of the VSP is configured to use the at least one credential to identify a user account associated with the local device and to obtain information associated with that user account.

\* \* \* \* \*

UNITED STATES PATENT AND TRADEMARK OFFICE
CERTIFICATE OF CORRECTION

| | |
|---|---|
| PATENT NO. | : 11,778,082 B2 |
| APPLICATION NO. | : 18/139791 |
| DATED | : October 3, 2023 |
| INVENTOR(S) | : Vishal Dhawan, Timothy M. Price and Manoj Sindhwani |

It is certified that error appears in the above-identified patent and that said Letters Patent is hereby corrected as shown below:

On the Title Page

Item (72): Delete "Manoj Sindhwani, Oakhill, VA (US)"

Signed and Sealed this
Second Day of April, 2024

Katherine Kelly Vidal
*Director of the United States Patent and Trademark Office*